US011438784B2

United States Patent
Teyeb et al.

(10) Patent No.: US 11,438,784 B2
(45) Date of Patent: Sep. 6, 2022

(54) METHODS SUPPORTING EARLY MEASUREMENT INFORMATION IN LOGGED MINIMIZATION OF DRIVE TESTS (MDT) MEASUREMENT REPORTS AND RELATED COMMUNICATION DEVICES AND NETWORK NODES

(71) Applicant: Telefonaktiebolaget LM Ericsson (publ), Stockholm (SE)

(72) Inventors: Oumer Teyeb, Solna (SE); Pradeepa Ramachandra, Linköping (SE); Angelo Centonza, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 23 days.

(21) Appl. No.: 17/130,954

(22) Filed: Dec. 22, 2020

(65) Prior Publication Data
US 2021/0235300 A1 Jul. 29, 2021

Related U.S. Application Data

(63) Continuation-in-part of application No. PCT/SE2020/051023, filed on Oct. 22, 2020.
(Continued)

(51) Int. Cl.
*H04W 24/10* (2009.01)
*H04W 24/08* (2009.01)
(Continued)

(52) U.S. Cl.
CPC .......... *H04W 24/10* (2013.01); *H04W 24/08* (2013.01); *H04W 76/15* (2018.02); *H04W 76/19* (2018.02); *H04W 76/27* (2018.02); *H04W 76/30* (2018.02)

(58) Field of Classification Search
CPC ..... H04W 24/10; H04W 24/08; H04W 76/19; H04W 76/15; H04W 76/30; H04W 76/27
(Continued)

(56) References Cited

U.S. PATENT DOCUMENTS 11,159,967 B2 * 10/2021 Kim ...................... H04W 24/08
11,265,729 B2 * 3/2022 Van Der Velde ...........................
H04W 36/0069
(Continued)

FOREIGN PATENT DOCUMENTS

GB          2589942 A  *  6/2021  ............ H04W 16/10

OTHER PUBLICATIONS

International Search Report and Written Opinion of the International Searching Authority, PCT/SE2020/051023, dated Jun. 28, 2021, 17 pages.
(Continued)

*Primary Examiner* — Mong-Thuy T Tran
(74) *Attorney, Agent, or Firm* — Sage Patent Group

(57) ABSTRACT

According to an example embodiment a method is provided to operate a communication device. A logged MDT measurement configuration is received from a wireless communication network. An early measurement configuration is received from the wireless communication network, wherein the early measurement configuration identifies a plurality of early measurement frequencies including a first early measurement frequency. A plurality of MDT signal measurements are logged in accordance with the logged MDT measurement configuration. Measurements are performed in accordance with the early measurement configuration, wherein a signal measurement for the first early measurement frequency is not provided. A logged MDT measurement report is transmitted to the wireless communication network in accordance with the logged MDT measurement
(Continued)

configuration, wherein the logged MDT measurement report includes the plurality of MDT signal measurements, and an indication that a signal measurement for the first early measurement frequency is not provided.

22 Claims, 28 Drawing Sheets

Related U.S. Application Data

(60) Provisional application No. 62/965,501, filed on Jan. 24, 2020.

(51) Int. Cl.
*H04W 76/15* (2018.01)
*H04W 76/27* (2018.01)
*H04W 76/30* (2018.01)
*H04W 76/19* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 2016/0242052 | A1* | 8/2016 | Kazmi | H04W 84/18 |
| 2019/0306740 | A1* | 10/2019 | Kim | H04W 24/10 |
| 2020/0404521 | A1* | 12/2020 | Kim | H04W 24/08 |
| 2021/0006981 | A1* | 1/2021 | Van Der Velde | H04W 48/06 |
| 2021/0345144 | A1* | 11/2021 | Yang | H04W 24/10 |
| 2022/0078648 | A1* | 3/2022 | Wang | H04W 24/10 |

OTHER PUBLICATIONS

Catt, 3GPP TSG-RAN WG2 Meeting #107bis, R1-1912114, Available Cell Reselection Measurement Result Reporting, Chongqing, P.R. China, Oct. 14-18, 2019, 4 pages.
3GPP TR 36.805 V9.0.0 (Dec. 2009), 3rd Generation Partnership Project; Technical Specification Group Radio Access Network; Study on Minimization of drive-tests in Next Generation Networks; (Release 9), 24 pages.
3GPP TS 37.320 V15.0.0 (Jun. 2018), 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15), 27 pages.
3GPP TS 32.422 V15.2.0 (Jun. 2019), 3rd Generation Partnership Project; Technical Specification Group Services and System Aspects; Telecommunication management; Subscriber and equipment trace; Trace control and configuration management (Release 15), 189 pages.
3GPP TS 36.304 V15.5.0 (Dec. 2019), 3rd Generation Partnership Project; Technical Specification Group Radio Access Network; Evolved Universal Terrestrial Radio Access (E-UTRA); User Equipment (UE) procedures in idle mode (Release 15), 55 pages.
3GPP TS 36.331 V15.8.0 (Dec. 2019), 3rd Generation Partnership Project; Technical Specification Group Radio Access Network; Evolved Universal Terrestrial Radio Access (E-UTRA); Radio Resource Control (RRC); Protocol specification (Release 15), 964 pages.
3GPP TS 36.300 V15.8.0 (Dec. 2019), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), 365 pages.
3GPP TS 38.331 V15.8.0 (Dec. 2019), 3rd Generation Partnership Project; Technical Specification Group Radio Access Network; NR; Radio Resource Control (RRC) protocol specification (Release 15), 532 pages.
Samsung, MDT for early measurements (Logged, Immediate), 3GPP TSG-RAN WG2#108 meeting, Reno, USA, Nov. 14-18, 2019, Tdoc R2-1915734, 3 pages.
3GPP TS 36.133 V15.9.0 (Dec. 2019), 3rd Generation Partnership Project; Technical Specification Group Radio Access Network; Evolved Universal Terrestrial Radio Access (E UTRA); Requirements for support of radio resource management (Release 15), 3611 pages.

* cited by examiner

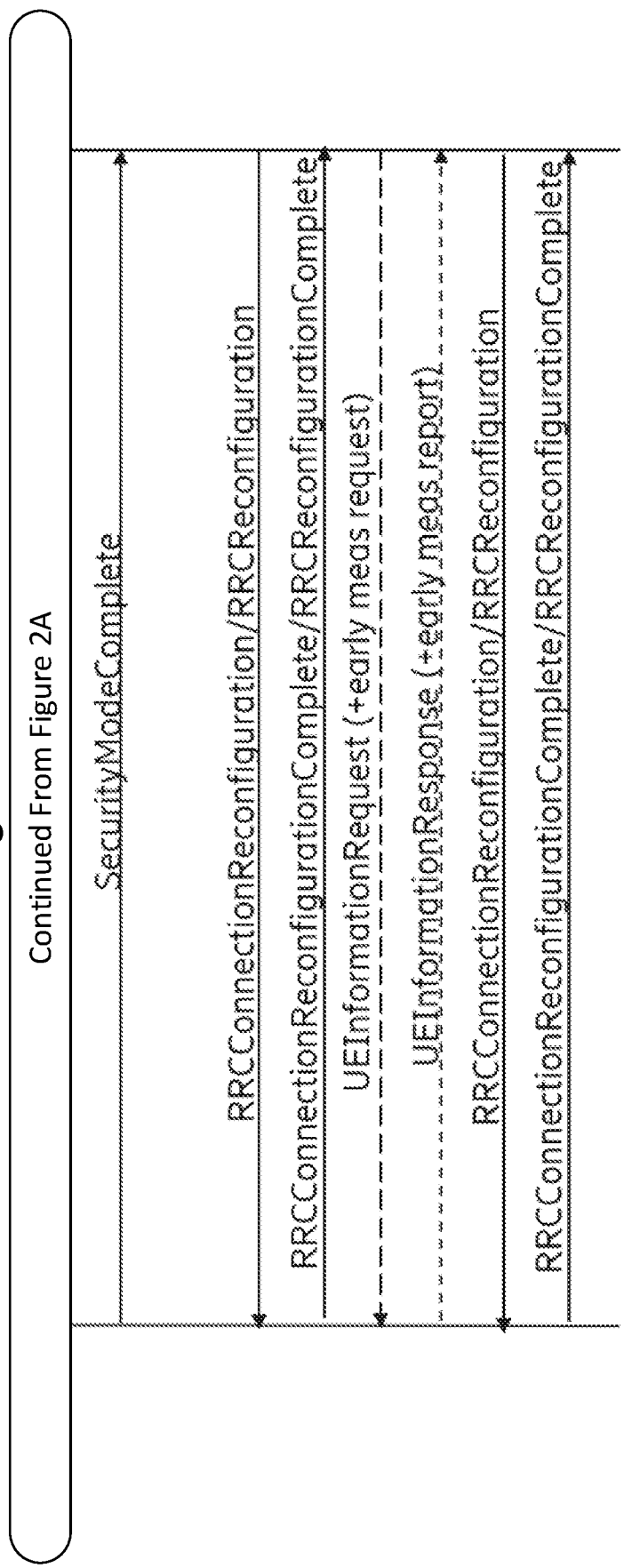
Figure 2B
Continued From Figure 2A

METHODS SUPPORTING EARLY MEASUREMENT INFORMATION IN LOGGED MINIMIZATION OF DRIVE TESTS (MDT) MEASUREMENT REPORTS AND RELATED COMMUNICATION DEVICES AND NETWORK NODES

CROSS REFERENCE TO RELATED APPLICATIONS

The present application claims the benefit of priority as a continuation-in-part of International PCT Application No. PCT/SE2020/051023 filed 22 Oct. 2020, and the present application claims the benefit of priority of U.S. Provisional Application No. 62/965,501 filed 24 Jan. 2020. The disclosures of both of the above referenced applications are hereby incorporated herein in their entireties by reference.

TECHNICAL FIELD

The present disclosure relates generally to communications, and more particularly to communication methods and related devices and nodes supporting wireless communications.

BACKGROUND

Early measurements in LTE (Long Term Evolution) and NR (New Radio) are discussed below.

In LTE Rel-15, it is possible to configure the UE to report so called early measurements (also known as idle mode measurements) upon the transition from idle/inactive to connected state. These measurements are measurements that the UE can perform in idle/inactive state, and according to a configuration provided by the source cell with the intention to receive these measurements immediately after the UE gets connected and quickly setup carrier aggregation (CA), without the need to first provide a measurement configuration (measConfig) in RRC_CONNECTED and wait for hundreds of milliseconds until first samples are collected, monitored and then the first reports are triggered and transmitted to the network.

Measurement configuration for early measurements upon setup/resume in LTE rel-15 is discussed below.

A first aspect of an existing approach, as standardized in EUTRA 36.331, is described in Section 5.6.20 Idle Mode Measurements. A UE can be configured upon the transition from RRC_CONNECTED to RRC_IDLE/RRC_INACTIVE (i.e. RRCConnectionRelease) with an early measurement configuration which contains the measurement duration (measIdleDuration-r15), which can be up to 5 minutes long, indicating for how long the UE shall perform the measurements while in IDLE/INACTIVE state. The exact measurement configuration (i.e. which carriers/cells to measure) can be provided either in dedicated signaling within the same RRCConnectionRelease message or via broadcast signaling (SIB5). If dedicated signaling is provided, it overrides the broadcast signaling. After the measurement duration has expired, the UE can still continue performing the early measurements using broadcasted information in SIB5, based on UE implementation.

The early measurement configuration is specified in the IE measIdleCarrierListEUTRA-r15, indicating up to 8 carrier frequencies (maxFreqIdle-r15) to measure. For each frequency to be measured, an optional cell list (measCellList) can be included that can contain up to 8 cell ID or ranges of cell IDs to perform measurements on (if the cell list is not included, UE performs measurements on any neighbor cell). Additionally, a validity area (validityArea), which is a list of cell identities, can be configured which limits the area in which the early measurements can be performed (i.e. if the UE goes out of the validity area for any of the configured frequencies to be measured, the UE stops performing early measurements).

It should be noted that even when the UE is in a validity area and the measIdleDuration has not expired yet, the UE may not perform measurements on a particular frequency if the UE is not capable of performing carrier aggregation between the frequency of the current serving cell (i.e., the cell the UE is camping on) and the carrier configured to be measured, or for the case of inter-RAT carriers, if the UE is not capable of performing dual connectivity between the current serving RAT at the current serving frequency (i.e., the frequency used by the serving cell) and the inter-RAT carrier configured to be measured.

The broadcasted and dedicated signaling early measurement signaling in LTE rel-15 is illustrated in the RRCConnectionRelease message of Section 6.2.2 of Reference [1] (including the measIdleConfig information element of Section 6.3.5 of Reference [1]).

Another aspect of an existing approach may occur when the UE tries to resume or setup a call from RRC_IDLE without context. If the previous step is performed, i.e., if the UE is configured to store idle measurements, the network may request the UE after resume/setup (after security is activated) whether the UE has idle measurements available.

In the case this UE is setting up a connection coming from RRC_IDLE without the AS Context, the network is not aware that the UE has available measurements stored. Then, to allow the network to know that, and possibly request the UE to report early measurements, the UE may indicate the availability of stored idle measurements in RRCConnectionSetupComplete. As not all cells would support the feature anyway, the UE only includes that availability information if the cell broadcasts in SIB2 the idleModeMeasurements indication. The flag in RRCConnectionSetupComplete and procedure text are shown in Section 6.2.2 of Reference [1].

In the case this UE is setting up a connection coming from RRC_IDLE but with a stored AS Context (i.e. resume from suspended) or from RRC_INACTIVE, the network may be aware that the UE may have available idle measurements stored after checking the fetched context from the source node where the UE got suspended. However, it is still not certain that the UE has measurements available since the UE is only required to perform the measurements if the cells are above the configured RSRP/RSRQ thresholds and while it performs cell selection/cell reselection within the configured validity area. Then, to allow the network to know that, and possibly request the UE to report early measurements, the UE may also indicate the availability of stored idle measurements in RRCConnectionResumeComplete. As not all cells would support the feature anyway, the UE only includes that availability information if the cell broadcasts in SIB2 the idleModeMeasurements indication. The flag in RRCConnectionResumeComplete and procedure text are shown in Section 6.2.2 of Reference [1].

Once the UE indicates to the target cell upon resume or setup that idle measurements are available, the network may finally request the UE to report these available measurements by including the field idleModeMeasurementReq in the UEInformationRequest message transmitted to the UE as shown in FIG. 1 (corresponding to FIG. 5.6.5.1-1 of Reference [1]. Then, the UE responds with a UEInformationResponse containing these measurements as further shown in FIG. 1 (corresponding to FIG. 5.6.5.1-1 of Reference [1]. The UEInformationResponse message is illustrated in Section 6.2.2 of Reference [1].

Measurement configuration for early measurements upon setup/resume in LTE/NR rel-16 is discussed below.

In rel-16, under the work item called "Multi-RAT Dual-Connectivity and Carrier Aggregation enhancements", an enhanced version of the LTE rel-15 early measurement approach has been adopted to NR rel-16 (also the LTE rel-16 approach has been enhanced). Some of enhancements are discussed below:

The early measurement configuration in LTE and NR rel-16 can contain both LTE and NR configuration (i.e. UE can measure both LTE and NR carriers, including beam measurement in the case of NR). This is to enable not only fast CA but also fast DC setup.

The network can request the early measurements in the resume message and UE can report them in the resume complete messages (while in LTE rel-15, early measurement reporting was possible only via UE Information Request/Response after the connection is resumed/established).

The signaling diagrams of FIGS. 2A, 2B, 3, 4, 5, and 6 indicate the current agreements regarding the early measurement signaling in LTE/NR rel-16.

FIGS. 2A and 2B illustrate early measurement reporting in LTE/NR IDLE mode in rel-16 during connection setup, option 1.

FIG. 3 illustrates early measurement reporting in LTE/NR IDLE mode in rel-16 during connection setup, option 2.

FIG. 4 illustrates early measurement reporting in LTE IDLE with suspended, LTE INACTIVE mode or NR INACTIVE mode in rel-16, option 1.

FIG. 5 illustrates early measurement reporting in LTE INACTIVE, LTE IDLE with suspended and NR INACTIVE mode in rel-16, option 2.

MDT (Minimization of drive test) is discussed below.

MDT was firstly studied in Rel-9 (TR 36.805) driven by RAN2 with the purpose to reduce/minimize the actual drive tests. MDT has been introduced since Rel-10 in LTE. MDT has not been specified for NR in the involved standards in RAN2, RAN3 and SA5 groups. The use cases in the TR 36.805 include: Coverage improvement/optimization; Mobility improvement/optimization; Capacity improvement/optimization; Parameterization for common channels; and/or QoS verification.

MDT types based on RRC states are discussed below.

In general, there are two types of MDT measurement logging, i.e., Logged MDT (logging of measurements in idle mode or inactive state) and Immediate MDT (logging of measurements when the UE is RRC Connected mode).

Logged MDT is discussed below.

A UE in RRC_IDLE state is configured to perform periodical MDT logging after receiving the MDT configurations from the network. The UE shall report the DL pilot strength measurements (RSRP/RSRQ) together with time information, detailed location information if available, and WLAN, Bluetooth to the network via using the UE information framework when it is in RRC_CONNECTED state. The DL pilot strength measurement of Logged MDT is collected based on the existing measurements required for cell reselection purpose, without imposing UE to perform additional measurements. The measurement logging for logged MDT is illustrated in Table 1.

TABLE 1

The measurement logging for Logged MDT

| MDT mode | RRC states | Measurement Quantities |
|---|---|---|
| Logged MDT | RRC_IDLE | RSRP and RSRQ of the serving cell and available UE measurements for intra-frequency/inter-frequency/inter-RAT, time stamp and detailed location information if available. |

For Logged MDT, UE receives the MDT configurations including logginginterval and loggingduration in the RRC message, i.e., LoggedMeasurementConfiguration, from the network. A timer (T330) is started at the UE upon receiving the configurations and set to loggingduration (10 min-120 min). The UE shall perform periodical MDT logging with the interval set to logginginterval (1.28 s-61.44 s) when the UE is in RRC_IDLE. An example of the MDT logging is shown in FIG. 6. Characteristics of the T330 Timer of FIG. 6 are provided below in Table 2.

TABLE 2

T330 Timer

| Timer | Start | Stop | At Expiry |
|---|---|---|---|
| T330 | Upon receiving LoggedMeasurementConfiguration message | Upon log volume exceeding the suitable UE memory, upon initiating the release of LoggedMeasurementConfiguration procedure | Upon expiry of T330 the UE shall release the logged MDT measurement configuration The UE is allowed to discard stored logged measurements, 48 hours after T330 expiry. |

The network sends the LoggedMeasurementConfiguration to configure the UE to perform logged measurements The LoggedMeasurementConfiguration message is used by E-UTRAN to configure the UE to perform logging of measurement results while in RRC_IDLE or to perform logging of measurement results for MBSFN while in both RRC_IDLE and RRC_CONNECTED. It is used to transfer the logged measurement configuration for network performance optimisation, see TS 37.320 [60]. The LoggedMeasurementConfiguration message has the following characteristics:

Signalling radio bearer: SRB1
RLC-SAP: AM
Logical channel: DCCH
Direction: E-UTRAN to UE The LoggedMeasurementConfiguration message is illustrated in Figures Section 6.2.2 of Reference [1].

LoggedMeasurementConfiguration fields from the LoggedMeasurementConfiguration are provided in Table 3 below.

TABLE 3

LoggedMeasurementConfiguration field descriptions.

LoggedMeasurementConfiguration field descriptions
absoluteTimeInfo
Indicates the absolute time in the current cell.
areaConfiguration
Used to restrict the area in which the UE performs measurement logging to cells broadcasting either one of the included cell identities or one of the included tracking area codes/identities.
plmn-IdentityList
Indicates a set of PLMNs defining when the UE performs measurement logging as well as the associated status indication and information retrieval i.e. the UE performs these actions when the RPLMN is part of this set of PLMNs.
targetMBSFN-AreaList
Used to indicate logging of MBSFN measurements and further restrict the area and frequencies for which the UE performs measurement logging for MBSFN. If both MBSFN area id and carrier frequency are present, a specific MBSFN area is indicated. If only carrier frequency is present, all MBSFN areas on that carrier frequency are indicated. If there is no entry in the list, any MBSFN area is indicated.
tce-Id
Parameter Trace Collection Entity Id: See TS 32.422 [58].
traceRecordingSessionRef
Parameter Trace Recording Session Reference: See TS 32.422 [58]

The AreaConfiguration indicates an area for which UE is requested to perform measurement logging. If not configured, measurement logging is not restricted to specific cells or tracking areas but applies as long as the RPLMN (Registered PLMN) is contained in plmn-IdentityList stored in VarLogMeasReport.

The AreaConfiguration information element is illustrated in Section 6.3.6 of Reference [1].

AreaConfiguration field descriptions are provided below in Table 4.

TABLE 4

AreaConfiguration field descriptions.

AreaConfiguration field descriptions
plmn-Identity-perTAC-List
Includes the PLMN identity for each of the TA codes included in trackingAreaCodeList. The PLMN identity listed first in plmn-Identity-perTAC-List corresponds with the TA code listed first in trackingAreaCodeList and so on.

The TraceReference contains parameter Trace Reference as defined in TS 32.422.

The TraceReference information element is illustrated in Section 6.3.6 of Reference [1].

The UE stores the logged measurement configuration in the UE variable varLogMeasConfig and the logged measurement results in varLogMeasReport.

The UE variable VarLogMeasConfig includes the configuration of the logging of measurements to be performed by the UE while in RRC_IDLE, covering intra-frequency, inter-frequency, inter-RAT mobility and MBSFN related measurements. If MBSFN logging is configured, the UE performs logging of measurements while in both RRC_IDLE and RRC_CONNECTED. Otherwise, the UE performs logging of measurements only while in RRC_IDLE.

The VarLogMeasConfig UE variable is illustrated in Section 7.1 of Reference [1].

The UE variable VarLogMeasReport includes the logged measurements information.

The VarLogMeasReport UE variable and elements thereof are illustrated in Sections 6.2.2, 6.4, and 7.1 of [1].

On receiving a UEInformationRequest message from the network that includes logMeasReportReq, the UE includes the logged measurements in the UEInformationResponse message.

The procedures for logged measurement configuration and the performing of logged measurements are discussed below with respect to 3GPP TS 36.331, V15.8.0 (2019 December), also referred to as Reference [1]. FIG. 7 (corresponding to FIG. 5.6.6.1-1 of Reference [1] illustrates a Logged measurement configuration message transmitted from EUTRAN to the UE.

As discussed in Section 5.6.6.1 of Reference [1], the purpose of this procedure is to configure the UE to perform logging of measurement results while in RRC_IDLE and to perform logging of measurement results for MB_SFN in both RRC_IDLE and RRC_CONNECTED. The procedure applies to logged measurements capable UEs that are in RRC_CONNECTED.

NOTE: E-UTRAN may retrieve stored logged measurement information by means of the UE information procedure.

Initiation is discussed in Section 5.6.6.2 of Reference [1]. E-UTRAN initiates the logged measurement configuration procedure to UE in RRC_CONNECTED by sending the LoggedMeasurementConfiguration message.

Reception of the LoggedMeasurementConfiguration by the UE is discussed in Section 5.6.6.3 of Reference [1].

T330 expiry is discussed in Section 5.6.6.4 of Reference [1] as follows. Upon expiry of T330 the UE shall: 1> release VarLogMeasConfig; The UE is allowed to discard stored logged measurements, i.e. to release VarLogMeasReport, 48 hours after T330 expiry.

Release of Logged Measurement Configuration is discussed in Section 5.6.7 of Reference [1].

A discussed in Section 5.6.7.1 of Reference [1], the purpose of this procedure is to release the logged measurement configuration as well as the logged measurement information.

Initiation is discussed in Section 5.6.7.2 of Reference [1] as follows. The UE shall initiate the procedure upon receiving a logged measurement configuration in another RAT. The UE shall also initiate the procedure upon power off or detach. The UE shall: 1> stop timer T330, if running; 1> if stored, discard the logged measurement configuration as well as the logged measurement information, i.e. release the UE variables VarLogMeasConfig and VarLogMeasReport;

Measurements logging is discussed in Section 5.6.8 of Reference [1].

As discussed in Section 5.6.8.1 of Reference [1], this procedure specifies the logging of available measurements by a UE in RRC_IDLE that has a logged measurement configuration and the logging of available measurements by a UE in both RRC_IDLE and RRC_CONNECTED if targetMBSFN-AreaList is included in VarLogMeasConfig.

Initiation is discussed in Section 5.6.8.2 of Reference [1].

Reception of the UEInformationRequest message is discussed in Section 5.6.5.3 of Reference [1].

Early measurements in logged MDT was discussed in R2-1915734, also referred to as Reference [2], where it was proposed that the logged MDT measurements can also include the measurements associated with the early measurement configuration. Based on this, the proponents of this seem to suggest discussion around whether the UE can be configured explicitly to include some early measurement related logging or not.

Proposal 1 Support logged MDT for results of early measurements i.e. that UE can log measurement results for (additional) frequencies available from early measurements Proposal 2 RAN2 is requested to discuss whether any specification changes are required to support logged MDT for early measurements. In particular:

Whether: a) the UE always logs the same (basic) results as for frequencies evaluated for cell re-selection or b) to introduce fields to enable logging of additional results available only when early measurements are performed (E.g. results based on another RS type, some additional quantity and or some additional beam results)

In case option b) is adopted, whether 1) UE always logs all results it has available or 2) whether there is a need for any configuration by which network can limit/control which results the UE should actually log Information regarding early measurement in a logged MDT measurement report, however, may be difficult to use for coverage map determination, for example, if an early measurement is not performed for a frequency that is otherwise configured for early measurement.

SUMMARY

According to some embodiments of inventive concepts, methods are provided to operate a communication device in communication with a wireless communication network. A logged Minimization of Drive Tests, MDT, measurement configuration is received from the wireless communication network. An early measurement configuration is received from the wireless communication network, wherein the early measurement configuration identifies a plurality of early measurement frequencies including a first early measurement frequency. A plurality of MDT signal measurements are logged in accordance with the logged MDT measurement configuration. Measurements are performed in accordance with the early measurement configuration, wherein a signal measurement for the first early measurement frequency is not provided. A logged MDT measurement report is transmitted to the wireless communication network in accordance with the logged MDT measurement configuration, wherein the logged MDT measurement report includes the plurality of MDT signal measurements, and an indication that a signal measurement for the first early measurement frequency is not provided.

According to some embodiments, by including an indication that a signal measurement for an early measurement frequency is not provided in a logged MDT measurement report, a more accurate coverage map may be provided.

According to some embodiments of inventive concepts, methods are provided to operate a node of a wireless communication network. A logged Minimization of Drive Tests, MDT, measurement configuration is provided for a communication device. An early measurement configuration is provided for the communication device, wherein the early measurement configuration identifies a plurality of early measurement frequencies including a first early measurement frequency. A logged MDT measurement report is received from the communication device in accordance with the logged MDT measurement configuration, wherein the logged MDT measurement report includes a plurality of MDT signal measurements, and an indication that a signal measurement for the first early measurement frequency is not provided.

According to some embodiments, by receiving an indication (e.g., in a logged MDT measurement report) that a signal measurement for an early measurement frequency is not provided in a logged MDT measurement report, a more accurate coverage map may be provided.

According to some embodiments of inventive concepts, methods are provided to operate a communication device in communication with a wireless communication network. A logged Minimization of Drive Tests MDT measurement configuration is received from the wireless communication network, wherein the logged MDT measurement configuration identifies a plurality of MDT measurement frequencies. An early measurement configuration is received from the wireless communication network, wherein the early measurement configuration identifies a plurality of early measurement frequencies including a first early measurement frequency. Measurement is performed for the plurality of MDT measurement frequencies in accordance with the logged MDT measurement configuration to provide signal measurements for the plurality of MDT measurements frequencies. Measurement is performed in accordance with the early measurement configuration, wherein a signal measurement for the first early measurement frequency is not provided. A logged MDT measurement report is transmitted to the wireless communication network in accordance with the logged MDT measurement configuration, wherein the logged MDT measurement report includes the signal measurements for the plurality of MDT measurement frequencies, and an indication that a signal measurement for the first early measurement frequency is not provided.

According to some embodiments, by including an indication that a signal measurement for an early measurement frequency is not provided in a logged MDT measurement report, a more accurate coverage map may be provided.

According to some other embodiments of inventive concepts, methods are provided to operate a communication device in communication with a wireless communication network. A logged Minimization of Drive Tests MDT measurement configuration is received from the wireless communication network, wherein the logged MDT measurement configuration identifies a plurality of MDT measurement frequencies. An early measurement configuration is received from the wireless communication network, wherein the early measurement configuration identifies a plurality of early measurement frequencies including a first early measurement frequency. Measurement is performed for the plurality of MDT measurement frequencies in accordance with the logged MDT measurement configuration to provide signal measurements for the plurality of MDT measurements frequencies. Measurement is performed for the plurality of early measurement frequencies in accordance with the early measurement configuration to provide a signal measurement for the first early measurement frequency after a condition to stop early measurement for the first early measurement frequency has been satisfied. A logged MDT measurement report is transmitted to the wireless communication network in accordance with the logged MDT measurement configuration, wherein the logged MDT measurement report includes the signal measurements for the plurality of MDT measurement frequencies, and the signal measurement for the first early measurement frequency.

According to some embodiments, by including a signal measurement for an early measurement frequency in a logged MDT measurement report even though a condition to stop early measurement has been satisfied, a more accurate coverage map may be provided.

According to still other embodiments of inventive concepts, methods are provided to operate a node of a wireless communication network. A logged Minimization of Drive Tests MDT measurement configuration is provided for a communication device, wherein the logged MDT measurement configuration identifies a plurality of MDT measurement frequencies. An early measurement configuration is provided for the communication device, wherein the early measurement configuration identifies a plurality of early measurement frequencies including a first early measurement frequency. A logged MDT measurement report is received from the communication device in accordance with the logged MDT measurement configuration, wherein the logged MDT measurement report includes signal measurements for the plurality of MDT measurement frequencies, and an indication that a signal measurement for the first early measurement frequency is not provided.

According to yet other embodiments of inventive concepts, methods are provided to operate a node of a wireless communication network. A logged Minimization of Drive Tests MDT measurement configuration is provided for a communication device, wherein the logged MDT measurement configuration identifies a plurality of MDT measurement frequencies. An early measurement configuration is provided for the communication device, wherein the early measurement configuration identifies a plurality of early measurement frequencies including a first early measurement frequency. A logged MDT measurement report is received from the communication device in accordance with the logged MDT measurement configuration, wherein the logged MDT measurement report includes signal measurements for the plurality of MDT measurement frequencies, a signal measurement for the first early measurement frequency, and an indication of a condition to stop early measurement for the first early measurement frequency.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 2A and 2B provide a message diagram illustrating early measurement reporting in LTE/NR IDLE mode during connection setup;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
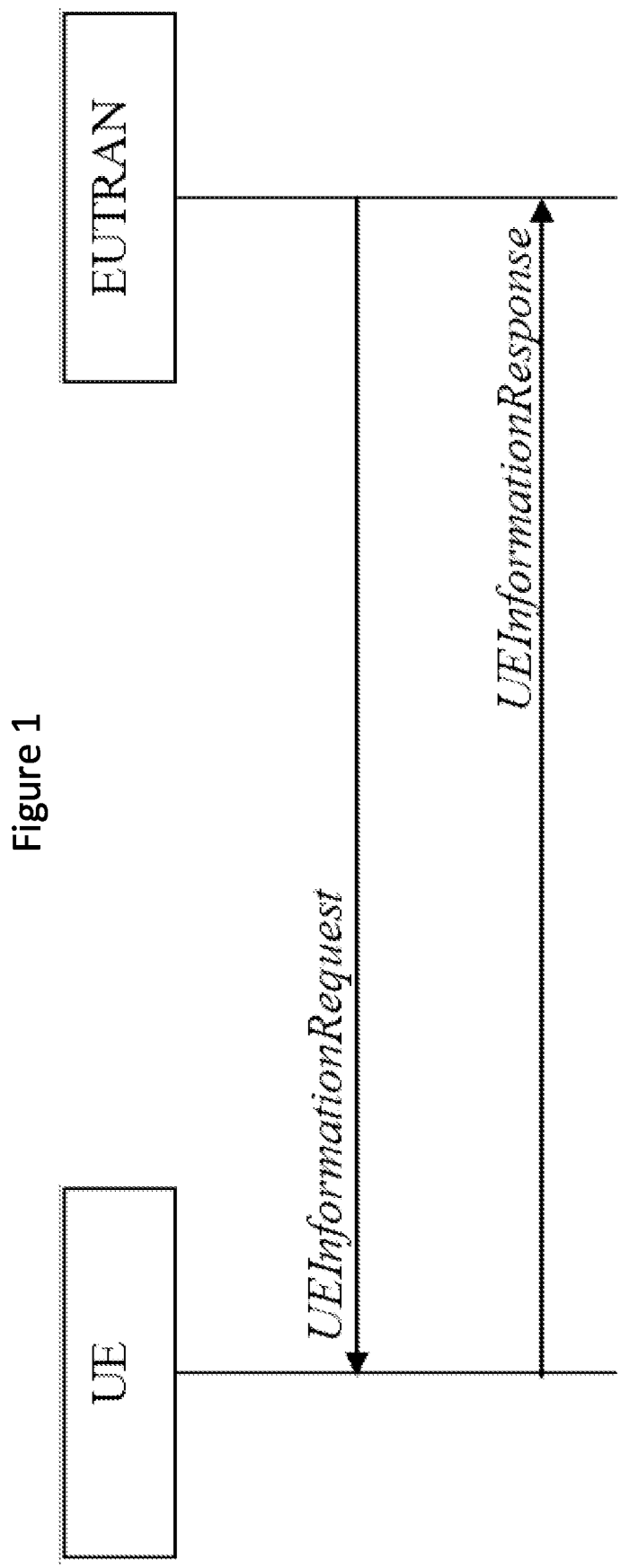
FIG. 1 is a message diagram illustrating UEInformationRequest and UEInformationResponse messages.
Figure 2A:
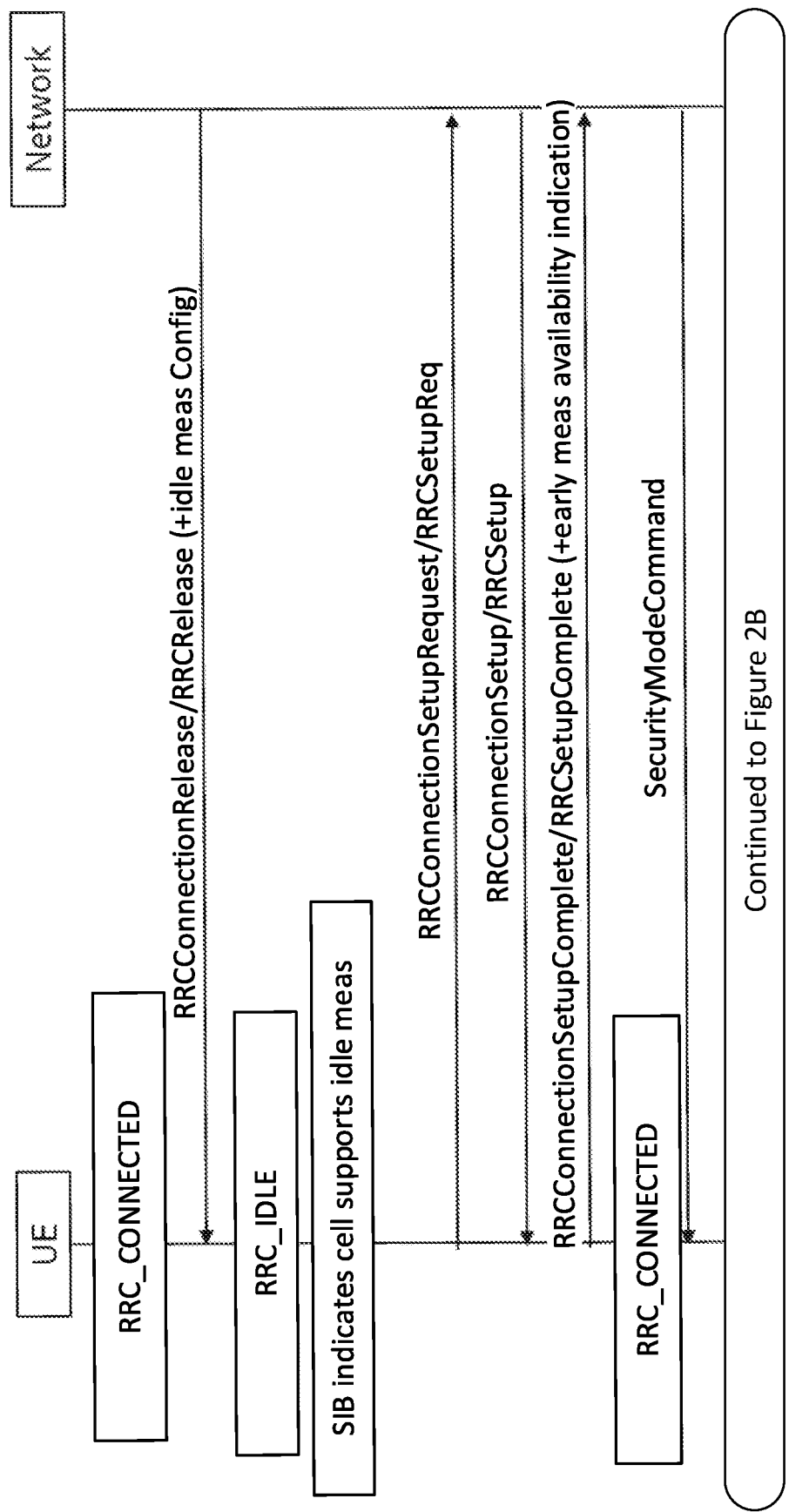
Figure 3:
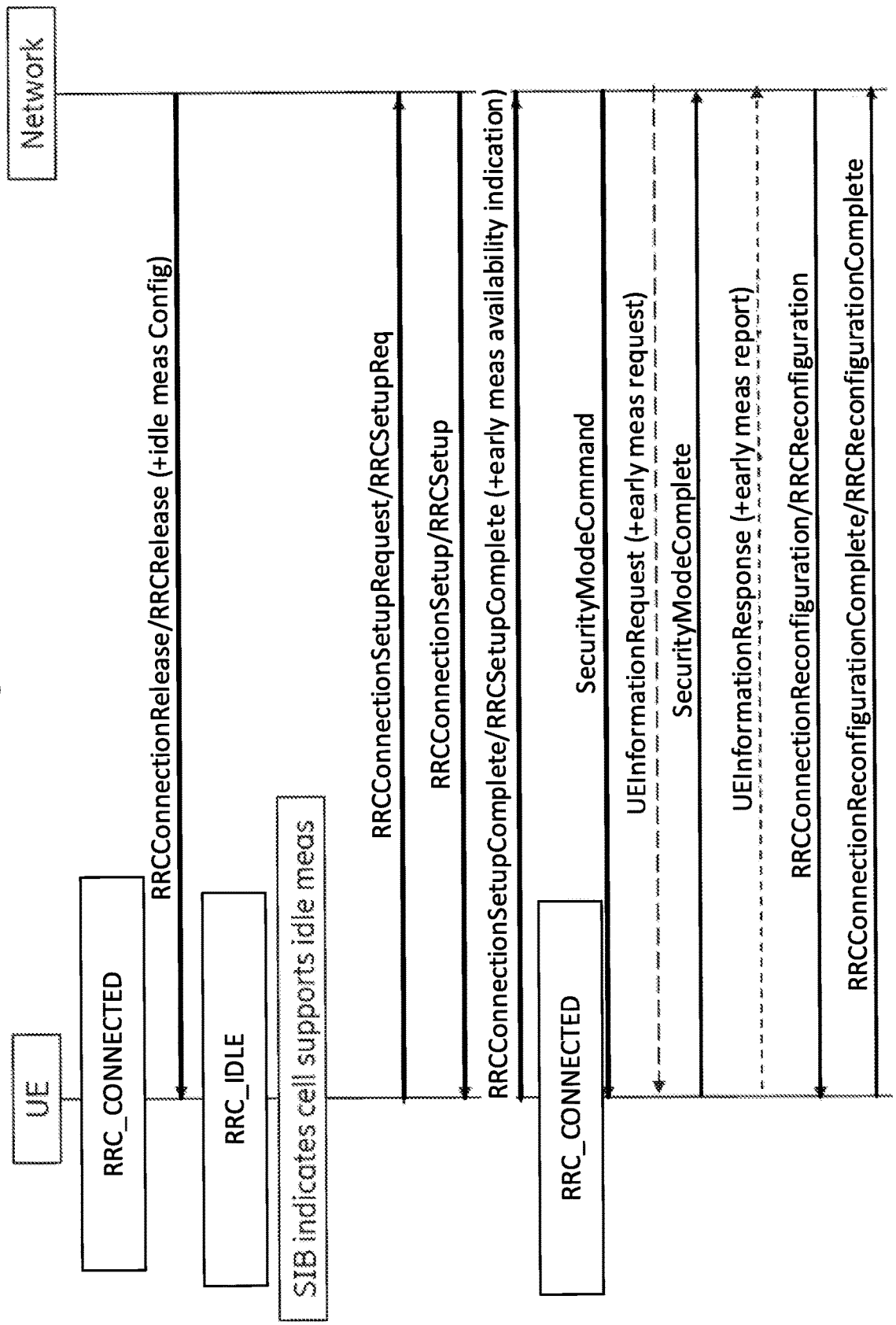
FIG. 3 provides a message diagram illustrating early measurement reporting in LTE/NR IDLE mode during connection setup.
Figure 4:
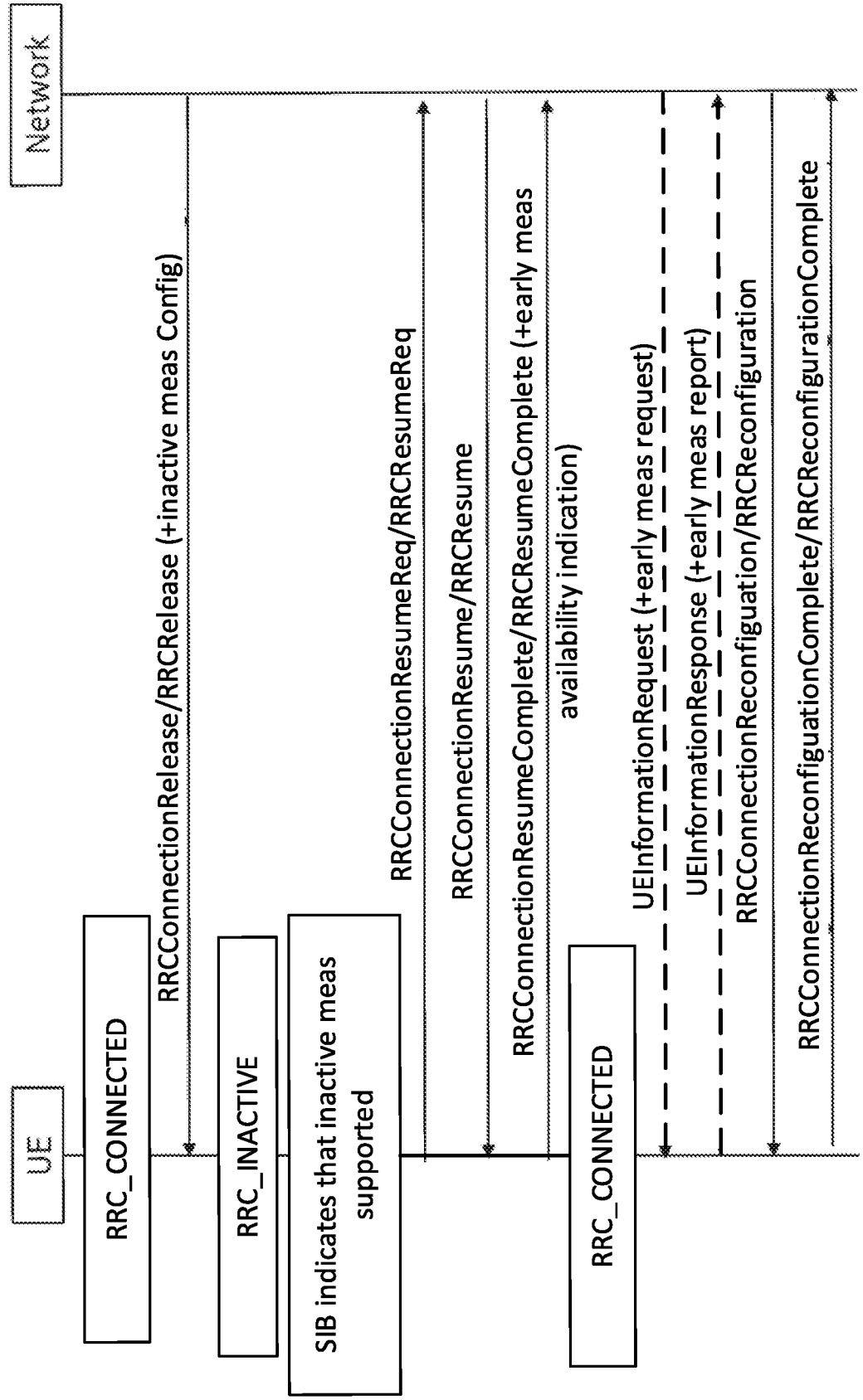
FIG. 4 provides a message diagram illustrating early measurement reporting in LTE IDLE with suspended, LTE INACTIVE mode or NR INACTIVE mode.
Figure 5:
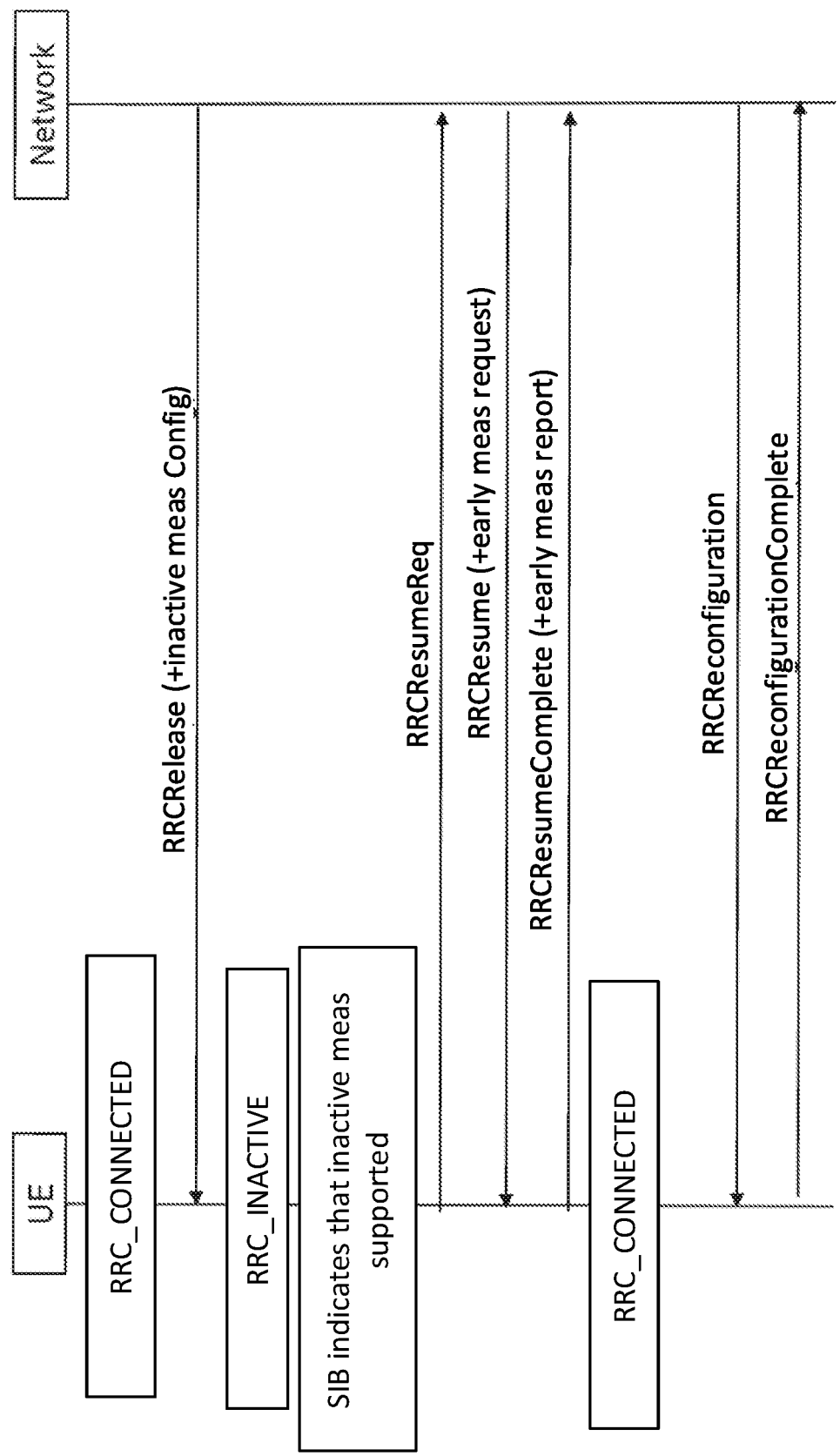
FIG. 5 provides a message diagram illustrating early measurement reporting in LTE INACTIVE, LTE IDLE with suspended and NR INACTIVE.
Figure 6:
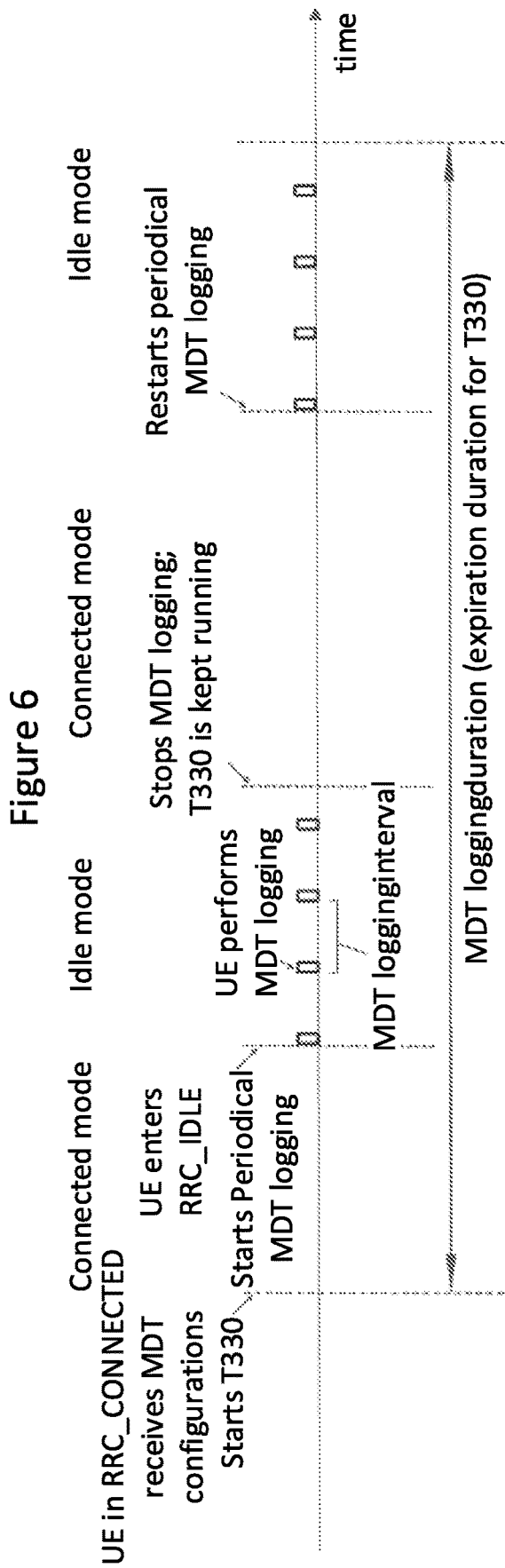
FIG. 6 provides a timing diagram illustrating an example of a logged MDT procedure.
Figure 7:
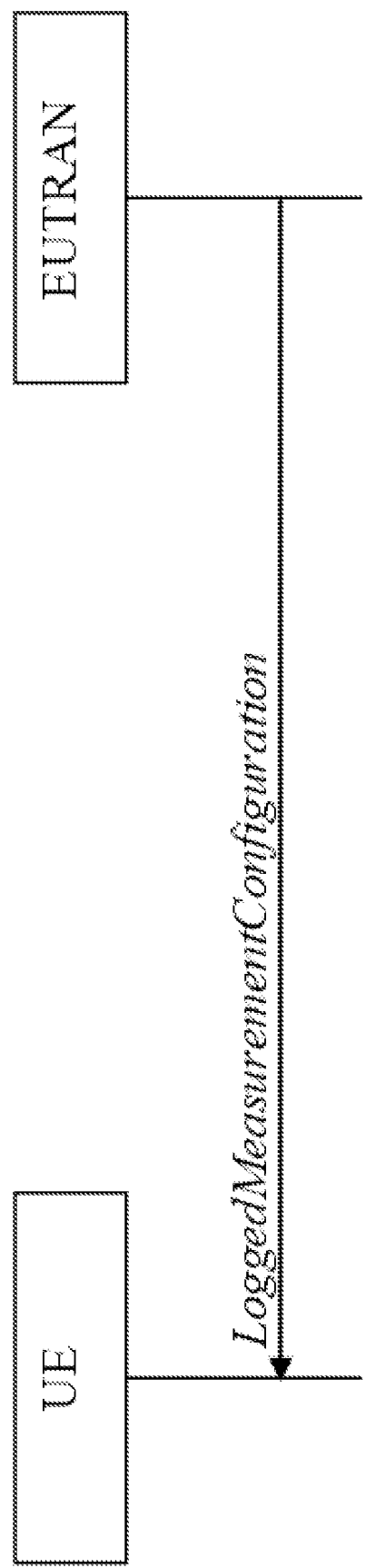
FIG. 7 is a message diagram illustrating a Logged measurement configuration message transmitted from EUTRAN to the UE.
Figure 8:
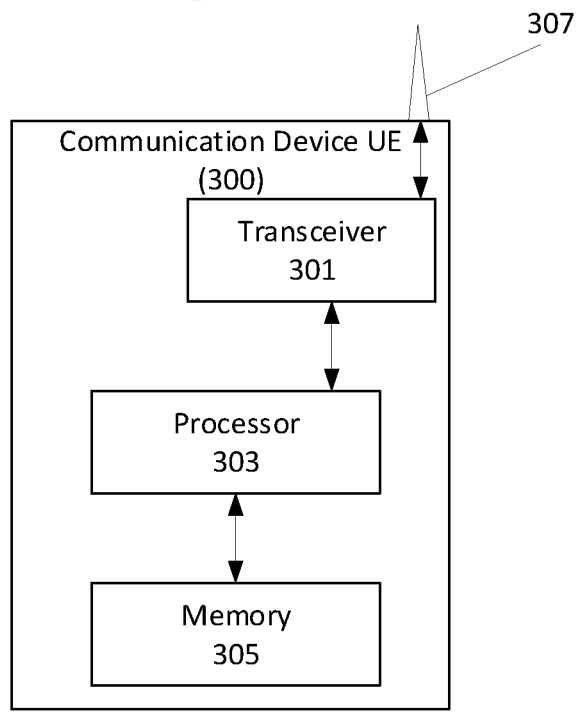
FIG. 8 is a block diagram illustrating a communication device UE according to some embodiments of inventive concepts.

FIG. 8 is a block diagram illustrating elements of a communication device UE 300 (also referred to as a wireless device, a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 300 may be provided, for example, as discussed below with respect to wireless device 4110 of FIG. 20.) As shown, communication device UE may include an antenna 307 (e.g., corresponding to antenna 4111 of FIG. 20), and transceiver circuitry 301 (also referred to as a transceiver, e.g., corresponding to interface 4114 of FIG. 20) including a transmitter and a receiver configured to provide uplink and downlink radio communications with a base station(s) (e.g., corresponding to network node 4160 of FIG. 20, also referred to as a RAN node) of a radio access network. communication device UE may also include processing circuitry 303 (also referred to as a processor, e.g., corresponding to processing circuitry 4120 of FIG. 20) coupled to the transceiver circuitry, and memory circuitry 305 (also referred to as memory, e.g., corresponding to device readable medium 4130 of FIG. 20) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. communication device UE may also include an interface (such as a user interface) coupled with processing circuitry 303, and/or communication device UE may be incorporated in a vehicle.

As discussed herein, operations of communication device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to communication devices).

Figure 9:
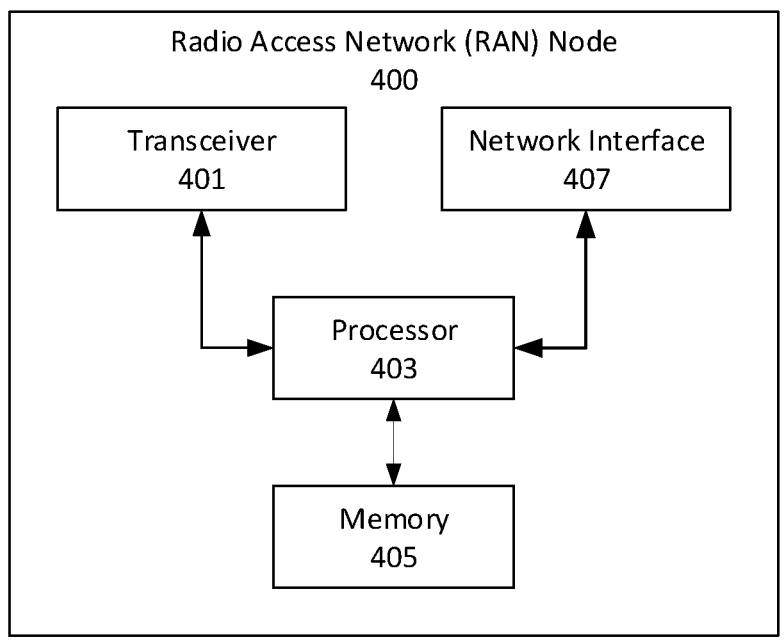
FIG. 9 is a block diagram illustrating a radio access network RAN node (e.g., a base station eNB/gNB) according to some embodiments of inventive concepts.

FIG. 9 is a block diagram illustrating elements of a radio access network RAN node 400 (also referred to as a network node, base station, eNodeB/eNB, gNodeB/gNB, etc.) of a Radio Access Network (RAN) configured to provide cellular communication according to embodiments of inventive concepts. (RAN node 400 may be provided, for example, as discussed below with respect to network node 4160 of FIG. 20.) As shown, the RAN node may include transceiver circuitry 401 (also referred to as a transceiver, e.g., corresponding to portions of interface 4190 of FIG. 20) including a transmitter and a receiver configured to provide uplink and downlink radio communications with mobile terminals. The RAN node may include network interface circuitry 407 (also referred to as a network interface, e.g., corresponding to portions of interface 4190 of FIG. 20) configured to provide communications with other nodes (e.g., with other base stations) of the RAN and/or core network CN. The network node may also include processing circuitry 403 (also referred to as a processor, e.g., corresponding to processing circuitry 4170) coupled to the transceiver circuitry, and memory circuitry 405 (also referred to as memory, e.g., corresponding to device readable medium 4180 of FIG. 20) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the RAN node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to RAN nodes).

According to some other embodiments, a network node may be implemented as a core network CN node without a transceiver. In such embodiments, transmission to a communication device UE may be initiated by the network node so that transmission to the communication device is provided through a network node including a transceiver (e.g., through a base station or RAN node). According to embodiments where the network node is a RAN node including a transceiver, initiating transmission may include transmitting through the transceiver.

To aid the measurement collection of early measurement configuration in logged MDT, R2-1915734 proposes an approach wherein the UE can be instructed to log measurements associated with the early measurement configuration in the logged MDT measurement report.

However, several details may need to be addressed to provide that the measurements logged based on early measurements can be interpreted correctly by the OAM, and to provide that they will not generate misleading information regarding the coverage map of the network.

A first issue may be that when the UE is configured with qualityThreshold in the early measurement configuration, the UE may include in the early measurement report only those cells whose measurement quantities are above the threshold.

A second issue may be that since the UE may receive part of or all of the early measurement configuration via broadcast signalling (e.g. list of carriers to be measured, the measurement configuration such as SSB configuration for the carrier frequencies, etc), the early measurement configuration can change when the UE performs cell re-selection (or even while staying in a given cell, if the current cell updates the SIBs that it is broadcasting). In such scenarios, the UE may include possibly different frequency related measurements at different time instants based on the current configuration at that cell/time of logging.

Some embodiments of inventive concepts may provide mechanisms to address issues that may arise due to the incomplete information provided by early measurement results that may not contain the measurements on a certain carrier/RAT, not because there is no coverage of that carrier/RAT, but because the currently specified early measurement behavior that depends on UE measurement configuration and network broadcast information is making the UE not measure/report those carriers.

According to some embodiments of inventive concepts, proposed mechanisms may include approaches to address the issues noted above.

According to some embodiments of inventive concepts, the UE can be configured to include the measurements associated with the early measurements in the logged MDT report even though these measurements are below the configured threshold associated with early measurements.

According to some other embodiments of inventive concepts, the UE may include the early measurement configuration in the logged MDT report so that the OAM can map the early measurement reports included in the logged MDT report with the corresponding early measurement configuration. This can be done explicitly or implicitly as provided in the following disclosure.

According to some embodiments of inventive concepts, the inclusion of early measurement results in logged MDT measurement reports may enable a more complete coverage map of the network, considering different frequencies/RATs. This is because early measurements are not impacted by cell re-selection measurement parameters (e.g. SintraSearch and SnonintraSearch), frequency/RAT/cell prioritization, whether the cell is candidate for cell re-selection or not (e.g. NSA cell, cell currently barred, for example, due to overload, etc.) By including additional information associated with early measurements being logged, such as the early measurement configuration, the OAM can quickly (compared to not including these early measurement related frequencies in the logged MDT) build up a more accurate coverage map of the network (e.g. from the logs OAM could find out that a certain frequency was not showing in the logged measurement result because a UE was not configured to measure it).

According to some embodiments of inventive concepts, the terms "early measurements", "idle mode measurements", and "idle/inactive measurements are used interchangeably. The terms "frequency" and "carrier" are used interchangeably. The terms "released" and "suspended" are used interchangeably. The term "dormant state" is used to describe IDLE or INACTIVE states. According to some embodiments, methods may be equally applicable to LTE and NR.

UE embodiments are discussed below.

Some embodiments of inventive concepts may provide methods executed by a user equipment (UE) in relation to measurements and measurement logging, including:

Receiving an early measurement configuration to be performed while in dormant state, which specifies what carriers/RATs the UE should measure while in dormant state (this could include E-UTRA and/or NR carriers):
Dedicated configuration received in the RRCRelease/RRCConnectionRelease message; and/or
Broadcasted configuration (e.g. in System Information Block (SIB))

Receiving a timer information in the RRCRelease/RRCConnectionRelease message specifying for how long the UE should perform the early measurement on the configured carriers/RATs to be measured.

receiving a logged MDT measurement configuration (while in RRC_CONNECTED) that includes one or more of the following:
Logging duration, specifying for how long the UE should keep logging measurements
Logging interval, specifying the amount of time the UE waits between logging the measurements while the logging duration still has not expired
An indicator as to whether the early measurements'-based results shall be included in the logged MDT results or not.
An indicator as to whether the quantityThrehsold configured in the early measurement configuration is also applicable to the early measurement related logging in the logged MDT or not (where the UE is configured to include measurements associated with early measurements in the logged MDT report even though these measurements may be below the configured threshold associated with early measurements).
In one alternative, this is not an explicit configuration from the network side and the UE always stores the measurements associated to early measurements independent of the quantityThrehsold
In another alternative, the UE may include only those measurements that are above the quantityThrehsold (i.e. legacy early measurement behavior).
Another alternative, if the UE is configured to log early measurements in the MDT log, then the UE behavior of early measurement performance may be modified such that UE will ignore the quantityThreshold when performing early measurements (i.e. even for the results to be reported for the sake of early measurement, quantityThreshold will not be considered and all detected cells/frequencies will be included)

Starting the timer T330 with the value of the received logging duration

Transitioning to a dormant state (i.e. LTE/NR IDLE, LTE IDLE with suspended, LTE/NR INACTIVE) up on receiving an RRCConnectionRelease/RRCRelease message.

Starting the timer T331 with the value of the received early measurement duration.

While in a dormant state:
Performing the early measurements as specified by the early measurement configuration
Logging the early measurements in the logged measurement results. There are several alternatives in doing so:
Log the early measurements, whenever a new sample of early measurement is captured
Log the early measurements only at the MDT logging intervals (i.e. the latest samples/available measurements at that time)
This could be the latest early measurement available at that time, or all early measurement results that have been gathered since the last time early measurements were logged.
Which of the above logging options can be used can be left to UE, specified in 3GPP specifications, or a configurable UE behavior (e.g. indicated in the early measurement of logged MDT configurations).
Logging the early measurement related configuration indication in the logged MDT in one of the following ways (e.g., when the UE includes the early measurement configuration in the logged MDT repot so that the OAM can map the early measurement reports included in the logged MDT report with the corresponding early measurement configuration):
- Log the early measurement configuration itself (explicit method)
  - The UE logs one or more of the cells/frequencies configured for early measurements as well as additional early measurement configurations such as quantityThreshold, validity area, the duration for which this configuration is applicable (i.e. measIdleDuration)
  - If the UE receives multiple early measurement configuration during the MDT logging duration (e.g. UE has performed cell re-selection), the UE stores these configurations and the associated reports in the chronological order:
    - In one alternative, the UE includes the current early measurement configuration each time a result related to early measurements is stored in the logged MDT (i.e. configuration, results pairs)
    - The above may result in the same measurement configuration being repeated several times if several results were captured while the measurement configuration remains the same. In another alternative, the UE includes the early measurement configuration in the MDT log the first time the UE gets released and whenever it changes (e.g. due to cell re-selection) (optionally, with a timestamp indicating when this early measurement has become valid. Any early measurement logged until another entry of an early measurement configuration can then be interpreted as an early measurement performed based on that configuration.
- Log the measurements associated to each frequency configured in the early measurement configuration at every time instance when the measurements associated to early measurement configuration is included in the logged MDT report is included (i.e. even if a measurement for that frequency is not available at that time). That way, the OAM can implicitly determine which frequencies the UE is configured to measure without having an explicit measurement configuration.
  - However, some details that are available via explicit indication (like validity area, measIdleDuration) will be lacking, and the network will not be sure when early measurement reporting has been stopped being performed by the UE. In one alternative, the UE will enter some predefined entry(ies) in the logged MDT to indicate that it has stopped performing early measurement (at least for that period while in dormant state, but it may re-start the early measurement if it goes to connected mode and back to idle mode again while the logged MDT duration has not expired)
- Stopping the timer T331 when it expires and stopping the early measurements
  - In one alternative, UE continues to perform early measurements, based on UE implementation, after T331 has expired
  - In such a case, there are several alternatives on how to incorporate the early measurements captured before and after the expiry of T331
    - Only early measurement results gathered before T331 has expired are included in the logged MDT measurements
    - Only early measurement results gathered after T331 has expired are included in the logged MDT measurements
    - Early measurement results are included in the logged MDT measurements, regardless of whether they were captured before or after the expiry of T331
    - Early measurement results are included in the logged MDT measurements, regardless of whether they were captured before or after the expiry of T331, but there is an indication whether they were captured before or after the expiry of T331
    - Which of the above behavior to apply could be specified in the standards, left to UE implementation, or can be configurable by the network.
- Transitioning to RRC_CONNECTED state (e.g. upon the arrival of UL data, paging due to DL data, need to update tracking area, etc)
  - Sending the RRCConnectionResumeRequest/RRCResumeRequest or RRCConnectionSetupRequest/RRCSetupRequest message to the network
  - Transitioning to the RRC_CONNECTED state upon receiving RRCConnectionResume/RRCResume or RRCConnectionSetup/RRCSetup message from the network
  - In one alternative embodiment, after transitioning to the RRC_CONNECTED mode, the UE puts the available/valid early measurements into the logged MDT report
    - This requires the UE to keep the additional information along with the early measurements such as the servCellIdentity of the cell the UE was camping when a specific measurement was taken, location information, time information, etc, that are required for MDT logging but not for early measurement reporting.
- Stopping the timer T330 when it expires and stopping the MDT measurement logging
- Receiving a UEInformationRequest that includes the logMeasReportReq, and reporting the logged MDT measurements in UEInformationResponse, which includes measurements performed based on LoggedMeasurementConfiguration as well as measIdleConfig, and possibly including early measurement configuration(s) related to the logged early measurement results.

Additional UE embodiments:
- Current 3gpp working assumption is that the UE will delete early measurement results when they are outdated, where the duration for being considered outdated to be specified in RAN4 measurement requirements (e.g. early measurements older than x seconds will not be reported). This is an important consideration for early measurements to ensure that the network will not try to setup the UE with CA/DC based on older measurements that were gathered at a different location than where the UE is located at the moment as the UE may not even be in the coverage of the reported frequencies/cells. However, for the sake of logged MDT, any early measurement result is useful as long as the location/time information where the early measurements were captured is also available or can be inferred. Thus, in one alternative, when the UE is configured for early measurements and logged MDT at the same time, the UE may keep the early measurement results for including them in the next logging duration, along with the location/time they were captured, but may not report them for early measurement reporting on transition to CONNECTED mode.

In LTE, the following two parameters control the size of the logged MDT measurements maxLogMeas-r10 (with a value of 4060), specifying the maximum number of logged measurement entries the UE can store maxLogMeasReport-r10 (with a value of 520), specifying the maximum number of logged measurement entries the UE can report in one message In one alternative, the maximum size of the early measurement results that can be stored by the UE as part of the logged MDT measurements are specified. This can be done similar to the above case (e.g. maxLogEarlyMeasMDT-r16 and maxLogEarlyMeasReportMDT-r16) that limit the maximum number of early measurements entries the UE can store in the logged MDT and the maximum number of early measurement entries the UE can report in one message.

These parameters could be part of the whole logged MDT size limit (e.g. maxLogEarlyMeasMDT=x means that the UE could store still only up to a maximum of 4060 measurement entries in the logged MDT, of which x could be related to early measurements), or additional entries (e.g. maxLogEarlyMeasMDT=x means that the UE could store up to a maximum of 4060+x measurement entries in the logged MDT, of which x could be related to early measurements).

Yet another way could be specifying the limitations in term of percentage of the maxLogMeas. Example 1: maxLogEarlyMeasMDT=x % means that the UE could store only up to a maximum of 4060 measurement entries in the logged MDT, of which x % could be related to early measurements. Example 2: maxLogEarlyMeasMDT=x % means that the UE could store up to a maximum of (1+x)*4060 measurement entries in the logged MDT, of which x*4060 could be related to early measurements Network embodiments are discussed below.

Some embodiments of inventive concepts may provide methods executed by a network node in relation to measurements and measurement logging by a UE, specifically:

Configuring the UE with early measurements and logged measurement configuration that includes the different configurations/options/parameters/indications discussed above with respect to UE embodiments.

Controlling the state transitions of the UE

Sending the UE to a dormant state based on several aspects such as UE inactivity Bringing the UE to a connected state based on several aspects like a resume/setup request from the UE (due to arrival of UL data, UE responding to a paging regarding a DL data, etc.)

Once a UE is in a connected state, requesting early measurements report

Receiving the early measurement report

Once a UE is in a connected state, requesting logged MDT measurements

Receiving the logged MDT measurements that contain early measurement results

Forwarding the measurements to an OAM node/entity

Example realization is discussed below according to some embodiments of inventive concepts.

An example of ASN.1 coding as well as procedural changes is provided to enable some embodiments for NR (i.e. 38.331). LTE (36.331) could be enhanced in a similar principle.

According to some embodiments of inventive concepts, a new flag informs the UE whether it should log all the early measurements independent of the qualityThreshold or not.

In such embodiments, a LoggedMeasurementConfiguration message may be provided as illustrated below in Table 5.

TABLE 5

| LoggedMeasurementConfiguration Message |
|---|

```
-- ASN1START
-- TAG-LOGGEDMEASUREMENTCONFIGURATION-START
LoggedMeasurementConfiguration-r16 ::=      SEQUENCE {
    criticalExtensions                      CHOICE {
        loggedMeasurementConfiguration          LoggedMeasurementConfiguration-r16-IEs,
        criticalExtensionsFuture                SEQUENCE { }
    }
}
LoggedMeasurementConfiguration-r16-IEs ::=  SEQUENCE {
    traceReference-r16                      TraceReference-r16,
    traceRecordingSessionRef-r16            OCTET STRING (SIZE (2)),
    tce-Id-r16                              OCTET STRING (SIZE (1)),
    absoluteTimeInfo-r16                    AbsoluteTimeInfo-r16,
    areaConfiguration-r16                   AreaConfiguration-r16           OPTIONAL, --Need R
    plmn-IdentityList-r16                   PLMN-IdentityList3-r16          OPTIONAL, --Need R
    bt-NameList-r16                         BT-NameListConfig-r16           OPTIONAL, --Need R
    wlan-NameList-r16                       WLAN-NameListConfig-r16
                                                                            OPTIONAL, --Need R
    sensor-NameList-r16                     Sensor-NameListConfig-r16
                                                                            OPTIONAL, --Need R
    reportType                              CHOICE {
        periodical                              LoggedPeriodicalReportConfig,
        eventTriggered                          LoggedEventTriggerConfig
    }
    includeEarlyMeas                        ENUMERATED {true}               OPTIONAL,
    qualityThresholdApplicability           ENUMERATED {true}               OPTIONAL
}
LoggedPeriodicalReportConfig ::=            SEQUENCE {
    loggingDuration-r16                         LoggingDuration-r16,
    loggingInterval-r16                         LoggingInterval-r16
}
LoggedEventTriggerConfig ::=                                                SEQUENCE {
    eventType-r16                               EventType-r16,
```

TABLE 5-continued

| LoggedMeasurementConfiguration Message |
|---|
| ```
        loggingDuration-r16                       LoggingDuration-r16,
        loggingInterval-r16                       LoggingInterval-r16
}
EventType-r16 ::=      CHOICE {
        outOfCoverage                             BOOLEAN,
        eventA2                                   SEQUENCE {
            a2-Threshold                              MeasTriggerQuantity,
            hysteresis                                Hysteresis,
            timeToTrigger                             TimeToTrigger
    },
    ...
}
-- TAG-LOGGEDMEASUREMENTCONFIGURATION-STOP
-- ASN1STOP
``` |

As shown, the "qualityThresholdApplicability" information element is provided to indicate whether the UE should log all the early measurements independent of the qualityThreshold or not.

According to some embodiments of inventive concepts illustrated below in Table 6, the UE may include the early measurement configuration and the associated measurement reports in the logged MDT report (explicit indication of early measurement configuration). In this embodiment, if there are no measurements available on a frequency for which the early measurement is configured, the UE does not include the LogEarlyMeasFreq for those frequencies.

TABLE 6

```
LogMeasReport-r16 ::=              SEQUENCE {
    absoluteTimeStamp-r16              AbsoluteTimeInfo-r16,
    traceReference-r16                 TraceReference-r16,
    traceRecordingSessionRef-r16       OCTET STRING (SIZE (2)),
    tce-Id-r16                         OCTET STRING (SIZE (1)),
    logMeasInfoList-r16                LogMeasInfoList-r16,
    logMeasAvailable-r16               ENUMERATED {true}          OPTIONAL,
    logMeasAvailableBT-r16             ENUMERATED {true}          OPTIONAL,
    logMeasAvailableWLAN-r16           ENUMERATED {true}          OPTIONAL,
    ...,
    earlyMeasConfig-r17                EarlyMeasConfigList-r17    OPTIONAL,
    ...
}
LogMeasInfoList-r16 ::=            SEQUENCE (SIZE (1..maxLogMeasReport-r16)) OF
                                       LogMeasInfo-r16
LogMeasInfo-r16 ::=                SEQUENCE {
    locationInfo-r16                   LocationInfo-r16          OPTIONAL,
    relativeTimeStamp-r16              INTEGER (0..7200),
    servCellIdentity-r16               CGI-InfoNR,
    measResultServingCell-r16          MeasResultServingCell-r16,
    measResultNeighCells-r16           SEQUENCE {
       measResultNeighCellListNR          MeasResultList2NR-r16
                                                                   OPTIONAL,
       measResultNeighCellListEUTRA       MeasResultList2EUTRA-r16
                                                                   OPTIONAL,
    },
    anyCellSelectionDetected-r16       ENUMERATED {true}         OPTIONAL,
    logEarlyMeas-r17                   LogEarlyMeas-r17          OPTIONAL
}
LogEarlyMeas-r17 ::=               SEQUENCE (SIZE (1.. maxEarlyMeasFreq-r16)) OF
                                       LogEarlyMeasFreq-r17
LogEarlyMeasFreq-r17 ::+32         SEQUENCE {
    ssbFrequency-r17                   ARFCN-ValueNR             OPTIONAL,
    measResultList-r17                 MeasResultListNR
}
EarlyMeasConfigList-r17 ::=        SEQUENCE (SIZE (1..maxEarlyMeasConfig-r17)) OF
                                       EarlyMeasConfig-r17
EarlyMeasConfig-r17 ::=            SEQUENCE {
    measIdleCarrierListNR-r17          NR-CarrierList-r17        OPTIONAL, -- Need OR
    measIdleDurationNR-r17             ENUMERATED {sec10, sec30, sec60, sec120,
}
EUTRA-CarrierList-r17 ::= SEQUENCE (SIZE (1..maxFreqIdle-r17)) OF
                                       MeasIdleCarrierEUTRA-r17
MeasIdleCarrierEUTRA-r17::=        SEQUENCE {
    carrierFreq-r17                    ARFCN-ValueNR,
    allowedMeasBandwidth-r17           AllowedMeasBandwidth,
    validityArea-r17                   CellList                  OPTIONAL, -- Need OR
    measCellList-r17                   CellList                  OPTIONAL, -- Need OR
```

TABLE 6-continued

| | | |
|---|---|---|
| reportQuantities | ENUMERATED {rsrp, rsrq, both}, | |
| qualityThreshold-r17 | SEQUENCE { | |
|   idleRSRP-Threshold-r17 | RSRP-Range | |
| | | OPTIONAL, -- Need OR |
|   idleRSRQ-Threshold-r17 | RSRQ-Range | |
| | | OPTIONAL -- Need OR |
| } | | OPTIONAL, -- Need OP |
| ... | | |
| } | | |

According to some embodiments of inventive concepts illustrated below in Table 7, the UE may include the measurements related to early measurement configuration associated to all the frequencies and cells in the early measurement configuration and the measurement report may also include an indicator for the reason for lack of coverage on one of these frequencies or cells (implicit indication of the early measurement configuration). In this embodiment, if there is no measurement available on a frequency for which the early measurement is configured, the UE still includes the associated LogEarlyMeasFreq but the measResultList will be empty or with lowest value of RSRP values.

early measurement configuration includes a received signal threshold (e.g., qualityThreshold) for early measurement reports.

At block 2405, processing circuitry 303 may receive (through transceiver 301) a logged Minimization of Drive Tests MDT measurement configuration from the wireless communication network.

At block 2409, processing circuitry 303 may receive (through transceiver 301) a release message from the wireless communication network. The release message may be a Radio Resource Control RRC connection release message or an RRC release message.

TABLE 7

```
LogMeasReport-r16 ::=      SEQUENCE {
  absoluteTimeStamp-r16            AbsoluteTimeInfo-r16,
  traceReference-r16               TraceReference-r16,
  traceRecordingSessionRef-r16     OCTET STRING (SIZE (2)),
  tce-Id-r16                       OCTET STRING (SIZE (1)),
  logMeasInfoList-r16              LogMeasInfoList-r16,
  logMeasAvailable-r16             ENUMERATED {true}     OPTIONAL,
  logMeasAvailableBT-r16           ENUMERATED {true}     OPTIONAL,
  logMeasAvailableWLAN-r16         ENUMERATED {true}     OPTIONAL,
  ...
}
LogMeasInfoList-r16 ::=    SEQUENCE (SIZE (1..maxLogMeasReport-r16)) OF
                             LogMeasInfo-r16
LogMeasInfo-r16 ::=        SEQUENCE {
  locationInfo-r16                 LocationInfo-r16      OPTIONAL,
  relativeTimeStamp-r16            INTEGER (0..7200),
  servCellIdentity-r16             CGI-InfoNR,
  measResultServingCell-r16        MeasResultServingCell-r16,
  measResultNeighCells-r16         SEQUENCE {
    measResultNeighCellListNR        MeasResultList2NR-r16      OPTIONAL,
    measResultNeighCellListEUTRA     MeasResultList2EUTRA-r16
                                                                OPTIONAL,
  },
  anyCellSelectionDetected-r16     ENUMERATED {true}     OPTIONAL,
  logEarlyMeas-r17                 LogEarlyMeas-r17      OPTIONAL
}
LogEarlyMeas-r17 ::=       SEQUENCE (SIZE (1.. maxEarlyMeasFreq-r16)) OF
                             LogEarlyMeasFreq-r17
LogEarlyMeasFreq-r17 ::=   SEQUENCE {
  ssbFrequency-r17                 ARFCN-ValueNR         OPTIONAL,
  measResultList-r17               MeasResultListNR
}
```

Operations of the communication device 300 (implemented using the structure of the block diagram of FIG. 8) will now be discussed with reference to the flow chart of FIG. 10 according to some embodiments of inventive concepts. For example, modules may be stored in memory 305 of FIG. 8, and these modules may provide instructions so that when the instructions of a module are executed by respective communication device processing circuitry 303, processing circuitry 303 performs respective operations of the flow chart.

At block 2401, processing circuitry 303 may receive (through transceiver 301) an early measurement configuration from the wireless communication network, wherein the According to some embodiments, the early measurement configuration may be received as an element of the release message. According to some other embodiments, the early measurement configuration may be received as an element of a system information block broadcast from the wireless communication network.

At block 2411, processing circuitry 303 may transition the communication device to a dormant state in response to receiving the release message.

At block 2415, processing circuitry 303 may perform early measurements for a first plurality of frequencies in accordance with the early measurement configuration while in the dormant state to generate a first received signal measurement for a first frequency of the first plurality of frequencies and a second received signal measurement for a second frequency of the first plurality of frequencies, wherein the first received signal measurement for the first frequency satisfies the received signal threshold, and wherein the second received signal measurement for the second frequency fails to satisfy the received signal threshold.

At block 2419, processing circuitry 303 may perform MDT measurements for a second plurality of frequencies in accordance with the logged MDT measurement configuration while in the dormant state to generate received signal measurements for the second plurality of frequencies.

At block 2421, processing circuitry 303 may transition the communication device to a connected state.

At block 2425, processing circuitry may transmit (through transceiver 301) a logged MDT measurement report to the wireless communication network in accordance with the logged MDT measurement configuration while in the connected state, wherein the logged MDT measurement report includes the first received signal measurement for the first frequency, the second received signal measurement for the second frequency, and the received signal measurements for the second plurality of frequencies.

At block 2429, processing circuitry 303 may transmit (through transceiver 301) an early measurement report to the wireless communication network in accordance with the early measurement configuration, wherein the early measurement report includes the first received signal measurement responsive to the first received signal measurement satisfying the received signal threshold, and wherein the early measurement report omits the second received signal measurement responsive to the second received signal measurement failing to satisfy the received signal threshold.

According to some embodiments, the early measurement report may omit the received signal measurements for the second plurality of frequencies.

According to some embodiments, the logged MDT measurement report may include the early measurement configuration.

Figure 10:
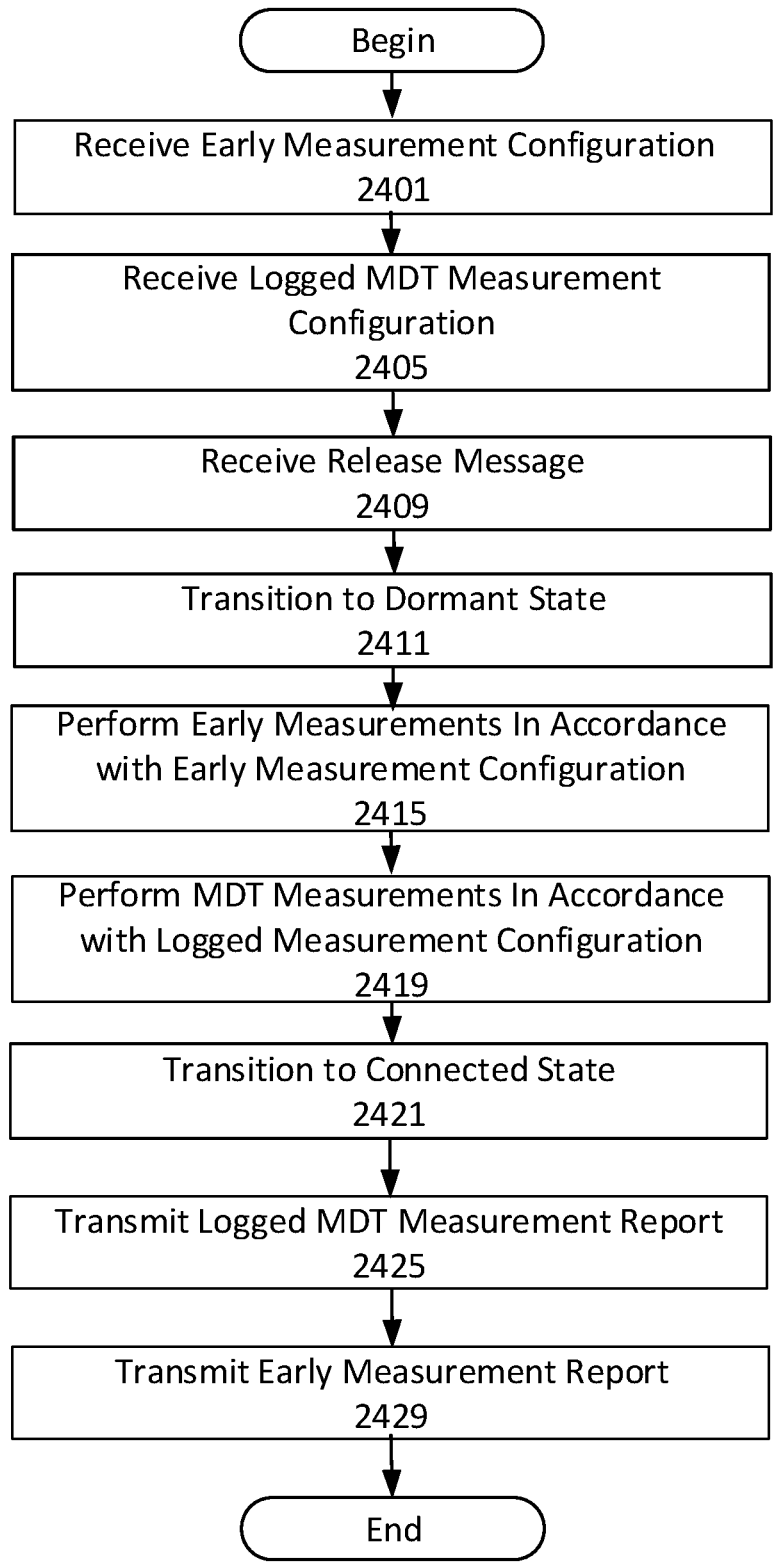
FIGS. 10, 11, 14, 15, and 18 are flow charts illustrating operations of a communication device according to some embodiments of inventive concepts.

Various operations from the flow chart of FIG. 10 may be optional with respect to some embodiments of communication devices and related methods. Regarding methods of example embodiment 1 (set forth below), for example, operations of blocks 2409 and/or 2429 of FIG. 10 may be optional.

Operations of the communication device 300 (implemented using the structure of the block diagram of FIG. 8) will now be discussed with reference to the flow chart of FIG. 11 according to some embodiments of inventive concepts. For example, modules may be stored in memory 305 of FIG. 8, and these modules may provide instructions so that when the instructions of a module are executed by respective communication device processing circuitry 303, processing circuitry 303 performs respective operations of the flow chart.

At block 2501, processing circuitry 303 may receive (through transceiver 301) a first early measurement configuration from the wireless communication network, wherein the first early measurement configuration includes a received signal threshold (e.g., qualityThreshold) for early measurement reports.

At block 2505, processing circuitry 303 may receive (through transceiver 301) a logged Minimization of Drive Tests MDT measurement configuration from the wireless communication network.

At block 2509, processing circuitry 303 may receive (through transceiver 301) a release message from the wireless communication network. The release message may be a Radio Resource Control RRC connection release message or an RRC release message.

According to some embodiments, the first early measurement configuration may be received as an element of the release message. According to some other embodiments, the first early measurement configuration may be received as an element of a system information block broadcast from the wireless communication network.

At block 2511, processing circuitry 303 may transition the communication device to a dormant state in response to receiving the release message.

At block 2513, processing circuitry 303 may receive a second early measurement configuration while in the dormant state after receiving the first early measurement configuration, wherein the first and second early measurement configurations are different.

At block 2515, processing circuitry 303 may perform early measurements for a first plurality of frequencies in accordance with the early measurement configuration while in the dormant state to generate a first received signal measurement for a first frequency of the first plurality of frequencies and a second received signal measurement for a second frequency of the first plurality of frequencies, wherein the first received signal measurement for the first frequency satisfies the received signal threshold, and wherein the second received signal measurement for the second frequency fails to satisfy the received signal threshold.

At block 2519, processing circuitry 303 may performing MDT measurements for a second plurality of frequencies in accordance with the logged MDT measurement configuration while in the dormant state to generate received signal measurements for the second plurality of frequencies.

At block 2521, processing circuitry 303 may transition the communication device to a connected state.

At block 2525, processing circuitry may transmit (through transceiver 301) a logged MDT measurement report to the wireless communication network in accordance with the logged MDT measurement configuration while in the connected state, wherein the logged MDT measurement report includes the first received signal measurement for the first frequency, the second received signal measurement for the second frequency, and the received signal measurements for the second plurality of frequencies.

At block 2529, processing circuitry 303 may transmit (through transceiver 301) an early measurement report to the wireless communication network in accordance with the early measurement configuration, wherein the early measurement report includes the first received signal measurement responsive to the first received signal measurement satisfying the received signal threshold, and wherein the early measurement report omits the second received signal measurement responsive to the second received signal measurement failing to satisfy the received signal threshold.

According to some embodiments, the early measurement report may omit the received signal measurements for the second plurality of frequencies.

According to some embodiments, the logged MDT measurement report may include the first early measurement configuration and the second early measurement configuration.

Figure 11:
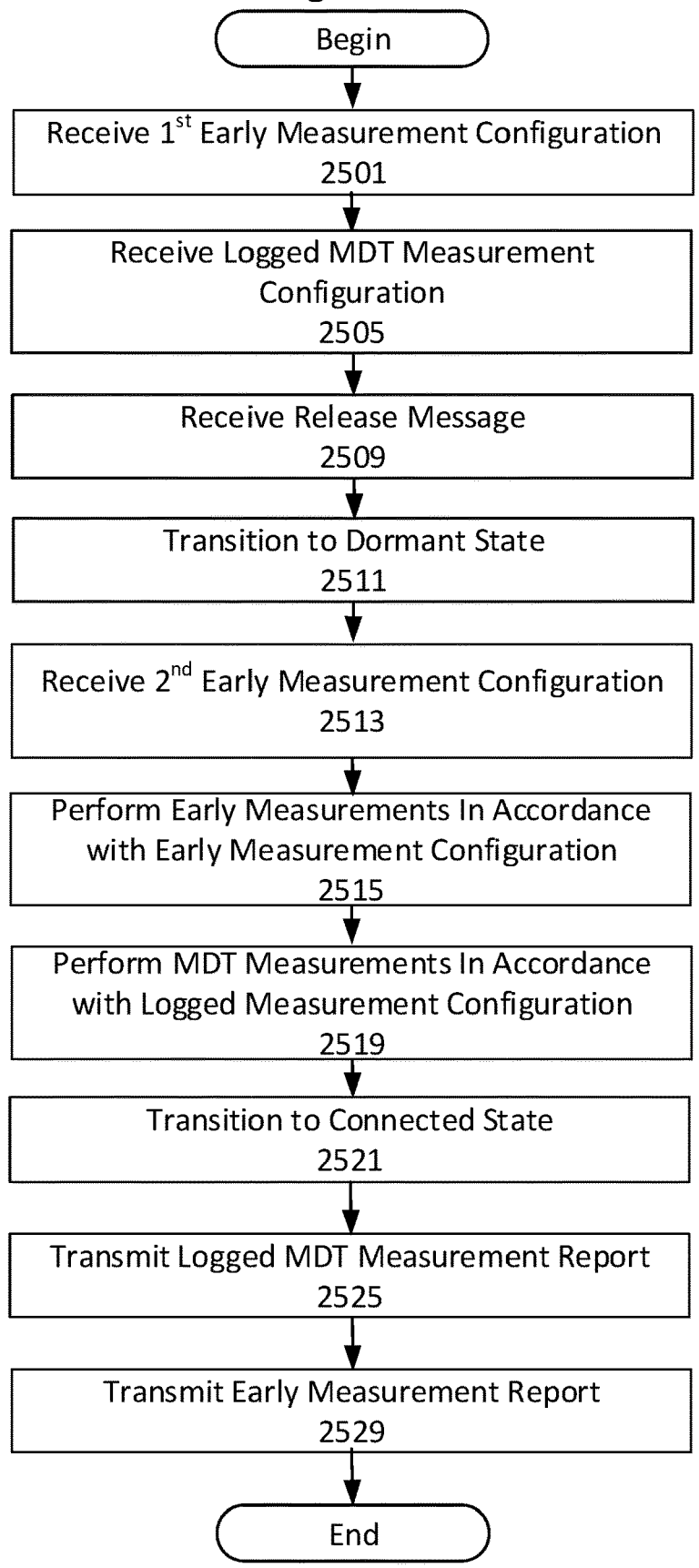

Various operations from the flow chart of FIG. 11 may be optional with respect to some embodiments of communication devices and related methods. Regarding methods of example embodiment 1 (set forth below), for example, operations of blocks 2509, 2513, and/or 2529 of FIG. 11 may be optional.

Operations of a RAN node 400 (implemented using the structure of FIG. 9) will now be discussed with reference to the flow chart of FIG. 12 according to some embodiments of inventive concepts. For example, modules may be stored in memory 405 of FIG. 9, and these modules may provide instructions so that when the instructions of a module are executed by respective RAN node processing circuitry 403, processing circuitry 403 performs respective operations of the flow chart.

At block 2601, processing circuitry 403 may transmit (through transceiver 401) an early measurement configuration to a communication device (300), wherein the early measurement configuration includes a received signal threshold (e.g., qualityThreshold) for early measurement reports.

At block 2605, processing circuitry 403 may transmit (through transceiver 401) a logged Minimization of Drive Tests MDT measurement configuration to the communication device.

At block 2609, processing circuitry 403 may transmit (through transceiver 401) a release message to the communication device, wherein the release message initiates transitioning of the communication device to a dormant state.

At block 2615, processing circuitry 403 may transmit (through transceiver 401) a resume message or a setup message to the communication device after transmitting the release message, wherein the resume message or the setup message initiates transitioning of the communication device to a connected state.

At block 2625, processing circuitry 403 may receive (through transceiver 401) a logged MDT measurement report from the communication device after transmitting the resume request message or the setup request message, wherein the logged MDT measurement report includes a plurality of signal measurements for a respective plurality of frequencies, and wherein the logged MDT measurement report includes the early measurement configuration.

At block 2629, processing circuitry 403 may receive (through transceiver 401) an early measurement report from the communication device in accordance with the early measurement configuration.

Figure 12:
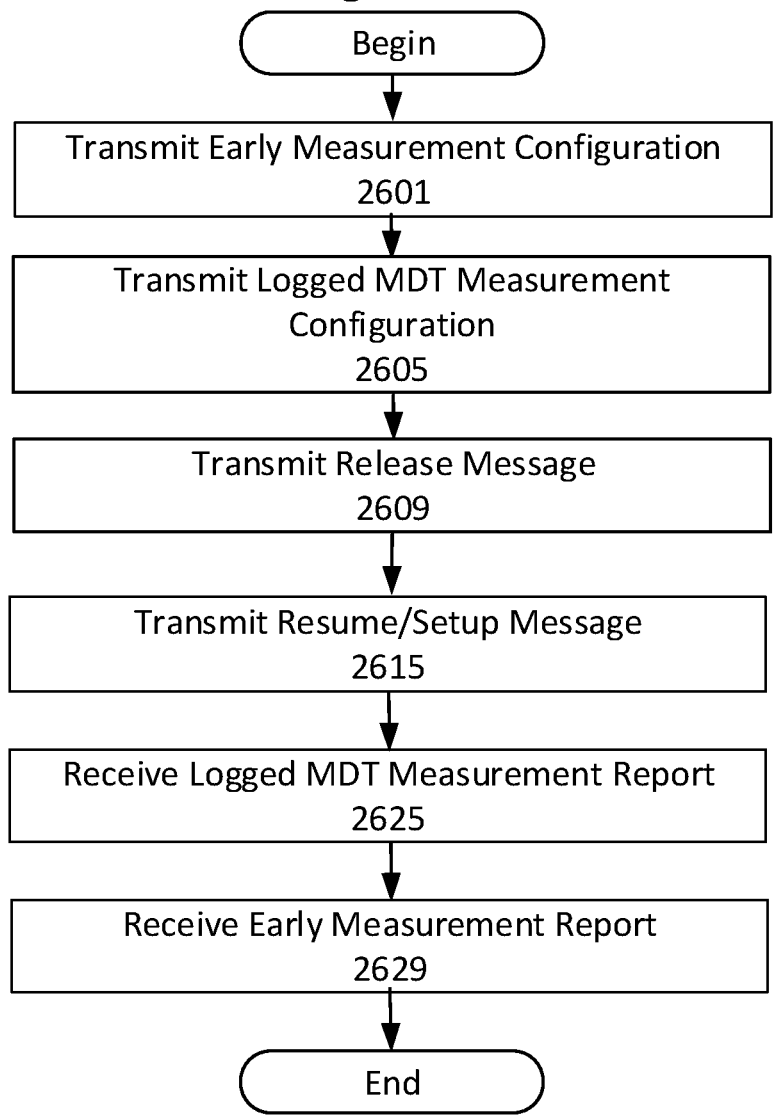
FIGS. 12, 13, 16, 17, and 19 are flow charts illustrating operations of a network node according to some embodiments of inventive concepts.

Various operations from the flow chart of FIG. 12 may be optional with respect to some embodiments of RAN nodes and related methods. Regarding methods of example embodiment 27 (set forth below), for example, operations of block 2629 of FIG. 12 may be optional.

Operations of a RAN node 400 (implemented using the structure of FIG. 9) will now be discussed with reference to the flow chart of FIG. 13 according to some embodiments of inventive concepts. For example, modules may be stored in memory 405 of FIG. 9, and these modules may provide instructions so that when the instructions of a module are executed by respective RAN node processing circuitry 403, processing circuitry 403 performs respective operations of the flow chart.

At block 2701, processing circuitry 403 may transmit (through transceiver 401) a first early measurement configuration to a communication device (300), wherein the early measurement configuration includes a received signal threshold (e.g., qualityThreshold) for early measurement reports.

At block 2705, processing circuitry 403 may transmit (through transceiver 401) a logged Minimization of Drive Tests MDT measurement configuration to the communication device.

At block 2709, processing circuitry 403 may transmit (through transceiver 401) a release message to the communication device, wherein the release message initiates transitioning of the communication device to a dormant state.

At block 2713, processing circuitry 403 may transmit (through transceiver 401) a second early measurement configuration while the communication device is in the dormant state after transmitting the first early measurement configuration, wherein the first and second early measurement configurations are different.

At block 2715, processing circuitry 403 may transmit (through transceiver 401) a resume message or a setup message to the communication device after transmitting the release message, wherein the resume message or the setup message initiates transitioning of the communication device to a connected state.

At block 2725, processing circuitry 403 may receive (through transceiver 401) a logged MDT measurement report from the communication device after transmitting the resume request message or the setup request message, wherein the logged MDT measurement report includes a plurality of signal measurements for a respective plurality of frequencies, wherein the logged MDT measurement report includes the first early measurement configuration, and wherein the logged MDT measurement report includes the second early measurement configuration.

At block 2729, processing circuitry 403 may receive (through transceiver 401) an early measurement report from the communication device in accordance with the early measurement configuration.

Figure 13:
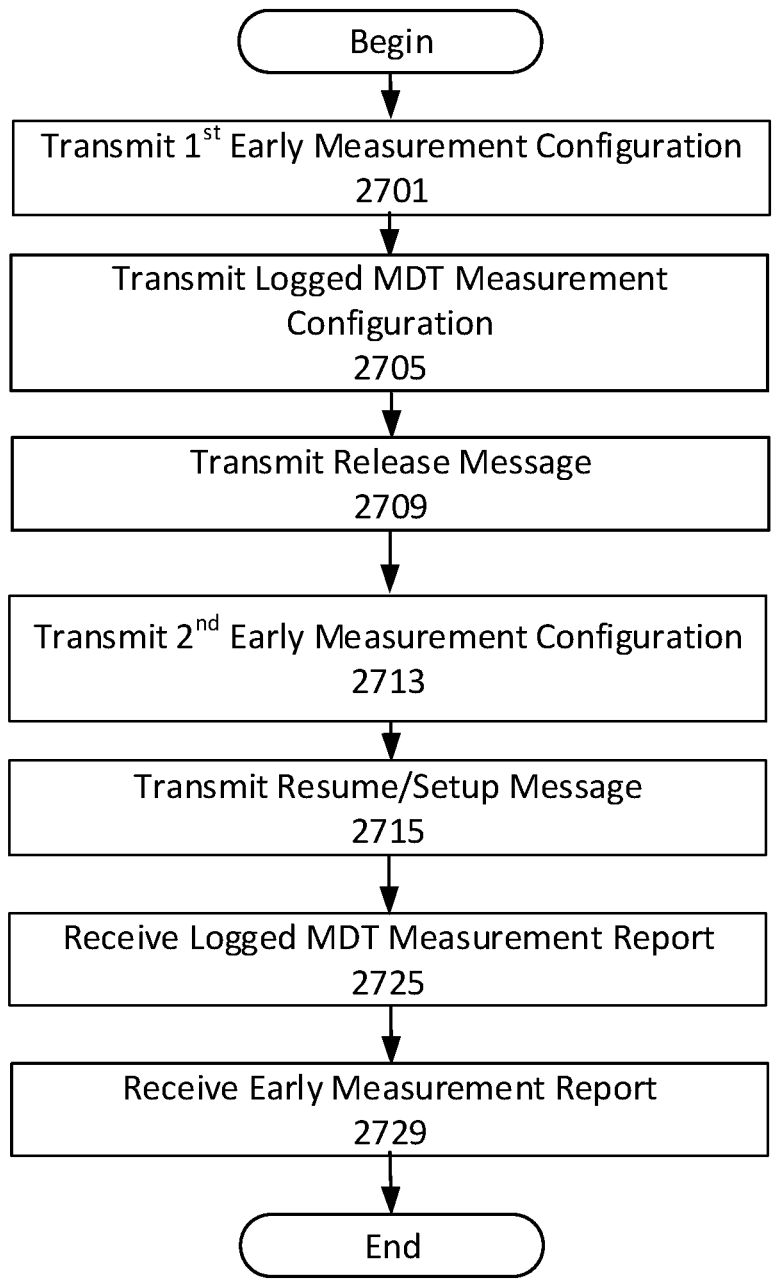

Various operations from the flow chart of FIG. 13 may be optional with respect to some embodiments of RAN nodes and related methods. Regarding methods of example embodiment 27 (set forth below), for example, operations of blocks 2713 and/or 2729 of FIG. 13 may be optional.

According to some embodiments discussed above, several methods related to including early measurement configuration on the logged MDT have been disclosed, either implicitly or explicitly, so the network could make a more informed decision on aggregating the coverage map of the whole network (e.g., considering that a UE may not be reporting a certain frequency/RAT because it was not configured to measure it, rather than due to lack of coverage).

However, even if the early measurement configurations are included or can be inferred from the entries in the logged MDT related to early measurements, there are several scenarios where the UE may not perform measurements on a certain carrier/frequency (while camping on a given cell), even when the measIduration has not expired and the UE is within the validity area for performing early measurements:

The UE was configured to perform the measurements on a certain carrier, but it is not capable of performing CA between the serving carrier and that particular carrier it was configured to measure The UE was configured to perform the measurements on a certain inter-RAT carrier, but it is not capable of performing DC between the serving carrier and the inter-RAT carrier configured to be measured The UE might have performed inter-RAT cell re-selection, upon which the UE stops performing early measurements The UE might have done autonomous transition from INACTIVE state to IDLE state due to some erroneous case (e.g. receiving a CN paging while in INACTIVE state), upon which the UE stops performing early measurements The UE might have received a dedicated measurement configuration for a certain frequency (e.g. SSB configuration) when it was released/suspended, and it has performed cell re-selection to another cell where the measurement configuration broadcasted at that frequency is different from the one that the UE has been provided via dedicated signalling, upon which the UE stops/pauses performing early measurements for that frequency The UE might have received a measurement configuration for a certain frequency (e.g. SSB configuration) via broadcast signalling when it was released/suspended, but it has performed cell re-selection to another cell where the measurement configuration is not broadcasted at that frequency is different from the one that the UE has been provided via broadcasted signalling in the source cell where it was released, upon which the UE stops/pauses performing early measurements for that frequency Thus, considering all the above cases, having or inferring the early measurement configuration in the logged MDT results may not provide complete information why early measurement results are not there when expected and could actually end up providing misleading information about the coverage map of different carriers/RAT within the network.

According to some embodiments of inventive concepts, mechanisms are provided to address the problem that could arise due to the UE not performing (partially or completely) early measurements due to 3gpp specified behaviors discussed above (e.g. cell re-selection to a carrier that the UE is not capable of performing CA/DC with one or more of the carriers the UE is configured to measure, autonomous transition from INACTIVE to IDLE state, inter-RAT cell re-selection, mismatch between dedicated measurement configuration received on release and broadcast information received after cell re-selection, etc.).

According to some embodiments of inventive concepts, two approaches are proposed, discussed below as Approach-A and Approach-B.

Approach-A: The UE can be configured to include indications when it does not perform early measurements for some of the reasons specified above (e.g. not capable of performing CA/DC with the particular carrier and the current serving carrier, mismatch between dedicated measurements and broadcasted measurements, etc.).

Approach-B: The current behavior for stopping early measurements can be overridden if the UE is configured to log early measurements as part of the logged MDT. For example, the UE will perform early measurements and log them in the MDT even if it was not capable to perform CA/DC with the carrier being measured and the current serving carrier. This overriding might affect only the MDT logging (e.g., UE will still will not include the concerned measurements in the early measurement report that it will send when going to connected mode).

Enabling the inclusion of early measurement results in logged MDT measurement reports enables a more complete coverage map of the network, considering different frequencies/RATs. This is because early measurements are not impacted by cell re-selection measurement parameters (e.g., SintraSearch and SnonintraSearch), frequency/RAT/cell prioritization, whether the cell is candidate for cell re-selection or not (e.g., NSA cell, cell currently barred, for example, due to overload, etc.).

By including additionally the reason why the UE has not included early measurements in some logs, even if it was configured to do so, the OAM can deduce that the lack of early measurements at some particular time/location entries is not necessarily due to lack of coverage of the configured frequencies, but rather due to the UE not performing the measurements due to one of several possible reasons.

UE embodiments are discussed below.

Some embodiments of inventive concepts include several methods executed by a user equipment (UE) in relation to measurements and measurement logging, specifically:

receiving early measurement and logged MDT measurement configuration, as per the embodiments discussed above, and applying the specified behaviors therein While in the dormant state:
Performing the early measurements as specified by the early measurement configuration, and logging them in the logged MDT report:
When the UE does not perform early measurements for some of the reasons specified above (e.g., not capable of performing CA/DC with the particular carrier and the current serving carrier, mismatch between dedicated measurements and broadcasted measurements, etc.), the UE will include that information in the early measurement that is to be logged in the MDT.

This could, for example, be achieved, by including an empty measurement results for that frequency (or a pre-configured fixed value) and also include the cause for not measuring that frequency. Example cause values could be "not capable of CA", "not capable of DC", "mis-match between dedicated and broadcast", "measurement configuration not broadcasted", etc., corresponding to the different causes that could lead to not measuring the concerned frequency (discussed above)

Overriding some or all of the current conditions for stopping early measurements if the UE is configured to log early measurements in the logged MDT. For example, the UE will perform early measurements and log them in the MDT even if it was not capable to perform CA/DC with the carrier being measured and the current serving carrier. This overriding might affect only the MDT logging (e.g. UE will still will not include the concerned measurements in the early measurement report that it will send when going to connected mode).

Which of the above options can be used can be left to UE implementation, specified in 3GPP specifications, or a configurable UE behavior (e.g. indicated in the early measurement or logged MDT configurations).

Logging the early measurements in the logged measurement results.

Stopping the timer T331 when it expires and stopping the early measurements

In one alternative, UE continues to perform early measurements, based on UE implementation, after T331 has expired In such a case, there are several alternatives on how to incorporate the early measurements captured before and after the expiry of T331

Only early measurement results gathered before T331 has expired are included in the logged MDT measurements Only early measurement results gathered after T331 has expired are included in the logged MDT measurements Early measurement results are included in the logged MDT measurements, regardless of whether they were captured before or after the expiry of T331

Early measurement results are included in the logged MDT measurements, regardless of whether they were captured before or after the expiry of T331, but there is an indication whether they were captured before or after the expiry of T331

Which of the above behaviors to apply could be specified in the standards, left to UE implementation, or can be configurable by the network.

Transitioning to RRC_CONNECTED state (e.g. upon the arrival of UL data, paging due to DL data, need to update tracking area, etc.)

Sending the RRCConnectionResumeRequest/RRCResumeRequest or RRCConnectionSetupRequest/RRCSetupRequest message to the network Transitioning to the RRC_CONNECTED state upon receiving RRCConnectionResume/RRCResume or RRCConnectionSetup/RRCSetup message from the network Stopping the timer T330 when it expires and stopping the MDT measurement logging Receiving a UEInformationRequest that includes the logMeasReportReq, and reporting the logged MDT measurements in UEInformationResponse, which includes measurements performed based on LoggedMeasurementConfiguration as well as measIdleConfig, and possibly including cause values why (for some entries) the early measurements were not available Network embodiments are discussed below.

Some embodiments of inventive concepts include several methods executed by a network node in relation to measurements and measurement logging by a UE, specifically:

Configuring the UE with early measurements and logged measurement configuration that includes the different configurations/options/parameters/indications discussed above with respect to UE embodiments (e.g. indication to include cause values for not performing early measurements, indication to override UE specified behavior for early measurement performance, etc.)

Controlling the state transitions of the UE

Sending the UE to a dormant state based on several aspects such as UE inactivity Bringing the UE to a connected state based on several aspects like a resume/setup request from the UE (due to arrival of UL data, UE responding to a paging regarding a DL data, etc.)

Once a UE is in a connected state, requesting early measurements report

Receiving the early measurement report

Once a UE is in a connected state, requesting logged MDT measurements

Receiving the logged MDT measurements that contain early measurement results

Forwarding the measurements to an OAM node/entity

Operations of the communication device 300 (implemented using the structure of the block diagram of FIG. 8) will now be discussed with reference to the flow chart of FIG. 14 according to some embodiments of inventive concepts. For example, modules may be stored in memory 305 of FIG. 8, and these modules may provide instructions so that when the instructions of a module are executed by respective communication device processing circuitry 303, processing circuitry 303 performs respective operations of the flow chart.

At block 2801, processing circuitry 303 receives (through transceiver 301) a logged Minimization of Drive Tests MDT measurement configuration from the wireless communication network, wherein the logged MDT measurement configuration identifies a plurality of MDT measurement frequencies.

At block 2805, processing circuitry 303 receives (through transceiver 301) an early measurement configuration from the wireless communication network, wherein the early measurement configuration identifies a plurality of early measurement frequencies including a first early measurement frequency.

According to some embodiments at block 2809, processing circuitry 303 receives (through transceiver 301) a release message from the wireless communication network.

According to some embodiments at block 2811, processing circuitry transitions to a dormant state responsive to receiving the release message, wherein the MDT measurements are performed at block 2815 while in the dormant state, and wherein the early measurements are performed at block 2819 while in the dormant state.

At block 2815, processing circuitry 303 performs measurement for the plurality of MDT measurement frequencies in accordance with the logged MDT measurement configuration to provide signal measurements for the plurality of MDT measurements frequencies.

At block 2819, processing circuitry 303 performs measurement in accordance with the early measurement configuration, wherein a signal measurement for the first early measurement frequency is not provided. According to some embodiments, the signal measurement for the first early measurement frequency is not provided responsive to stopping measurement for the first early measurement frequency and/or for the plurality of early measurement frequencies, where stopping may comprise pausing. For example, measurement for the first early measurement frequency may be stopped responsive to at least one of, the communication device being incapable of performing carrier aggregation, CA, using the first early measurement frequency and a serving frequency, the communication device being incapable of performing dual connectivity, DC, using the first early measurement frequency and a serving frequency, expiration of a duration to provide measurements in accordance with the early measurement configuration, termination of early measurement for the first early measurement frequency, cell reselection, inter Radio Access Technology (inter-RAT) cell reselection, an autonomous inactive state to idle state transition, a mismatch between the early measurement configuration and a subsequent early measurement configuration, and/or a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments at block 2820, processing circuitry 303 receives (through transceiver 301) one of a resume message or a setup message from the wireless communication network, wherein transitioning to the connected state in responsive to receiving the one of the resume message or the setup message.

According to some embodiments at block 2821, processing circuitry 303 transitions to a connected state responsive to receiving the resume message or the setup message after transitioning to the dormant state, wherein the logged MDT measurement report is transmitted at block 2825 while in the connected state.

At block 2825, processing circuitry 2825 transmits (through transceiver 301) a logged MDT measurement report to the wireless communication network in accordance with the logged MDT measurement configuration, wherein the logged MDT measurement report includes the signal measurements for the plurality of MDT measurement frequencies, and an indication that a signal measurement for the first early measurement frequency is not provided. According to some embodiments, the indication may include an empty measurement result for the first early measurement frequency (e.g., a pre-configured fixed value indicating that a signal measurement for the first early measurement frequency is not provided). According to some embodiments, the indication that the signal measurement for the early measurement frequency is not provided includes an indication of at least one of,
- the communication device being incapable of performing carrier aggregation, CA, using the first early measurement frequency and a serving frequency,
- the communication device being incapable of performing dual connectivity, DC, using the first early measurement frequency and a serving frequency,
- expiration of a duration to provide measurements in accordance with the early measurement configuration,
- termination of early measurement for the first early measurement frequency,
- cell reselection,
- inter Radio Access Technology (inter-RAT) cell reselection,
- early measurement for the first early measurement frequency being terminated due to cell reselection,
- early measurement for the first early measurement frequency being terminated due to inter Radio Access Technology (inter-RAT) cell reselection,
- an autonomous inactive state to idle state transition,
- early measurement for the first early measurement frequency being terminated due to an autonomous inactive state to idle state transition,
- a mismatch between the early measurement configuration and a subsequent measurement configuration, and/or
- a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments at block 2829, processing circuitry 303 transmits (through transceiver 301) an early measurement report to the wireless communication network in accordance with the early measurement configuration.

Figure 14:
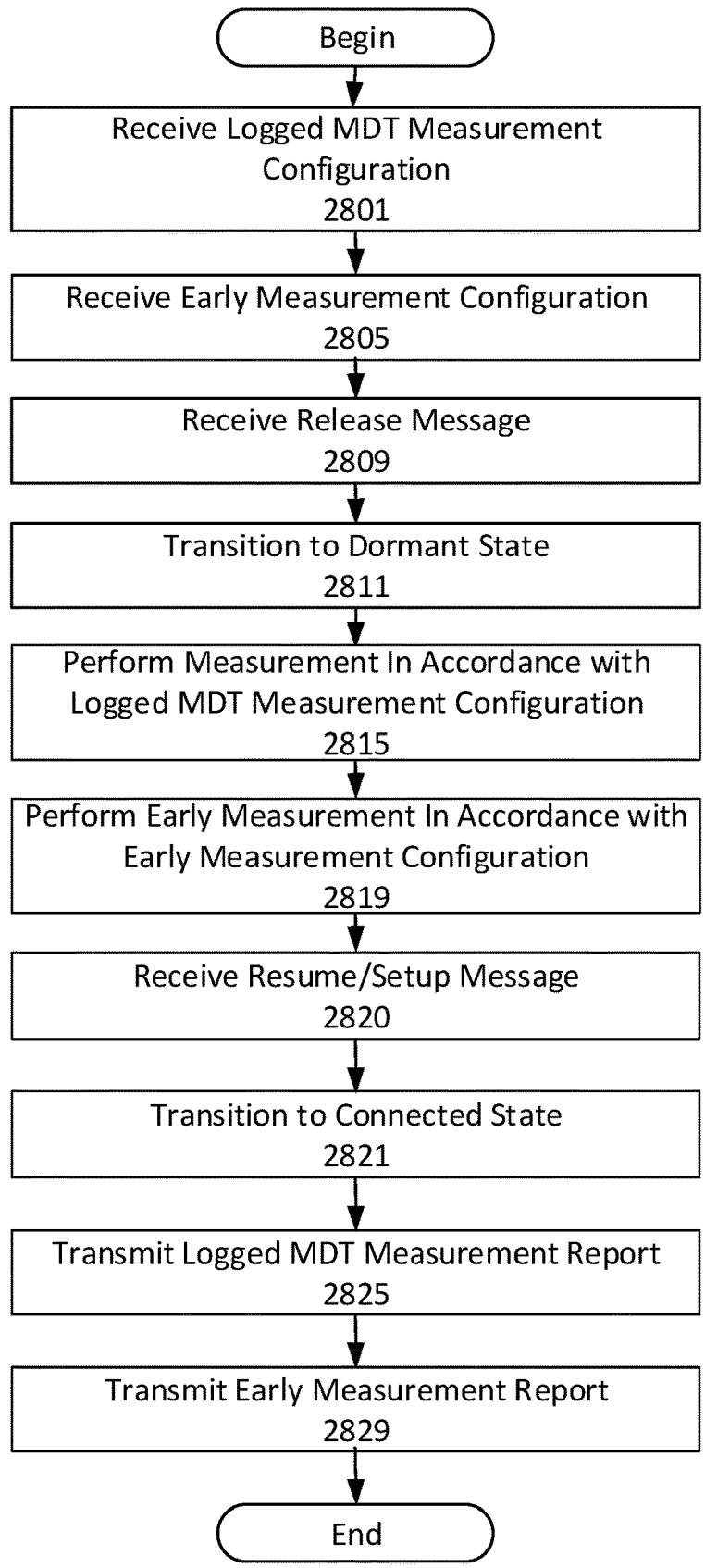

Various operations from the flow chart of FIG. 14 may be optional with respect to some embodiments of communication devices and related methods. Regarding methods of example embodiment 1 (set forth below), for example, operations of blocks 2809, 2811, 2820, 2821, and/or 2829 of FIG. 14 may be optional.

Operations of the communication device 300 (implemented using the structure of the block diagram of FIG. 8) will now be discussed with reference to the flow chart of FIG. 15 according to some embodiments of inventive concepts. For example, modules may be stored in memory 305 of FIG. 8, and these modules may provide instructions so that when the instructions of a module are executed by respective communication device processing circuitry 303, processing circuitry 303 performs respective operations of the flow chart.

At block 2901, processing circuitry 303 receives (through transceiver 301) a logged Minimization of Drive Tests MDT measurement configuration from the wireless communication network, wherein the logged MDT measurement configuration identifies a plurality of MDT measurement frequencies.

At block 2905, processing circuitry 303 receives (through transceiver 301) an early measurement configuration from the wireless communication network, wherein the early measurement configuration identifies a plurality of early measurement frequencies including a first early measurement frequency.

According to some embodiments at block 2909, processing circuitry 303 receives (through transceiver 301) a release message from the wireless communication network.

According to some embodiments at block 2911, processing circuitry transitions to a dormant state responsive to receiving the release message, wherein the MDT measurements are performed while in the dormant state, and wherein the early measurements are performed while in the dormant state.

At block 2915, processing circuitry 303 performs measurement for the plurality of MDT measurement frequencies in accordance with the logged MDT measurement configuration to provide signal measurements for the plurality of MDT measurements frequencies.

At block 2919, processing circuitry 303 performs measurement for the plurality of early measurement frequencies in accordance with the early measurement configuration to provide a signal measurement for the first early measurement frequency after a condition to stop early measurement for the first early measurement frequency has been satisfied. According to some embodiments, the condition to stop early measurement for the first early measurement frequency comprises at least one of,
- the communication device being incapable of performing carrier aggregation, CA, using the first early measurement frequency and a current serving frequency,
- the communication device being incapable of performing dual connectivity, DC, using the first early measurement frequency and a current serving frequency,
- expiration of a duration to provide measurements in accordance with the early measurement configuration,
- termination of early measurement for the first early measurement frequency,
- cell reselection,
- inter Radio Access Technology (inter-RAT) cell reselection,
- an autonomous inactive state to idle state transition,
- a mismatch between the early measurement configuration and a subsequent early measurement configuration, and/or
- a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments at block 2920, processing circuitry 303 receives (through transceiver 301) one of a resume message or a setup message from the wireless communication network.

According to some embodiments at block 2921, processing circuitry 303 transitions to a connected state responsive to receiving the resume message or the setup message after transitioning to the dormant state, wherein the logged MDT measurement report is transmitted at block 2925 while in the connected state.

At block 2925, processing circuitry 303 transmits (through transceiver 301) a logged MDT measurement report to the wireless communication network in accordance with the logged MDT measurement configuration, wherein the logged MDT measurement report includes the signal measurements for the plurality of MDT measurement frequencies, and the signal measurement for the first early measurement frequency. According to some embodiments, the logged MDT measurement report includes an indication of the condition to stop early measurement. For example, the indication of the condition to stop early measurement may include an indication of at least one of,
- the communication device being incapable of performing carrier aggregation, CA, using the first early measurement frequency and a current serving frequency,
- the communication device being incapable of performing dual connectivity, DC, using the first early measurement frequency and a current serving frequency,
- expiration of a duration to provide measurements in accordance with the early measurement configuration,
- termination of early measurement for the first early measurement frequency,
- cell reselection,
- inter Radio Access Technology (inter-RAT) cell reselection,
- an autonomous inactive state to idle state transition,
- a mismatch between the early measurement configuration and a subsequent early measurement configuration, and/or
- a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments at block 2929, processing circuitry 303 transmits (through transceiver 301) an early measurement report to the wireless communication network in accordance with the early measurement configuration.

Figure 15:
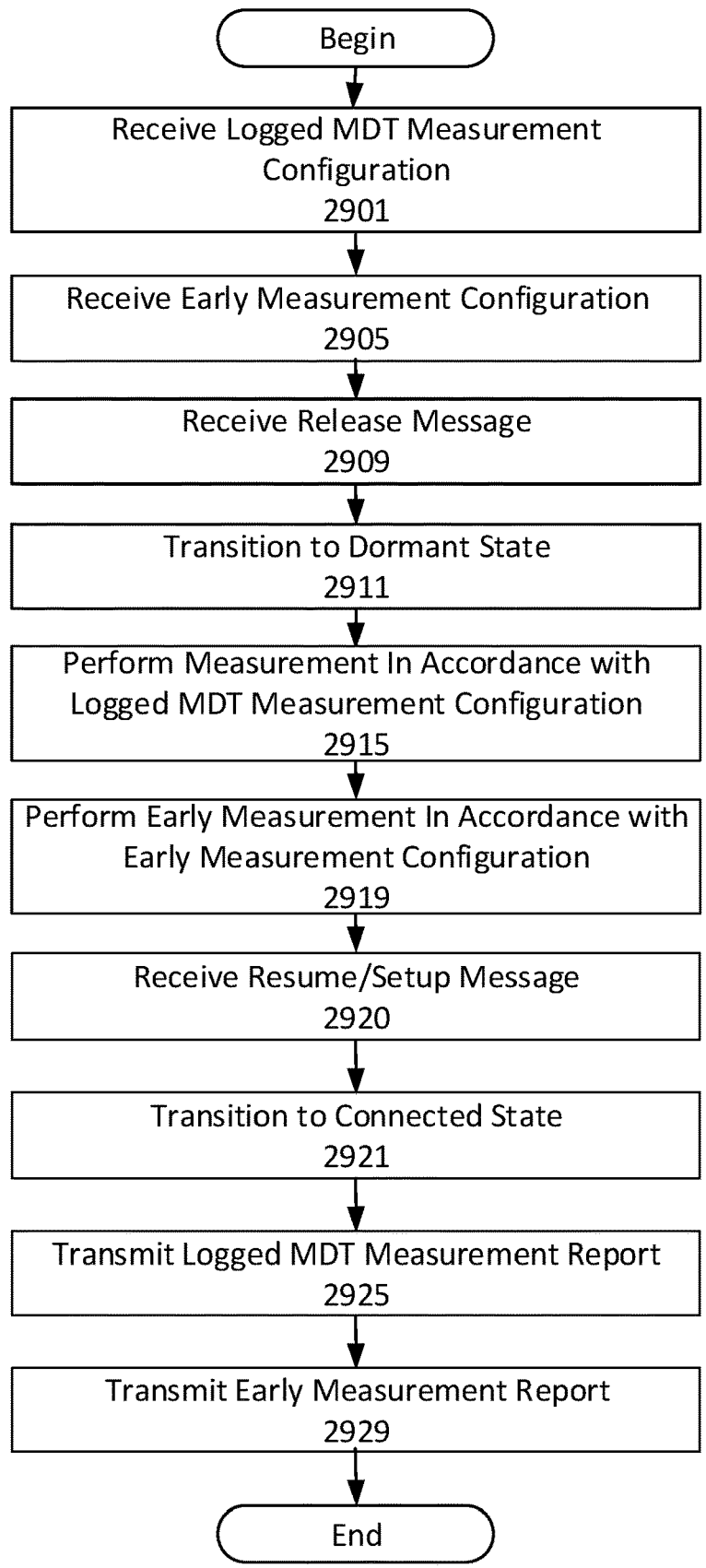

Various operations from the flow chart of FIG. 15 may be optional with respect to some embodiments of communication devices and related methods. Regarding methods of example embodiment 22 (set forth below), for example, operations of blocks 2909, 2911, 2920, 2921, and/or 2929 of FIG. 15 may be optional.

Operations of a RAN node 400 (implemented using the structure of FIG. 9) will now be discussed with reference to the flow chart of FIG. 16 according to some embodiments of inventive concepts. For example, modules may be stored in memory 405 of FIG. 9, and these modules may provide instructions so that when the instructions of a module are executed by respective RAN node processing circuitry 403, processing circuitry 403 performs respective operations of the flow chart.

At block 3001, processing circuitry 403 provides (e.g., transmits through transceiver 401) a logged Minimization of Drive Tests MDT measurement configuration for a communication device (300), wherein the logged MDT measurement configuration identifies a plurality of MDT measurement frequencies.

At block 3005, processing circuitry 403 provides (e.g., transmits through transceiver 401) an early measurement configuration for the communication device, wherein the early measurement configuration identifies a plurality of early measurement frequencies including a first early measurement frequency.

According to some embodiments at block 3009, processing circuitry 303 transmits (e.g., through transceiver 401) a release message to the communication device, wherein the communication device transitions to a dormant state responsive to receiving the release message.

According to some embodiments at block 3015, processing circuitry 303 transmits (e.g., through transceiver 401) one of a resume message or a setup message to the communication device, wherein the communication device transitions to a connected state in responsive to receiving the one of the resume message or the setup message.

At block 3025, processing circuitry 403 receives (e.g., through transceiver 401) a logged MDT measurement report from the communication device in accordance with the logged MDT measurement configuration, wherein the logged MDT measurement report includes signal measurements for the plurality of MDT measurement frequencies, and an indication that a signal measurement for the first early measurement frequency is not provided. According to some embodiments, the indication that the signal measurement for the early measurement frequency is not provided may include an indication of at least one of,
- the communication device being incapable of performing carrier aggregation, CA, using the first early measurement frequency and a serving frequency,
- the communication device being incapable of performing dual connectivity, DC, using the first early measurement frequency and a serving frequency,
- expiration of a duration to provide measurements in accordance with the early measurement configuration,
- termination of early measurement for the first early measurement frequency,
- cell reselection,
- inter Radio Access Technology (inter-RAT) cell reselection,
- early measurement for the first early measurement frequency being terminated due to cell reselection,
- early measurement for the first early measurement frequency being terminated due to inter Radio Access Technology (inter-RAT) cell reselection,
- an autonomous inactive state to idle state transition,
- early measurement for the first early measurement frequency being terminated due to an autonomous inactive state to idle state transition,
- a mismatch between the early measurement configuration and a subsequent measurement configuration, and/or
- a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments at block 3029, processing circuitry 403 may receive (through transceiver 401) an early measurement report from the communication device in accordance with the early measurement configuration.

Figure 16:
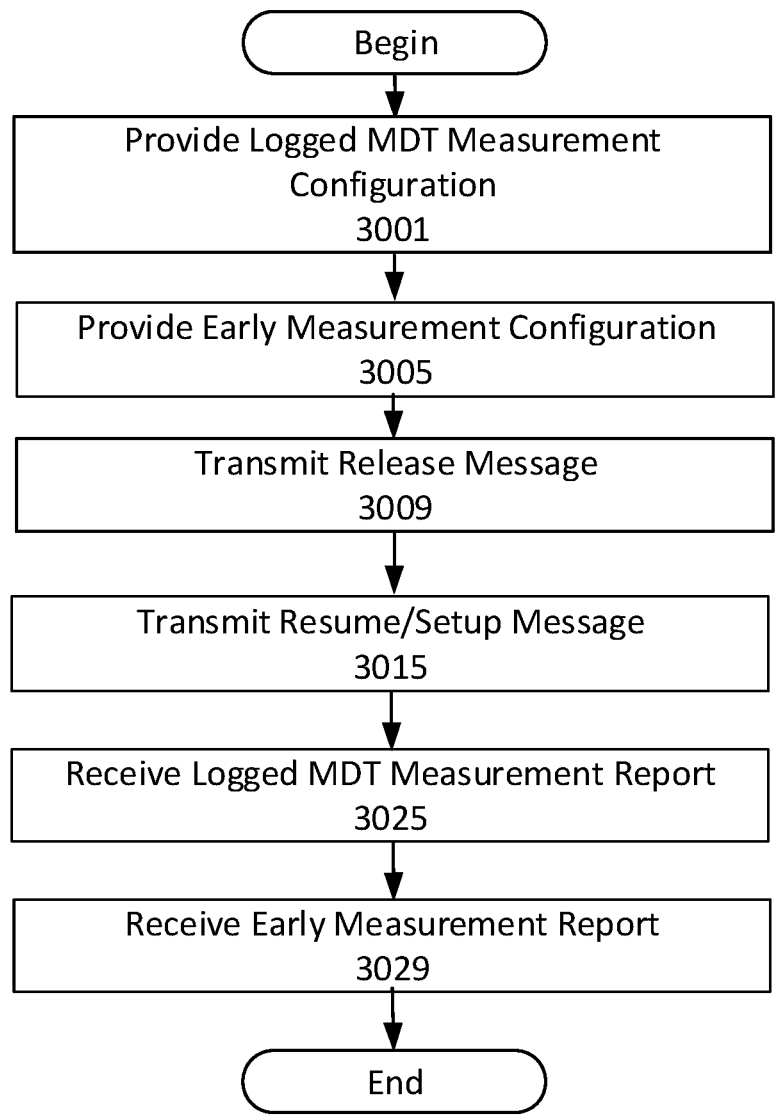

Various operations from the flow chart of FIG. 16 may be optional with respect to some embodiments of RAN nodes and related methods. Regarding methods of example embodiment 46 (set forth below), for example, operations of blocks 3009, 3015, and/or 3029 of FIG. 16 may be optional.

Operations of a RAN node 400 (implemented using the structure of FIG. 9) will now be discussed with reference to the flow chart of FIG. 17 according to some embodiments of inventive concepts. For example, modules may be stored in memory 405 of FIG. 9, and these modules may provide instructions so that when the instructions of a module are executed by respective RAN node processing circuitry 403, processing circuitry 403 performs respective operations of the flow chart.

At block 3101, processing circuitry 303 provides (e.g., transmits through transceiver 401) a logged Minimization of Drive Tests MDT measurement configuration for a communication device, wherein the logged MDT measurement configuration identifies a plurality of MDT measurement frequencies.

At block 3105, processing circuitry 303 provides (e.g., transmits through transceiver 401) an early measurement configuration for the communication device, wherein the early measurement configuration identifies a plurality of early measurement frequencies including a first early measurement frequency.

According to some embodiments at block 3109, processing circuitry transmits (e.g., through transceiver 401) a release message to the communication device, wherein the communication device transitions to a dormant state responsive to receiving the release message.

According to some embodiments at block 3115, processing circuitry transmits (e.g., through transceiver 401) one of a resume message or a setup message to the communication device, wherein the communication device transitions to a connected state in responsive to receiving the one of the resume message or the setup message.

At block 3125, processing circuitry 3125 receives (e.g., through transceiver 401) a logged MDT measurement report from the communication device in accordance with the logged MDT measurement configuration, wherein the logged MDT measurement report includes signal measurements for the plurality of MDT measurement frequencies, a signal measurement for the first early measurement frequency, and an indication of a condition to stop early measurement for the first early measurement frequency. According to some embodiments, the indication of the condition to stop early measurement may include an indication at least one of, the communication device being incapable of performing carrier aggregation, CA, using the first early measurement frequency and a current serving frequency, the communication device being incapable of performing dual connectivity, DC, using the first early measurement frequency and a current serving frequency, expiration of a duration to provide measurements in accordance with the early measurement configuration, termination of early measurement for the first early measurement frequency, cell reselection, inter Radio Access Technology (inter-RAT) cell reselection, an autonomous inactive state to idle state transition, a mismatch between the early measurement configuration and a subsequent early measurement configuration, and/or a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments at block 3129, processing circuitry 403 may receive (through transceiver 401) an early measurement report from the communication device in accordance with the early measurement configuration.

Figure 17:
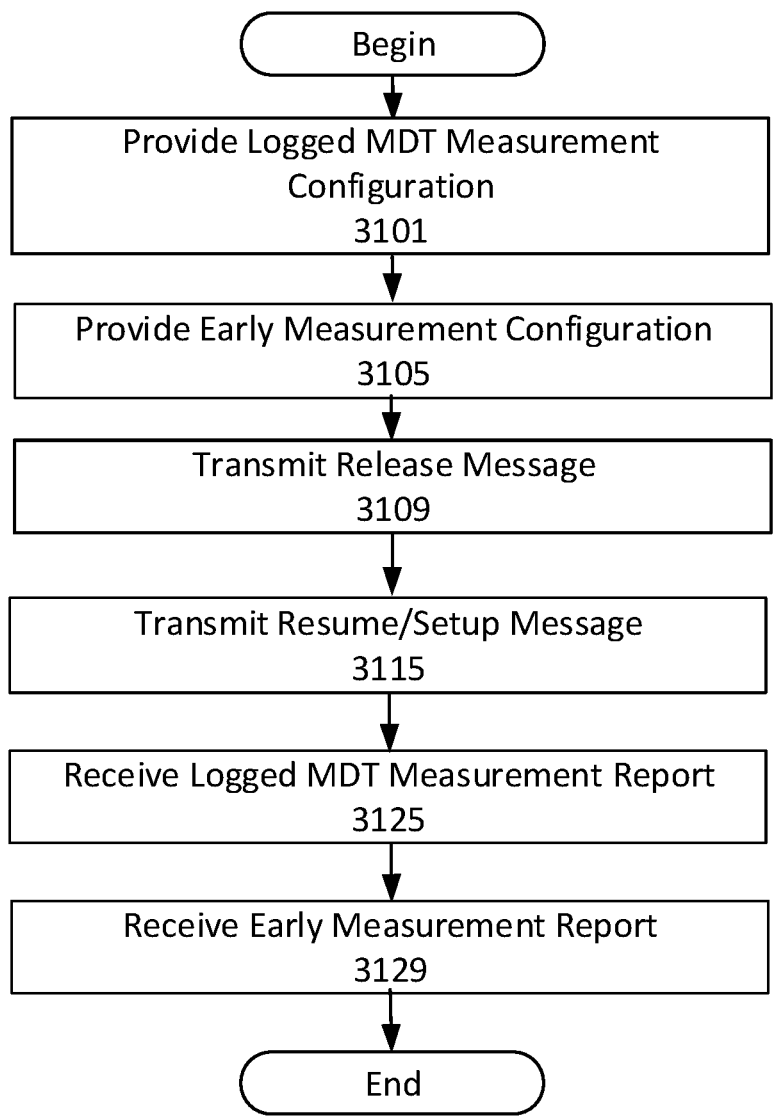

Various operations from the flow chart of FIG. 17 may be optional with respect to some embodiments of RAN nodes and related methods. Regarding methods of example embodiment 46 (set forth below), for example, operations of blocks 3109, 3115, and/or 3129 of FIG. 17 may be optional.

Operations of the communication device 300 (implemented using the structure of the block diagram of FIG. 8) will now be discussed with reference to the flow chart of FIG. 18 according to some embodiments of inventive concepts. For example, modules may be stored in memory 305 of FIG. 8, and these modules may provide instructions so that when the instructions of a module are executed by respective communication device processing circuitry 303, processing circuitry 303 performs respective operations of the flow chart.

According to some embodiments at block 1801, processing circuitry 303 receives (through transceiver 301) a logged Minimization of Drive Tests MDT measurement configuration from the wireless communication network.

According to some embodiments at block 1805, processing circuitry 303 receives (through transceiver 301) an early measurement configuration from the wireless communication network, wherein the early measurement configuration identifies a plurality of early measurement frequencies including a first early measurement frequency.

According to some embodiments at block 1811, processing circuitry 303 transitions to a dormant state.

According to some embodiments at block 1813, processing circuitry 303 performs a plurality of measurements used for cell reselection evaluation. Moreover, the plurality of measurements used for cell reselection evaluation may be performed for respective frequencies used for cell reselection evaluation.

According to some embodiments at block 1815, processing circuitry 303 logs a plurality of MDT signal measurements in accordance with the logged MDT measurement configuration. Moreover, the plurality of MDT signal measurements may be logged based on the plurality of measurements used for cell reselection evaluation, and/or the plurality of MDT signal measurements may be logged while in the dormant state.

According to some embodiments at block 1819, processing circuitry 303 performs measurements in accordance with the early measurement configuration, wherein a signal measurement for the first early measurement frequency is not provided. Moreover, the measurements in accordance with the early measurement configuration may be performed while in the dormant state.

According to some embodiments at block 1821, processing circuitry 303 transitions to a connected state after transitioning to the dormant state.

According to some embodiments at block 1825, processing circuitry 303 transmits (through transceiver 301) a logged MDT measurement report to the wireless communication network in accordance with the logged MDT measurement configuration. The logged MDT measurement report includes the plurality of MDT signal measurements, and an indication that a signal measurement for the first early measurement frequency is not provided. Moreover, the logged MDT measurement report is transmitted while in the connected state.

According to some embodiments at block 1829, processing circuitry 303 transmits (through transceiver 301) an early measurement report to the wireless communication network in accordance with the early measurement configuration.

Figure 18:
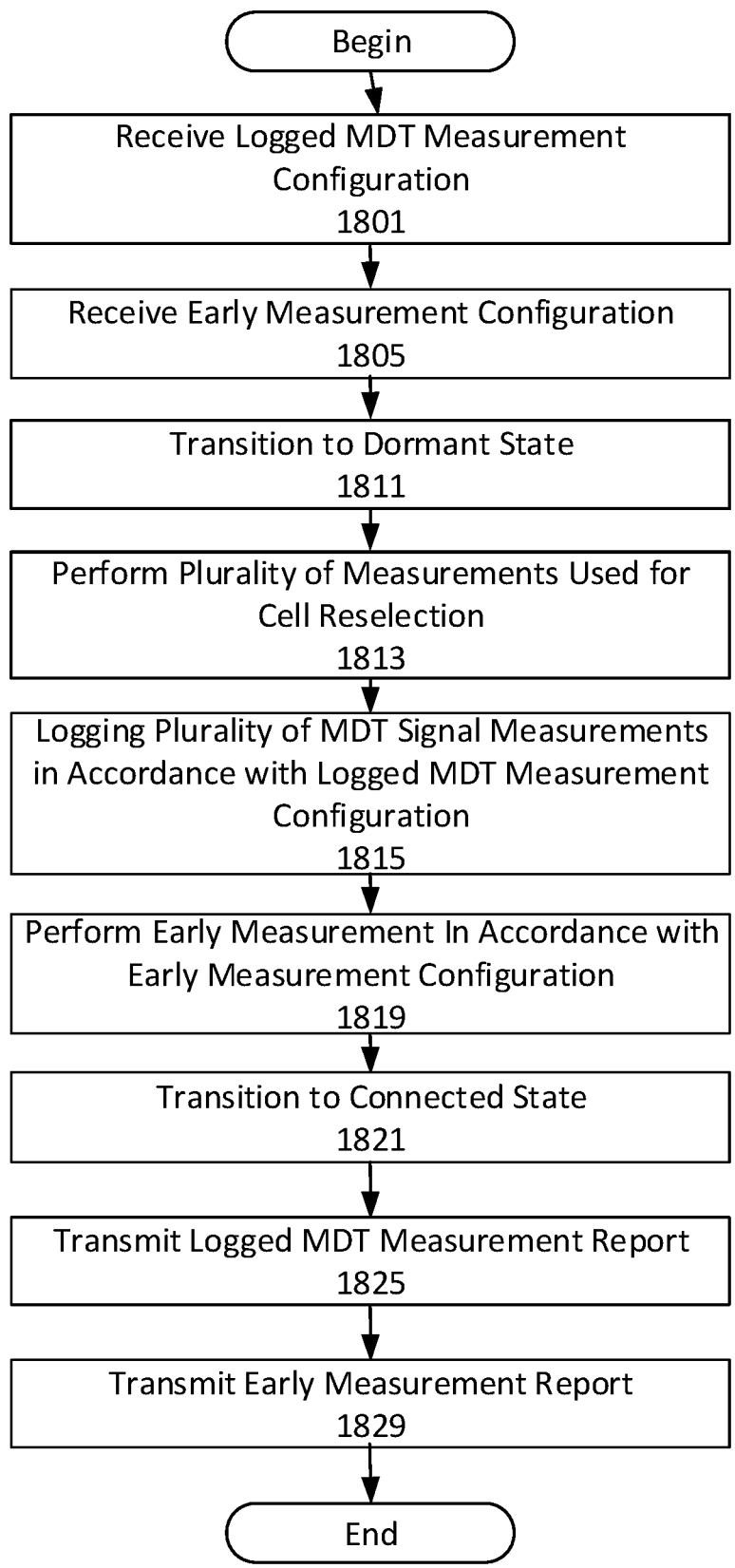

According to some embodiments of FIG. 18, the plurality of early measurement frequencies includes the first early measurement frequency and a second early measurement frequency, performing measurements in accordance with the early measurement configuration comprises providing a signal measurement for the second early measurement frequency, and the logged MDT measurement report includes the signal measurement for the second early measurement frequency.

According to some embodiments of FIG. 18, the signal measurement for the first early measurement frequency is not provided responsive to stopping measurement for the first early measurement frequency and/or for the plurality of early measurement frequencies. For example, stopping may include pausing measurement for the first early measurement frequency in accordance with the early measurement configuration. Moreover, stopping measurement for the first early measurement frequency may be responsive to at least one of: the communication device being incapable of performing carrier aggregation, CA, using the first early measurement frequency and a serving frequency; the communication device being incapable of performing dual connectivity, DC, using the first early measurement frequency and a serving frequency; expiration of a duration to provide measurements in accordance with the early measurement configuration; cell reselection; inter Radio Access Technology (inter-RAT) cell reselection; an autonomous inactive state to idle state transition; a mismatch between the early measurement configuration and a subsequent early measurement configuration; and/or a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments of FIG. 18, at least one of the logged MDT measurement configuration and/or the early measurement configuration may include an indication to include results of early measurements in the logged MDT measurement report, and the logged MDT measurement report may include the indication that the signal measurement for the first early measurement frequency is not provided responsive to the indication to include results of early measurements in the logged MDT measurement report.

Various operations from the flow chart of FIG. 18 may be optional with respect to some embodiments of communication devices and related methods. Regarding methods of example embodiment 136 (set forth below), for example, operations of blocks 1811, 1813, 1821, and/or 1829 of FIG. 18 may be optional.

Operations of a RAN node 400 (implemented using the structure of FIG. 9) will now be discussed with reference to the flow chart of FIG. 19 according to some embodiments of inventive concepts. For example, modules may be stored in memory 405 of FIG. 9, and these modules may provide instructions so that when the instructions of a module are executed by respective RAN node processing circuitry 403, processing circuitry 403 performs respective operations of the flow chart.

According to some embodiments at block 1901, processing circuitry 403 provides a logged Minimization of Drive Tests MDT measurement configuration for a communication device (300).

According to some embodiments at block 1905, processing circuitry 403 provides an early measurement configuration for the communication device, wherein the early measurement configuration identifies a plurality of early measurement frequencies including a first early measurement frequency.

According to some embodiments at block 1925, processing circuitry 403 receives (through transceiver 401) a logged MDT measurement report from the communication device in accordance with the logged MDT measurement configuration. The logged MDT measurement report includes a plurality of MDT signal measurements and an indication that a signal measurement for the first early measurement frequency is not provided. For example, the indication may include an empty measurement result for the first early measurement frequency, such as a pre-configured fixed value indicating that a signal measurement for the first early measurement frequency is not provided.

Figure 19:
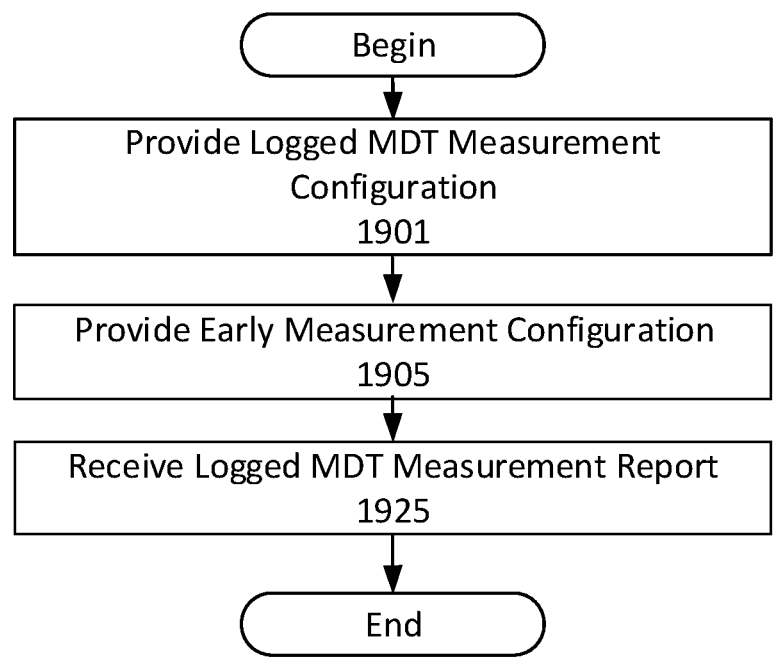

According to some embodiments of FIG. 19, the plurality of MDT signal measurements may be based on a plurality of measurements used for cell reselection evaluation. For example, the plurality of measurements used for cell reselection evaluation may be a plurality of measurements for respective frequencies used for cell reselection evaluation.

According to some embodiments of FIG. 19, the plurality of early measurement frequencies may include the first early measurement frequency and a second early measurement frequency, and the logged MDT measurement report may include a signal measurement for the second early measurement frequency.

According to some embodiments of FIG. 19, the indication that the signal measurement for the early measurement frequency is not provided may include an indication of at least one of: the communication device being incapable of performing carrier aggregation, CA, using the first early measurement frequency and a serving frequency; the communication device being incapable of performing dual connectivity, DC, using the first early measurement frequency and a serving frequency; expiration of a duration to provide measurements in accordance with the early measurement configuration; termination of early measurement for the first early measurement frequency; cell reselection; inter Radio Access Technology (inter-RAT) cell reselection; early measurement for the first early measurement frequency being terminated due to cell reselection; early measurement for the first early measurement frequency being terminated due to inter Radio Access Technology (inter-RAT) cell reselection; an autonomous inactive state to idle state transition; early measurement for the first early measurement frequency being terminated due to an autonomous inactive state to idle state transition; a mismatch between the early measurement configuration and a subsequent measurement configuration; and/or a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

According to some embodiments of FIG. 19, at least one of the logged MDT measurement configuration and/or the early measurement configuration may include an indication to include results of early measurements in the logged MDT measurement report, and the logged MDT measurement report may include the indication that the signal measurement for the first early measurement frequency is not provided responsive to the indication to include results of early measurements in the logged MDT measurement report.

According to some embodiments of FIG. 19, the early measurement configuration may include a timer value specifying a duration of performing measurement according to the early measurement configuration.

Various operations from the flow chart of FIG. 19 may be optional with respect to some embodiments of RAN nodes and related methods.

Example embodiments are discussed below.

1. A method of operating a communication device (300) in communication with a wireless communication network, the method comprising: receiving (2801) a logged Minimization of Drive Tests, MDT, measurement configuration from the wireless communication network, wherein the logged MDT measurement configuration identifies a plurality of MDT measurement frequencies; receiving (2805) an early measurement configuration from the wireless communication network, wherein the early measurement configuration identifies a plurality of early measurement frequencies including a first early measurement frequency; performing (2815) measurement for the plurality of MDT measurement frequencies in accordance with the logged MDT measurement configuration to provide signal measurements for the plurality of MDT measurements frequencies; performing (2819) measurement in accordance with the early measurement configuration, wherein a signal measurement for the first early measurement frequency is not provided; and transmitting (2825) a logged MDT measurement report to the wireless communication network in accordance with the logged MDT measurement configuration, wherein the logged MDT measurement report includes the signal measurements for the plurality of MDT measurement frequencies, and an indication that a signal measurement for the first early measurement frequency is not provided.

2. The method of Embodiment 1, wherein the plurality of early measurement frequencies includes the first early measurement frequency and a second early measurement frequency, wherein performing measurement in accordance with the early measurement configuration comprises providing a signal measurement for the second early measurement frequency, and wherein the logged MDT measurement report includes the signal measurement for the second early measurement frequency.

3. The method of any of Embodiments 1-2, wherein the signal measurement for the first early measurement frequency is not provided responsive to stopping measurement for the first early measurement frequency and/or for the plurality of early measurement frequencies.

4. The method of Embodiment 3, wherein stopping comprises pausing measurement for the first early measurement frequency in accordance with the early measurement configuration.

5. The method of any of Embodiments 2-4, wherein stopping measurement for the first early measurement frequency is responsive to at least one of,
the communication device being incapable of performing carrier aggregation, CA, using the first early measurement frequency and a serving frequency,
the communication device being incapable of performing dual connectivity, DC, using the first early measurement frequency and a serving frequency,
expiration of a duration to provide measurements in accordance with the early measurement configuration,
cell reselection,
inter Radio Access Technology (inter-RAT) cell reselection,
an autonomous inactive state to idle state transition,
a mismatch between the early measurement configuration and a subsequent early measurement configuration, and/or
a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

6. The method of any of Embodiments 1-5, wherein the indication includes an empty measurement result for the first early measurement frequency.

7. The method of Embodiment 6, wherein the empty measurement result comprises a pre-configured fixed value indicating that a signal measurement for the first early measurement frequency is not provided.

8. The method of any of Embodiments 1-7, wherein the indication that the signal measurement for the early measurement frequency is not provided includes an indication of at least one of,
the communication device being incapable of performing carrier aggregation, CA, using the first early measurement frequency and a serving frequency,
the communication device being incapable of performing dual connectivity, DC, using the first early measurement frequency and a serving frequency,
expiration of a duration to provide measurements in accordance with the early measurement configuration,
termination of early measurement for the first early measurement frequency,
cell reselection,
inter Radio Access Technology (inter-RAT) cell reselection,
early measurement for the first early measurement frequency being terminated due to cell reselection,
early measurement for the first early measurement frequency being terminated due to inter Radio Access Technology (inter-RAT) cell reselection,
an autonomous inactive state to idle state transition,
early measurement for the first early measurement frequency being terminated due to an autonomous inactive state to idle state transition,
a mismatch between the early measurement configuration and a subsequent measurement configuration, and/or
a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

9. The method of any of Embodiments 1-7, wherein the signal measurement for the first early measurement frequency is not provided responsive to the communication device being incapable of performing carrier aggregation, CA, using the first early measurement frequency and a serving frequency, and wherein the indication that the signal measurement for the first early measurement frequency is not provided includes an indication that the communication device was incapable of performing CA using the first early measurement frequency and the serving frequency.

10. The method of any of Embodiments 1-7, wherein the signal measurement for the first early measurement frequency is not provided responsive to the communication device being incapable of performing dual connectivity, DC, using the first early measurement frequency and a serving frequency, and wherein the indication that the signal measurement for the first early measurement frequency is not provided includes an indication that the communication device was incapable of performing DC using the first early measurement frequency and the serving frequency.

11. The method of any of Embodiments 1-7, wherein the signal measurement for the first early measurement frequency is not provided responsive to termination of first early measurement for the first early measurement frequency, and wherein the indication that the signal measurement for the first early measurement frequency is not provided includes an indication that early measurement for the first early measurement frequency was terminated.

12. The method of any of Embodiments 1-7, wherein the signal measurement for the first early measurement frequency is not provided responsive to termination of early measurement for the first early measurement frequency due to cell reselection, and wherein the indication that the signal measurement for the first early measurement frequency is not provided includes an indication that early measurement for the first early measurement frequency was terminated due to cell reselection.

13. The method of any of Embodiments 1-7, wherein the signal measurement for the first early measurement frequency is not provided responsive to termination of early measurement for the first early measurement frequency due to inter Radio Access Technology (inter-RAT) cell reselection, and wherein the indication that the signal measurement for the first early measurement frequency is not provided includes an indication that early measurement for the first early measurement frequency was terminated due to inter Radio Access Technology (inter-RAT) cell reselection.

14. The method of any of Embodiments 1-7, wherein the signal measurement for the first early measurement frequency is not provided responsive to termination of early measurement for the first early measurement frequency due to an inactive state to idle state transition, and wherein the indication that the signal measurement for the first early measurement frequency is not provided includes an indication that early measurement for the first early measurement frequency was terminated due to the inactive state to idle state transition.

15. The method of any of Embodiments 1-7, wherein the signal measurement for the early measurement frequency is not provided responsive to a mismatch between the first early measurement configuration and a subsequently received measurement configuration for the first early measurement frequency, and wherein the indication that the signal measurement for the first early measurement frequency is not provided includes an indication of the mismatch between the early measurement configuration and a subsequently received measurement configuration for the first early measurement frequency.

16. The method of Embodiment 15, wherein the early measurement configuration is a dedicated early measurement configuration and wherein the subsequently received measurement configuration is a broadcast measurement configuration, or wherein the early measurement configuration is a broadcast early measurement configuration and wherein the subsequently received measurement configuration is a dedicated measurement configuration 17. The method of any of Embodiments 1-16 further comprising: transitioning (2811) to a dormant state, wherein the MDT measurements are performed while in the dormant state, and wherein the early measurements are performed while in the dormant state; and transitioning (2821) to a connected state after transitioning to the dormant state, wherein the logged MDT measurement report is transmitted while in the connected state.

18. The method of Embodiment 17 further comprising: receiving (2809) a release message from the wireless communication network, wherein transitioning to the dormant state is responsive to receiving the release message; and receiving (2820) one of a resume message or a setup message from the wireless communication network, wherein transitioning to the connected state is responsive to receiving the one of the resume message or the setup message.

19. The method of Embodiment 18, wherein the early measurement configuration is received as an element of the release message.

20. The method of any of Embodiments 1-19, wherein at least one of the logged MDT measurement configuration and/or the early measurement configuration includes an indication to include results of early measurements in the logged MDT measurement report, and wherein the logged MDT measurement report includes the indication that the signal measurement for the first early measurement frequency is not provided responsive to the indication to include results of early measurements in the logged MDT measurement report.

21. The method of any of Embodiments 1-20, wherein the early measurement configuration includes a timer value specifying a duration of performing measurement according to the early measurement configuration.

22. A method of operating a communication device (300) in communication with a wireless communication network, the method comprising: receiving (2901) a logged Minimization of Drive Tests, MDT, measurement configuration from the wireless communication network, wherein the logged MDT measurement configuration identifies a plurality of MDT measurement frequencies; receiving (2905) an early measurement configuration from the wireless communication network, wherein the early measurement configuration identifies a plurality of early measurement frequencies including a first early measurement frequency; performing (2915) measurement for the plurality of MDT measurement frequencies in accordance with the logged MDT measurement configuration to provide signal measurements for the plurality of MDT measurements frequencies; performing (2919) measurement for the plurality of early measurement frequencies in accordance with the early measurement configuration to provide a signal measurement for the first early measurement frequency after a condition to stop early measurement for the first early measurement frequency has been satisfied; and transmitting (2925) a logged MDT measurement report to the wireless communication network in accordance with the logged MDT measurement configuration, wherein the logged MDT measurement report includes the signal measurements for the plurality of MDT measurement frequencies, and the signal measurement for the first early measurement frequency.

23. The method of Embodiment 22, wherein the condition to stop early measurement for the first early measurement frequency comprises at least one of,
- the communication device being incapable of performing carrier aggregation, CA, using the first early measurement frequency and a current serving frequency,
- the communication device being incapable of performing dual connectivity, DC, using the first early measurement frequency and a current serving frequency,
- expiration of a duration to provide measurements in accordance with the early measurement configuration,
- cell reselection,
- inter Radio Access Technology (inter-RAT) cell reselection,
- an autonomous inactive state to idle state transition,
- a mismatch between the early measurement configuration and a subsequent early measurement configuration, and/or
- a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

24. The method of any of Embodiments 22-23, wherein the logged MDT measurement report includes an indication of the condition to stop early measurement.

25. The method of Embodiment 24, wherein the indication of the condition to stop early measurement comprises an indication of at least one of,
- the communication device being incapable of performing carrier aggregation, CA, using the first early measurement frequency and a current serving frequency,
- the communication device being incapable of performing dual connectivity, DC, using the first early measurement frequency and a current serving frequency,
- expiration of a duration to provide measurements in accordance with the early measurement configuration,
- cell reselection,
- inter Radio Access Technology (inter-RAT) cell reselection,
- an autonomous inactive state to idle state transition,
- a mismatch between the early measurement configuration and a subsequent early measurement configuration, and/or
- a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

26. The method of Embodiment 22-25, wherein an early measurement duration timer is associated with the early measurement configuration, wherein the condition to stop early measurement for the first early measurement frequency comprises expiration of the early measurement duration timer, and wherein the signal measurement for the first early measurement frequency is provided after expiration of the early measurement duration timer.

27. The method of Embodiment 26, wherein the early measurement configuration includes a timer value for the early measurement duration timer.

28. The method of any of Embodiments 26-27, wherein the logged MDT report further includes an indication that the signal measurement for the first early measurement frequency was performed after expiration of the early measurement duration timer.

29. The method of any of Embodiments 26-28, wherein the wherein the signal measurement for the first early measurement frequency is a second signal measurement for the first early measurement frequency, wherein a first signal measurement for the first early measurement frequency from before expiration of the early measurement duration timer is included in the logged MDT measurement report.

30. The method of Embodiment 29, wherein the logged MDT report further includes an indication that the first signal measurement for the first early measurement frequency was performed before expiration of the early measurement duration timer.

31. The method of any of Embodiments 26-27, wherein the signal measurement for the first early measurement frequency is a second signal measurement for the first early measurement frequency, wherein a first signal measurement for the first early measurement frequency from before expiration of the early measurement duration timer is omitted from the logged MDT measurement report.

32. The method of Embodiment 22-25, wherein the condition to stop early measurement for the first early measurement frequency comprises the communication device being incapable of performing carrier aggregation, CA, using the first early measurement frequency and a serving frequency, and wherein the signal measurement for the first early measurement frequency is provided while the communication device is incapable of performing CA using the first early measurement frequency and the serving cell.

33. The method of Embodiment 22-25, wherein the condition to stop early measurement for the first early measurement frequency comprises the communication device being incapable of performing dual connectivity, DC, using the first early measurement frequency and a serving frequency, and wherein the signal measurement for the first early measurement frequency is provided while the communication device is incapable of performing DC using the first early measurement frequency and the serving cell.

34. The method of Embodiment 22-25, wherein the condition to stop early measurement for the first early measurement frequency comprises termination of early measurement for the first early measurement frequency due to cell reselection, and wherein the signal measurement for the first early measurement frequency is provided after termination of early measurement for the early measurement frequency due to cell reselection.

35. The method of Embodiment 34, wherein cell reselection comprises inter Radio Access Technology (inter RAT) cell reselection.

36. The method of Embodiment 22-25, wherein the condition to stop early measurement for the first early measurement frequency comprises termination of early measurement for the first early measurement frequency due to an inactive state to idle state transition, and wherein the signal measurement for the first early measurement frequency is provided after termination of early measurement for the first early measurement frequency due to the inactive state to idle state transition.

37. The method of Embodiment 22-25, wherein the condition to stop early measurement for the first early measurement frequency comprises a mismatch between the early measurement configuration and a subsequently received measurement configuration for the first early measurement frequency, and wherein the signal measurement for the first early measurement frequency is provided after occurrence of the mismatch.

38. The method of any of Embodiments 22-37, wherein the logged MDT measurement report includes an indication that the signal measurement for the first early measurement frequency was provided after the condition to stop early measurement.

39. The method of any of Embodiments 22-38, wherein the logged MDT measurement configuration includes an indication to include results of early measurements in the logged MDT measurement report, wherein the signal measurement for the first early measurement frequency is provided after the condition to stop early measurement for the first early measurement frequency responsive to the indication to include results of early measurements in the logged MDT measurement report, and wherein the signal measurement for the first early measurement frequency is included in the logged MDT measurement configuration responsive to the indication to include results of early measurements in the logged MDT measurement report.

40. The method of any of Embodiments 22-38, wherein the early measurement configuration includes an indication to include results of early measurements in the logged MDT measurement report, wherein the signal measurement for the first early measurement frequency is provided after the condition to stop early measurement for the first early measurement frequency responsive to the indication to include results of early measurements in the logged MDT measurement report, and wherein the signal measurement for the first early measurement frequency is included in the logged MDT measurement configuration responsive to the indication to include results of early measurements in the logged MDT measurement report.

41. The method of any of Embodiments 22-40 further comprising: transitioning (2911) to a dormant state, wherein the MDT measurements are performed while in the dormant state, and wherein the early measurements are performed while in the dormant state; and transitioning (2921) to a connected state after transitioning to the dormant state, wherein the logged MDT measurement report is transmitted while in the connected state.

42. The method of Embodiment 41 further comprising: receiving (2909) a release message from the wireless communication network, wherein transitioning to the dormant state is responsive to receiving the release message; and receiving (2920) one of a resume message or a setup message from the wireless communication network, wherein transitioning to the connected state is responsive to receiving the one of the resume message or the setup message.

43. The method of Embodiment 42, wherein the early measurement configuration is received as an element of the release message.

44. The method of any of Embodiments 22-43, wherein at least one of the logged MDT measurement configuration and/or the early measurement configuration includes an indication to include results of early measurements in the logged MDT measurement report, and wherein the logged MDT measurement report included the indication that the signal measurement for the first early measurement frequency is not provided responsive to the indication to include results of early measurements in the logged MDT measurement report.

45. The method of any of Embodiments 22-44, wherein stopping comprises pausing measurement for the first early measurement frequency.

46. A method of operating a node of a wireless communication network, the method comprising: providing (3001) a logged Minimization of Drive Tests, MDT, measurement configuration for a communication device (300), wherein the logged MDT measurement configuration identifies a plurality of MDT measurement frequencies; providing (3005) an early measurement configuration for the communication device, wherein the early measurement configuration identifies a plurality of early measurement frequencies including a first early measurement frequency; and receiving (3025) a logged MDT measurement report from the communication device in accordance with the logged MDT measurement configuration, wherein the logged MDT measurement report includes signal measurements for the plurality of MDT measurement frequencies, and an indication that a signal measurement for the first early measurement frequency is not provided.

47. The method of Embodiment 46, wherein the plurality of early measurement frequencies includes the first early measurement frequency and a second early measurement frequency, and wherein the logged MDT measurement report includes a signal measurement for the second early measurement frequency.

48. The method of any of Embodiments 46-47, wherein the indication includes an empty measurement result for the first early measurement frequency.

49. The method of Embodiment 48, wherein the empty measurement result comprises a pre-configured fixed value indicating that a signal measurement for the first early measurement frequency is not provided.

50. The method of any of Embodiments 46-49, wherein the indication that the signal measurement for the early measurement frequency is not provided includes an indication of at least one of,
- the communication device being incapable of performing carrier aggregation, CA, using the first early measurement frequency and a serving frequency,
- the communication device being incapable of performing dual connectivity, DC, using the first early measurement frequency and a serving frequency,
- expiration of a duration to provide measurements in accordance with the early measurement configuration,
- termination of early measurement for the first early measurement frequency,
- cell reselection,
- inter Radio Access Technology (inter-RAT) cell reselection,
- early measurement for the first early measurement frequency being terminated due to cell reselection,
- early measurement for the first early measurement frequency being terminated due to inter Radio Access Technology (inter-RAT) cell reselection,
- an autonomous inactive state to idle state transition,
- early measurement for the first early measurement frequency being terminated due to an autonomous inactive state to idle state transition,
- a mismatch between the early measurement configuration and a subsequent measurement configuration, and/or
- a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

51. The method of any of Embodiments 46-49, wherein the indication that the signal measurement for the first early measurement frequency is not provided includes an indication that the communication device was incapable of performing CA using the first early measurement frequency and the serving frequency.

52. The method of any of Embodiments 46-49, wherein the indication that the signal measurement for the first early measurement frequency is not provided includes an indication that the communication device was incapable of performing DC using the first early measurement frequency and the serving frequency.

53. The method of any of Embodiments 46-49, wherein the indication that the signal measurement for the first early measurement frequency is not provided includes an indication that early measurement for the first early measurement frequency was terminated.

54. The method of any of Embodiments 46-49, wherein the indication that the signal measurement for the first early measurement frequency is not provided includes an indication that early measurement for the first early measurement frequency was terminated due to cell reselection.

55. The method of any of Embodiments 46-49, wherein the indication that the signal measurement for the first early measurement frequency is not provided includes an indication that early measurement for the first early measurement frequency was terminated due to inter Radio Access Technology (inter-RAT) cell reselection.

56. The method of any of Embodiments 46-49, wherein the indication that the signal measurement for the first early measurement frequency is not provided includes an indication that early measurement for the first early measurement frequency was terminated due to an inactive state to idle state transition.

57. The method of any of Embodiments 46-49, wherein the indication that the signal measurement for the first early measurement frequency is not provided includes an indication of a mismatch between the early measurement configuration and a subsequently received measurement configuration for the first early measurement frequency.

58. The method of Embodiment 57, wherein the early measurement configuration is a dedicated early measurement configuration and wherein the subsequently received measurement configuration is a broadcast measurement configuration, or wherein the early measurement configuration is a broadcast early measurement configuration and wherein the subsequently received measurement configuration is a dedicated measurement configuration 59. The method of Embodiments 46-58 further comprising: transmitting (3009) a release message to the communication device, wherein the communication device transitions to a dormant state responsive to receiving the release message; and transmitting (3015) one of a resume message or a setup message to the communication device, wherein the communication device transitions to a connected state responsive to receiving the one of the resume message or the setup message.

60. The method of Embodiment 59, wherein the early measurement configuration is transmitted as an element of the release message.

61. The method of any of Embodiments 46-60, wherein at least one of the logged MDT measurement configuration and/or the early measurement configuration includes an indication to include results of early measurements in the logged MDT measurement report, and wherein the logged MDT measurement report includes the indication that the signal measurement for the first early measurement frequency is not provided responsive to the indication to include results of early measurements in the logged MDT measurement report.

62. The method of any of Embodiments 46-61, wherein the early measurement configuration includes a timer value specifying a duration of performing measurement according to the early measurement configuration.

63. A method of operating a node of a wireless communication network, the method comprising: providing (3101) a logged Minimization of Drive Tests, MDT, measurement configuration for a communication device, wherein the logged MDT measurement configuration identifies a plurality of MDT measurement frequencies; providing (3105) an early measurement configuration for the communication device, wherein the early measurement configuration identifies a plurality of early measurement frequencies including a first early measurement frequency; and receiving (3125) a logged MDT measurement report from the communication device in accordance with the logged MDT measurement configuration, wherein the logged MDT measurement report includes signal measurements for the plurality of MDT measurement frequencies, a signal measurement for the first early measurement frequency, and an indication of a condition to stop early measurement for the first early measurement frequency.

64. The method of Embodiment 63, wherein the indication of the condition to stop early measurement comprises an indication at least one of,
 the communication device being incapable of performing carrier aggregation, CA, using the first early measurement frequency and a current serving frequency,
 the communication device being incapable of performing dual connectivity, DC, using the first early measurement frequency and a current serving frequency,
 expiration of a duration to provide measurements in accordance with the early measurement configuration,
 cell reselection,
 inter Radio Access Technology (inter-RAT) cell reselection,
 an autonomous inactive state to idle state transition,
 a mismatch between the early measurement configuration and a subsequent early measurement configuration, and/or
 a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

65. The method of Embodiment 63, wherein an early measurement duration timer is associated with the early measurement configuration, and wherein the indication of the condition to stop early measurement comprises an indication of expiration of the early measurement duration timer.

66. The method of Embodiment 65, wherein the early measurement configuration includes a timer value for the early measurement duration timer.

67. The method of any of Embodiments 65-66, wherein the indication of the condition to stop early measurement comprises an indication that the signal measurement for the early measurement frequency was performed after expiration of the early measurement duration timer.

68. The method of any of Embodiments 65-67, wherein the signal measurement for the first early measurement frequency is a second signal measurement for the first early measurement frequency, and wherein a first signal measurement for the first early measurement frequency from before expiration of the early measurement duration timer is included in the logged MDT measurement report.

69. The method of Embodiment 68, wherein the logged MDT report further includes an indication that the first signal measurement for the early measurement frequency was performed before expiration of the early measurement duration timer.

70. The method of Embodiment 63, wherein the indication of the condition to stop early measurement comprises an indication of the communication device being incapable of performing carrier aggregation, CA, using the first early measurement frequency and a serving frequency.

71. The method of Embodiment 63, wherein the indication of the condition to stop early measurement comprises an indication of the communication device being incapable of performing dual connectivity, DC, using the early measurement frequency and a serving frequency.

72. The method of Embodiment 63, wherein the indication of the condition to stop early measurement comprises an indication of termination of early measurement for the early measurement frequency due to cell reselection.

73. The method of Embodiment 72, wherein cell reselection comprises inter Radio Access Technology (inter RAT) cell reselection.

74. The method of Embodiment 63, wherein the indication of the condition to stop early measurement comprises an indication of termination of early measurement for the first early measurement frequency due to an inactive state to idle state transition.

75. The method of Embodiment 63, wherein the indication of the condition to stop early measurement comprises an indication of a mismatch between the early measurement configuration and a subsequently received measurement configuration for the first early measurement frequency.

76. The method of any of Embodiments 63-75, wherein the logged MDT measurement configuration includes an indication to include results of early measurements in the logged MDT measurement report, and wherein the signal measurement for the first early measurement frequency is included in the logged MDT measurement configuration responsive to the indication to include results of early measurements in the logged MDT measurement report.

77. The method of any of Embodiments 63-75, wherein the early measurement configuration includes an indication to include results of early measurements in the logged MDT measurement report, and wherein the signal measurement for the first early measurement frequency is included in the logged MDT measurement configuration responsive to the indication to include results of early measurements in the logged MDT measurement report.

78. The method of Embodiments 63-77 further comprising: transmitting (3109) a release message to the communication device, wherein the communication device transitions to a dormant state responsive to receiving the release message; and transmitting (3115) one of a resume message or a setup message to the communication device, wherein the communication device transitions to a connected state responsive to receiving the one of the resume message or the setup message.

79. The method of Embodiment 78, wherein the early measurement configuration is transmitted as an element of the release message.

80. A communication device (300) comprising: processing circuitry (303); and memory (305) coupled with the processing circuitry, wherein the memory includes instructions that when executed by the processing circuitry causes the communication device to perform operations according to any of Embodiments 1-45.

81. A communication device (300) adapted to perform according to any of Embodiments 1-45.

82. A computer program comprising program code to be executed by processing circuitry (303) of a communication device (300), whereby execution of the program code causes the communication device (300) to perform operations according to any of embodiments 1-45.

83. A computer program product comprising a non-transitory storage medium including program code to be executed by processing circuitry (303) of a communication device (300), whereby execution of the program code causes the communication device (300) to perform operations according to any of embodiments 1-45.

84. A radio access network, RAN, node (400) comprising: processing circuitry (403); and memory (405) coupled with the processing circuitry, wherein the memory includes instructions that when executed by the processing circuitry causes the RAN node to perform operations according to any of Embodiments 46-79.

85. A radio access network, RAN, node (400) adapted to perform according to any of Embodiments 46-79.

86. A computer program comprising program code to be executed by processing circuitry (403) of a radio access network, RAN, node (400), whereby execution of the program code causes the RAN node (400) to perform operations according to any of embodiments 46-79.

87. A computer program product comprising a non-transitory storage medium including program code to be executed by processing circuitry (403) of a radio access network, RAN, node (400), whereby execution of the program code causes the RAN node (400) to perform operations according to any of embodiments 46-79.

88. A method of operating a communication device (300) in communication with a wireless communication network, the method comprising: receiving (2401, 2501) an early measurement configuration from the wireless communication network, wherein the early measurement configuration includes a received signal threshold (e.g., qualityThreshold) for early measurement reports; receiving (2405, 2505) a logged Minimization of Drive Tests, MDT, measurement configuration from the wireless communication network; transitioning (2411, 2511) to a dormant state; performing (2415, 2515) early measurements for a first plurality of frequencies in accordance with the early measurement configuration while in the dormant state to generate a first received signal measurement for a first frequency of the first plurality of frequencies and a second received signal measurement for a second frequency of the first plurality of frequencies, wherein the first received signal measurement for the first frequency satisfies the received signal threshold, and wherein the second received signal measurement for the second frequency fails to satisfy the received signal threshold; performing (2419, 2519) MDT measurements for a second plurality of frequencies in accordance with the logged MDT measurement configuration while in the dormant state to generate received signal measurements for the second plurality of frequencies; transitioning (2421, 2521) to a connected state; and transmitting (2425, 2525) a logged MDT measurement report to the wireless communication network in accordance with the logged MDT measurement configuration while in the connected state, wherein the logged MDT measurement report includes the first received signal measurement for the first frequency, the second received signal measurement for the second frequency, and the received signal measurements for the second plurality of frequencies.

89. The method of Embodiment 88 further comprising: transmitting (2429, 2529) an early measurement report to the wireless communication network in accordance with the early measurement configuration, wherein the early measurement report includes the first received signal measurement responsive to the first received signal measurement satisfying the received signal threshold, and wherein the early measurement report omits the second received signal measurement responsive to the second received signal measurement failing to satisfy the received signal threshold.

90. The method of Embodiment 89, wherein the early measurement report omits the received signal measurements for the second plurality of frequencies.

91. The method of any of Embodiments 88-90, wherein the logged MDT measurement report includes the early measurement configuration.

92. The method of Embodiment 91, wherein the early measurement configuration includes respective indications for each of the first plurality of frequencies including the first and second frequencies, and wherein the logged MDT measurement report includes the respective indications for each of the first plurality of frequencies including the first and second frequencies.

93. The method of any of Embodiments 91-92, wherein the early measurement configuration includes the received signal threshold, and wherein the logged MDT measurement report includes the received signal threshold.

94. The method of any of Embodiments 91-93, wherein the early measurement configuration includes at least one of a validity area and/or a duration for which the early measurement configuration is applicable, and wherein the logged MDT measurement report includes the at least one of a validity area and/or a duration for which the early measurement configuration is applicable.

95. The method of any of Embodiments 91-94, wherein the early measurement configuration is a first early measurement configuration, the method further comprising: receiving (2513) a second early measurement configuration while in the dormant state after receiving the first early measurement configuration, wherein the first and second early measurement configurations are different; wherein the logged MDT measurement report includes the second early measurement configuration.

96. The method of any of Embodiments 88-95 further comprising: receiving (2409, 2509) a release message from the wireless communication network; wherein transitioning to the dormant state is in response to receiving the release message.

97. The method of Embodiment 96, wherein the release message comprises a Radio Resource Control, RRC, connection release message or an RRC release message.

98. The method of any of Embodiments 96-97, wherein the early measurement configuration is received as an element of the release message.

99. The method of any of Embodiments 88-97, wherein the early measurement configuration is received as an element of a system information block broadcast from the wireless communication network.

100. The method of any of Embodiments 88-99, wherein transitioning to the connected state comprises transitioning to the connected state responsive to receiving a resume message or a setup message from the wireless communication network.

101. The method of Embodiment 100, wherein the resume message comprises a Radio Resource Control, RRC, connection resume message or an RRC resume message, or wherein the setup message comprises an RRC connection setup message or an RRC setup message.

102. The method of any of Embodiments 88-101, wherein the logged MDT measurement report is transmitted responsive to receiving an information request from the wireless communication network.

103. The method of any of Embodiments 88-102, wherein the logged MDT measurement configuration includes an area configuration defining a set of frequencies, and wherein the MDT measurements are performed for the second plurality of frequencies responsive to the second plurality of frequencies being included in the set.

104. The method of any of Embodiments 88-103, wherein the logged MDT measurement configuration includes a logging duration defining a duration over which MDT measurements should be logged, and wherein the MDT measurements are performed for the second plurality of frequencies during the logging duration.

105. The method of any of Embodiments 88-104, wherein the logged MDT measurement configuration includes a logging interval defining a period between measurements of the logged MDT measurement configuration, and wherein the MDT measurements are performed for the second plurality of frequencies in accordance with the logging interval.

106. The method of any of Embodiments 88-105, wherein the dormant state comprises an idle state or an inactive state.

107. The method of any of Embodiments 88-106, wherein the logged MDT configuration includes an indication that results of performing early measurements should be included in logged MDT measurement reports, and wherein the first received signal measurement for the first frequency is included in the logged MDT measurement report responsive to the indication that results of performing early measurements should be included in logged MDT measurement reports.

108. The method of any of Embodiments 88-107, wherein the MDT configuration includes an indication that the received signal threshold is not applicable to logged MDT measurement reports, and wherein the second received signal measurement for the second frequency is included in the logged MDT measurement report responsive to the indication that the received signal threshold is not applicable to logged MDT measurement reports.

109. The method of any of Embodiments 88-108, wherein performing early measurements comprises performing early measurements for a third plurality of frequencies in accordance with the early measurement configuration before performing early measurements for the first plurality of frequencies to generate received signal measurements for the third plurality of frequencies.

110. The method of Embodiment 109, wherein the MDT measurement report omits the received signal measurements for the third plurality of frequencies.

111. The method of Embodiment 109, wherein the MDT measurement report includes the received signal measurements for the third plurality of frequencies.

112. The method of any of Embodiments 109-111, wherein the received signal measurements for the third plurality of frequencies comprises received signal quality and/or power measurements for the third plurality of frequencies.

113. The method of any of Embodiments 88-112, wherein the received signal threshold comprises a received signal quality and/or power threshold, wherein the first received signal measurement comprises a first received signal quality and/or power measurement, wherein the second received signal measurement comprises a second received signal quality and/or power measurement, and wherein the received signal measurements for the second plurality of frequencies comprise received signal quality and/or power measurements for the second plurality of frequencies.

114. A method of operating a node of a wireless communication network, the method comprising: transmitting (2601, 2701) an early measurement configuration to a communication device (300), wherein the early measurement configuration includes a received signal threshold (e.g., qualityThreshold) for early measurement reports; transmitting (2605, 2705) a logged Minimization of Drive Tests, MDT, measurement configuration to the communication device; transmitting (2609, 2709) a release message to the communication device, wherein the release message initiates transitioning of the communication device to a dormant state; after transmitting the release message, transmitting (2615, 2715) a resume message or a setup message to the communication device, wherein the resume message or the setup message initiates transitioning of the communication device to a connected state; and after transmitting the resume request message or the setup request message, receiving (2625, 2725) a logged MDT measurement report from the communication device, wherein the logged MDT measurement report includes a plurality of signal measurements for a respective plurality of frequencies, and wherein the logged MDT measurement report includes the early measurement configuration.

115. The method of Embodiment 114, wherein the early measurement configuration includes respective indications a plurality of frequencies, and wherein the logged MDT measurement report includes the respective indications for the plurality of frequencies.

116. The method of Embodiment 115, wherein each of the plurality of signal measurements is provided for a respective one of the indications for the plurality of frequencies, and wherein no signal measurement is provided for at least one of the indications for the plurality of frequencies.

117. The method of any of Embodiments 114-116, wherein the early measurement configuration includes the received signal threshold, and wherein the logged MDT measurement report includes the received signal threshold.

118. The method of any of Embodiments 114-117, wherein the early measurement configuration includes at least one of a validity area and/or a duration for which the early measurement configuration is applicable, and wherein the logged MDT measurement report includes the at least one of a validity area and/or a duration for which the early measurement configuration is applicable.

119. The method of any of Embodiments 114-118, wherein the early measurement configuration is a first early measurement configuration, the method further comprising: transmitting (2713) a second early measurement configuration while the communication device is in the dormant state after transmitting the first early measurement configuration, wherein the first and second early measurement configurations are different; wherein the logged MDT measurement report includes the second early measurement configuration.

120. The method of any of Embodiments 114-119, wherein the release message comprises a Radio Resource Control, RRC, connection release message or an RRC release message.

121. The method of any of Embodiments 114-120, wherein the early measurement configuration is transmitted as an element of the release message.

122. The method of any of Embodiments 114-120, wherein the early measurement configuration is transmitted as an element of a system information block broadcast from the wireless communication network.

123. The method of any of Embodiments 114-122, wherein the resume request message comprises a Radio Resource Control, RRC, connection resume message or an RRC resume message, or wherein the setup message comprises an RRC connection setup message or an RRC setup message.

124. The method of any of Embodiments 114-123, wherein the dormant state comprises an idle state or an inactive state.

125. The method of any of Embodiments 114-124, wherein the logged MDT configuration includes an indication that results of performing early measurements should be included in logged MDT measurement reports.

126. The method of any of Embodiments 114-125, wherein the MDT configuration includes an indication that the received signal threshold is not applicable to logged MDT measurement reports.

127. The method of any of Embodiments 114-126, wherein the received signal threshold comprises a received signal quality and/or power threshold, and wherein the plurality of signal measurements comprises a plurality of signal quality and/or power measurements.

128. A communication device (300) comprising:
processing circuitry (303); and
memory (305) coupled with the processing circuitry, wherein the memory includes instructions that when executed by the processing circuitry causes the communication device to perform operations according to any of Embodiments 88-113.

129. A communication device (300) adapted to perform according to any of Embodiments 88-113.

130. A computer program comprising program code to be executed by processing circuitry (303) of a communication device (300), whereby execution of the program code causes the communication device (300) to perform operations according to any of embodiments 88-113.

131. A computer program product comprising a non-transitory storage medium including program code to be executed by processing circuitry (303) of a communication device (300), whereby execution of the program code causes the communication device (300) to perform operations according to any of embodiments 88-113.

132. A radio access network, RAN, node (400) comprising: processing circuitry (403); and memory (405) coupled with the processing circuitry, wherein the memory includes instructions that when executed by the processing circuitry causes the RAN node to perform operations according to any of Embodiments 114-127.

133. A radio access network, RAN, node (400) adapted to perform according to any of Embodiments 114-127.

134. A computer program comprising program code to be executed by processing circuitry (403) of a radio access network, RAN, node (400), whereby execution of the program code causes the RAN node (400) to perform operations according to any of embodiments 114-127.

135. A computer program product comprising a non-transitory storage medium including program code to be executed by processing circuitry (403) of a radio access network, RAN, node (400), whereby execution of the program code causes the RAN node (400) to perform operations according to any of embodiments 114-127.

136. A method of operating a communication device (300) in communication with a wireless communication network, the method comprising: receiving (1801) a logged Minimization of Drive Tests, MDT, measurement configuration from the wireless communication network; receiving (1805) an early measurement configuration from the wireless communication network, wherein the early measurement configuration identifies a plurality of early measurement frequencies including a first early measurement frequency; logging (1815) a plurality of MDT signal measurements in accordance with the logged MDT measurement configuration; performing (1819) measurements in accordance with the early measurement configuration, wherein a signal measurement for the first early measurement frequency is not provided; and transmitting (1825) a logged MDT measurement report to the wireless communication network in accordance with the logged MDT measurement configuration, wherein the logged MDT measurement report includes the plurality of MDT signal measurements, and an indication that a signal measurement for the first early measurement frequency is not provided.

137. The method of Embodiment 136 further comprising: performing (1831) a plurality of measurements used for cell reselection evaluation; wherein logging the plurality of MDT signal measurements comprises logging the plurality of MDT signal measurement based on the plurality of measurements used for cell reselection evaluation.

138. The method of Embodiment 137, wherein performing the plurality of measurements used for cell reselection evaluation comprises performing the plurality of measurements for respective frequencies used for cell reselection evaluation.

139. The method of any of Embodiments 136-138, wherein the plurality of early measurement frequencies includes the first early measurement frequency and a second early measurement frequency, wherein performing measurements in accordance with the early measurement configuration comprises providing a signal measurement for the second early measurement frequency, and wherein the logged MDT measurement report includes the signal measurement for the second early measurement frequency.

140. The method of any of Embodiments 136-139, wherein the signal measurement for the first early measurement frequency is not provided responsive to stopping measurement for the first early measurement frequency and/or for the plurality of early measurement frequencies.

141. The method of Embodiment 140, wherein stopping comprises pausing measurement for the first early measurement frequency in accordance with the early measurement configuration.

142. The method of any of Embodiments 140-141, wherein stopping measurement for the first early measurement frequency is responsive to at least one of,
the communication device being incapable of performing carrier aggregation, CA, using the first early measurement frequency and a serving frequency,
the communication device being incapable of performing dual connectivity, DC, using the first early measurement frequency and a serving frequency,
expiration of a duration to provide measurements in accordance with the early measurement configuration,
cell reselection,
inter Radio Access Technology (inter-RAT) cell reselection,
an autonomous inactive state to idle state transition,
a mismatch between the early measurement configuration and a subsequent early measurement configuration, and/or
a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

143. The method of any of Embodiments 136-142 further comprising: transitioning (1811) to a dormant state, wherein the plurality of MDT signal measurements are logged while in the dormant state, and wherein the measurements in accordance with the early measurement configuration are performed while in the dormant state; and transitioning (1821) to a connected state after transitioning to the dormant state, wherein the logged MDT measurement report is transmitted while in the connected state.

144. The method of any of Embodiments 136-143, wherein at least one of the logged MDT measurement configuration and/or the early measurement configuration includes an indication to include results of early measurements in the logged MDT measurement report, and wherein the logged MDT measurement report includes the indication that the signal measurement for the first early measurement frequency is not provided responsive to the indication to include results of early measurements in the logged MDT measurement report.

145. A method of operating a node of a wireless communication network, the method comprising: providing (1901) a logged Minimization of Drive Tests, MDT, measurement configuration for a communication device (300); providing (1905) an early measurement configuration for the communication device, wherein the early measurement configuration identifies a plurality of early measurement frequencies including a first early measurement frequency; and receiving (1925) a logged MDT measurement report from the communication device in accordance with the logged MDT measurement configuration, wherein the logged MDT measurement report includes a plurality of MDT signal measurements, and an indication that a signal measurement for the first early measurement frequency is not provided.

146. The method of Embodiment 145, wherein the plurality of MDT signal measurements are based on a plurality of measurements used for cell reselection evaluation.

147. The method of Embodiment 146, wherein the plurality of measurements used for cell reselection evaluation are a plurality of measurements for respective frequencies used for cell reselection evaluation.

148. The method of any of Embodiments 145-147, wherein the plurality of early measurement frequencies includes the first early measurement frequency and a second early measurement frequency, and wherein the logged MDT measurement report includes a signal measurement for the second early measurement frequency.

149. The method of any of Embodiments 145-148, wherein the indication includes an empty measurement result for the first early measurement frequency.

150. The method of Embodiment 149, wherein the empty measurement result comprises a pre-configured fixed value indicating that a signal measurement for the first early measurement frequency is not provided.

151. The method of any of Embodiments 145-150, wherein the indication that the signal measurement for the early measurement frequency is not provided includes an indication of at least one of, the communication device being incapable of performing carrier aggregation, CA, using the first early measurement frequency and a serving frequency,
the communication device being incapable of performing dual connectivity, DC, using the first early measurement frequency and a serving frequency,
expiration of a duration to provide measurements in accordance with the early measurement configuration,
termination of early measurement for the first early measurement frequency,
cell reselection,
inter Radio Access Technology (inter-RAT) cell reselection,
early measurement for the first early measurement frequency being terminated due to cell reselection,
early measurement for the first early measurement frequency being terminated due to inter Radio Access Technology (inter-RAT) cell reselection,
an autonomous inactive state to idle state transition,
early measurement for the first early measurement frequency being terminated due to an autonomous inactive state to idle state transition,
a mismatch between the early measurement configuration and a subsequent measurement configuration, and/or
a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

152. The method of any of Embodiments 145-151, wherein at least one of the logged MDT measurement configuration and/or the early measurement configuration includes an indication to include results of early measurements in the logged MDT measurement report, and wherein the logged MDT measurement report includes the indication that the signal measurement for the first early measurement frequency is not provided responsive to the indication to include results of early measurements in the logged MDT measurement report.

153. The method of any of Embodiments 145-152, wherein the early measurement configuration includes a timer value specifying a duration of performing measurement according to the early measurement configuration.

154. A communication device (300) adapted to perform a method according to any of Embodiments 136-144.

155. A computer program comprising program code to be executed by processing circuitry (303) of a communication device (300), whereby execution of the program code causes the communication device (300) to perform operations according to any of Embodiments 136-144.

156. A computer program product comprising a non-transitory storage medium including program code to be executed by processing circuitry (303) of a communication device (300), whereby execution of the program code causes the communication device (300) to perform operations according to any of Embodiments 136-144.

157. A communication device (300) comprising: processing circuitry (303); and memory (305) coupled with the processing circuitry, wherein the memory includes instructions that when executed by the processing circuitry causes the communication device to perform operations according to any of Embodiments 136-144.

158. A radio access network, RAN, node (400) adapted to perform a method according to any of Embodiments 145-153.

159. A computer program comprising program code to be executed by processing circuitry (403) of a radio access network, RAN, node (400), whereby execution of the program code causes the RAN node (400) to perform operations according to any of Embodiments 145-153.

160. A computer program product comprising a non-transitory storage medium including program code to be executed by processing circuitry (403) of a radio access network, RAN, node (400), whereby execution of the program code causes the RAN node (400) to perform operations according to any of Embodiments 145-153.

161. A radio access network, RAN, node (400) comprising: processing circuitry (403); and memory (405) coupled with the processing circuitry, wherein the memory includes instructions that when executed by the processing circuitry causes the RAN node to perform operations according to any of Embodiments 145-153.

Explanations are provided below for various abbreviations/acronyms used in the present disclosure.

| Abbreviation | Explanation |
| --- | --- |
| AS | Access Stratum |
| CA | Carrier Aggregation |
| DC | Dual Connectivity |
| DL | Downlink |
| EUTRA | Evolved Universal Terrestrial Radio Access |
| E-UTRAN | Evolved Universal Terrestrial Radio Access Network |
| ID | Identity |
| IE | Information Element |
| LTE | Long Term Evolution |
| MBSFN | Multicast-broadcast single-frequency network |
| MDT | Minimization of drive test |
| NR | New Radio |
| NSA | Non-Standalone |
| OAM | Operation and Maintenance |
| PLMN | Public Land Mobile Network |
| RPLMN | Registered PLMN |
| UE | User Equipment |
| RAT | Radio Access Technology |
| RRC | Radio Resource Control |
| RS | Reference Signal |
| RSRP | Reference Signal Received Power |
| RSRQ | Reference Signal Received Quality |
| SIB | System Information Block |
| SSB | Synchronization Signal Block |
| UL | Uplink |

References are identified below.
Reference [1] 3GPP TS 36.331, V15.8.0 (2019 December)
Reference [2] Tdoc R2-1915734, Samsung, "MDT for early measurements (Logged, Immediate)," 3GPP TSG-RAN WG2 #108 meeting, Reno, USA, 14-18 Nov. 2019

Additional explanation is provided below.
Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 20:
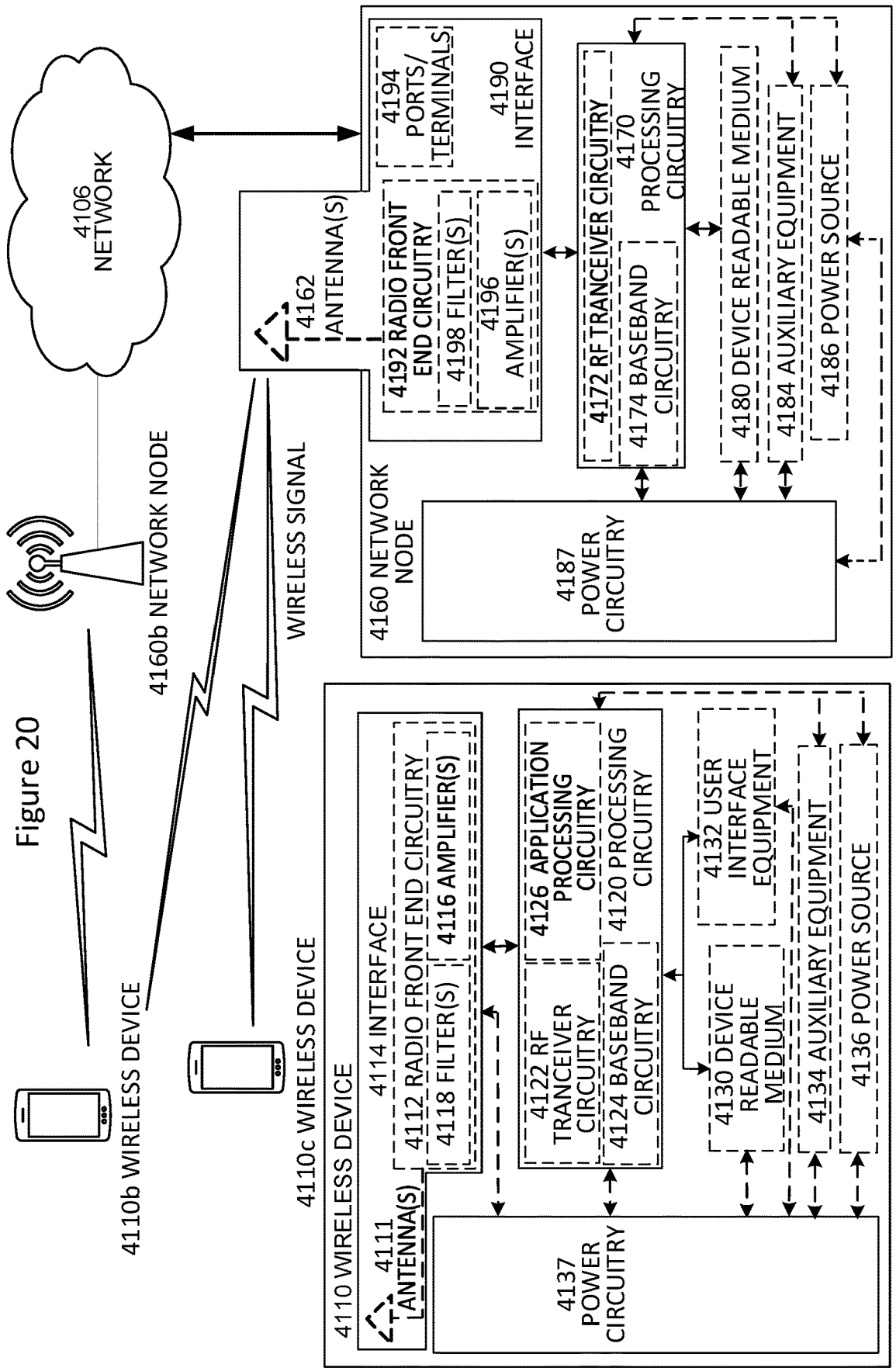
FIG. 20 is a block diagram of a wireless network in accordance with some embodiments.

FIG. 20 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 20. For simplicity, the wireless network of FIG. 20 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 20, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 20 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4190 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 20 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4114 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 21:
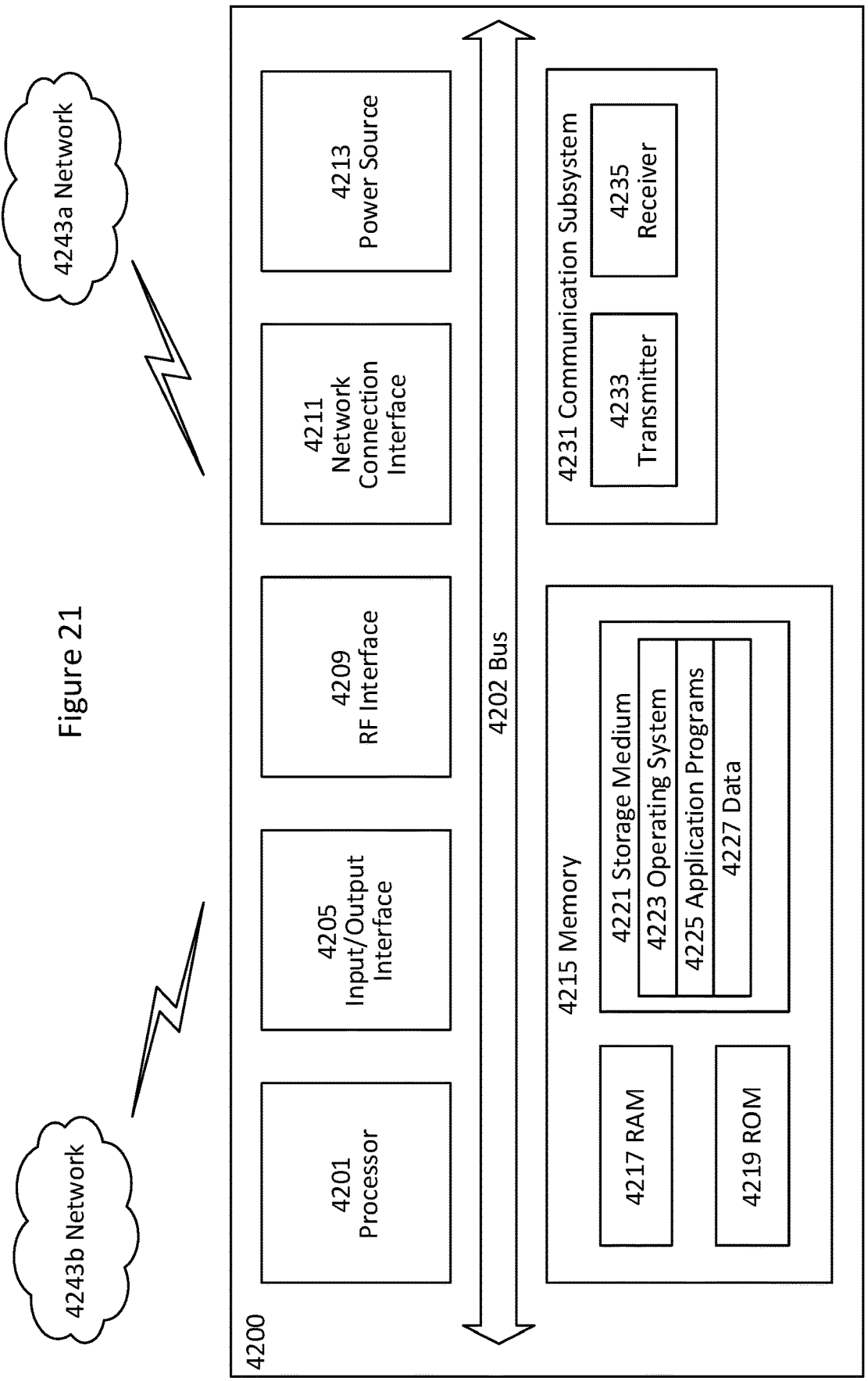
FIG. 21 is a block diagram of a user equipment in accordance with some embodiments

FIG. 21 illustrates a user Equipment in accordance with some embodiments.

FIG. 21 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 21, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 21 is a UE, the components discussed herein are equally applicable to a WD, and vice-versa.

In FIG. 21, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4233, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 21, or only a subset of the components. The level of integration between the components may vary from one UE to another UE. Further, certain UEs may contain multiple instances of a component, such as multiple processors, memories, transceivers, transmitters, receivers, etc.

In FIG. 21, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 21, RF interface 4209 may be configured to provide a communication interface to RF components such as a transmitter, a receiver, and an antenna. Network connection interface 4211 may be configured to provide a communication interface to network 4243a. Network 4243a may encompass wired and/or wireless networks such as a local-area network (LAN), a wide-area network (WAN), a computer network, a wireless network, a telecommunications network, another like network or any combination thereof. For example, network 4243a may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 21, processing circuitry 4201 may be configured to communicate with network 4243b using communication subsystem 4231. Network 4243a and network 4243b may be the same network or networks or different network or networks. Communication subsystem 4231 may be configured to include one or more transceivers used to communicate with network 4243b. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243b may encompass wired and/or wireless networks such as a local-area network (LAN), a wide-area network (WAN), a computer network, a wireless network, a telecommunications network, another like network or any combination thereof. For example, network 4243b may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 22:
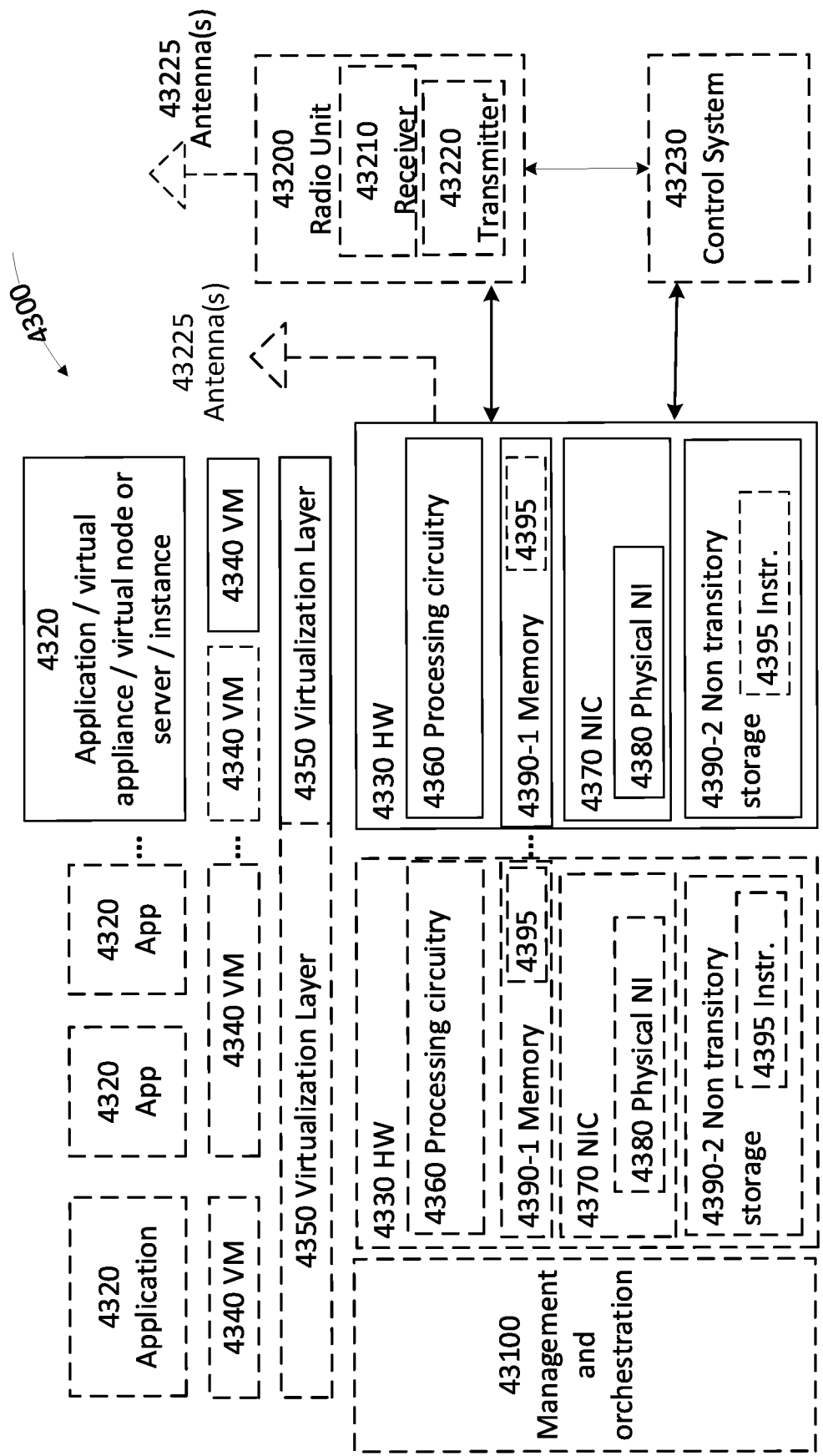
FIG. 22 is a block diagram of a virtualization environment in accordance with some embodiments.

FIG. 22 illustrates a virtualization environment in accordance with some embodiments.

FIG. 22 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 22, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 22.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 23:
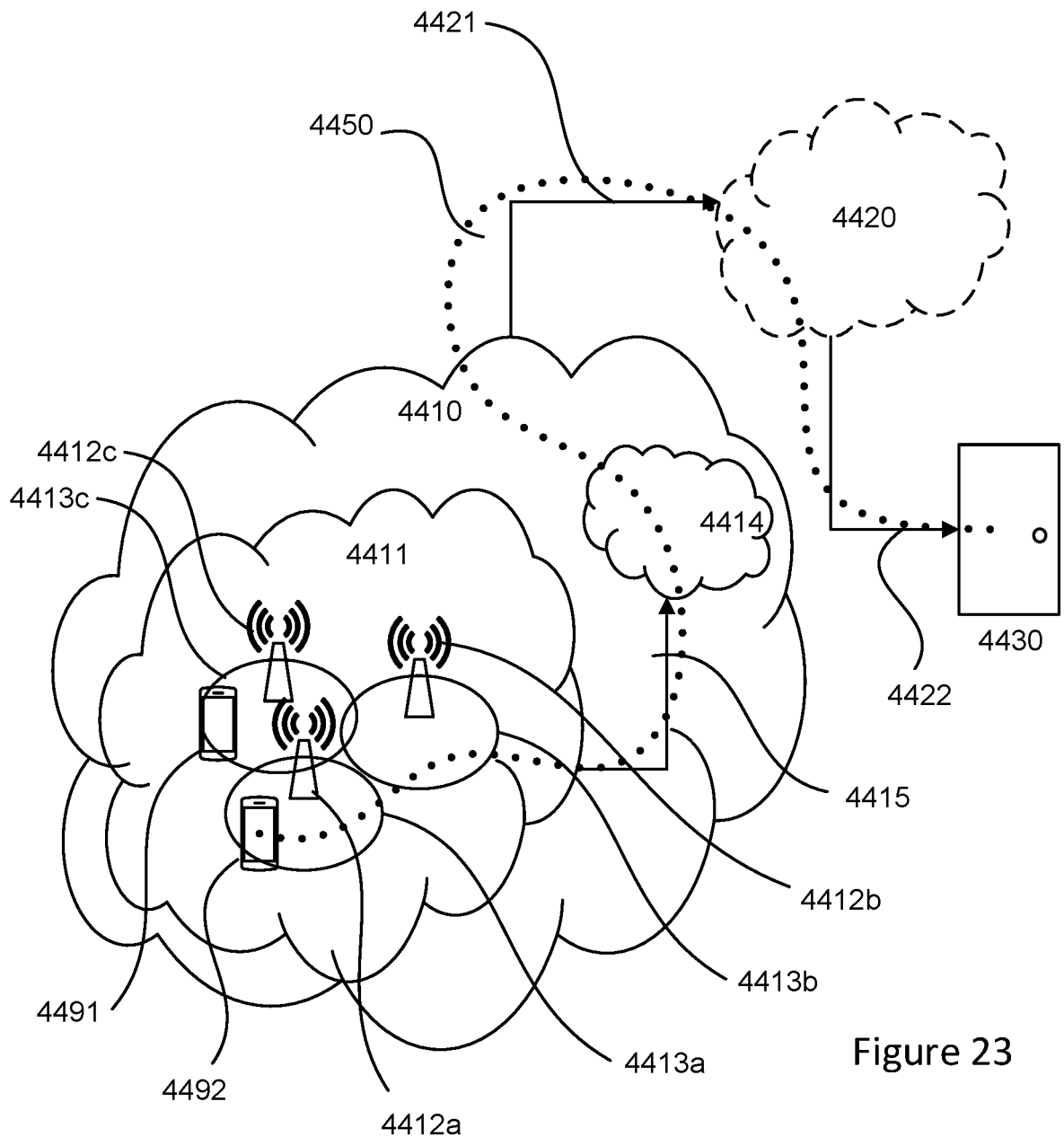
FIG. 23 is a block diagram of a telecommunication network connected via an intermediate network to a host computer in accordance with some embodiments.

FIG. 23 illustrates a telecommunication network connected via an intermediate network to a host computer in accordance with some embodiments.

With reference to FIG. 23, in accordance with an embodiment, a communication system includes telecommunication network 4410, such as a 3GPP-type cellular network, which comprises access network 4411, such as a radio access network, and core network 4414. Access network 4411 comprises a plurality of base stations 4412a, 4412b, 4412c, such as NBs, eNBs, gNBs or other types of wireless access points, each defining a corresponding coverage area 4413a, 4413b, 4413c. Each base station 4412a, 4412b, 4412c is connectable to core network 4414 over a wired or wireless connection 4415. A first UE 4491 located in coverage area 4413c is configured to wirelessly connect to, or be paged by, the corresponding base station 4412c. A second UE 4492 in coverage area 4413a is wirelessly connectable to the corresponding base station 4412a. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 23 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 24:
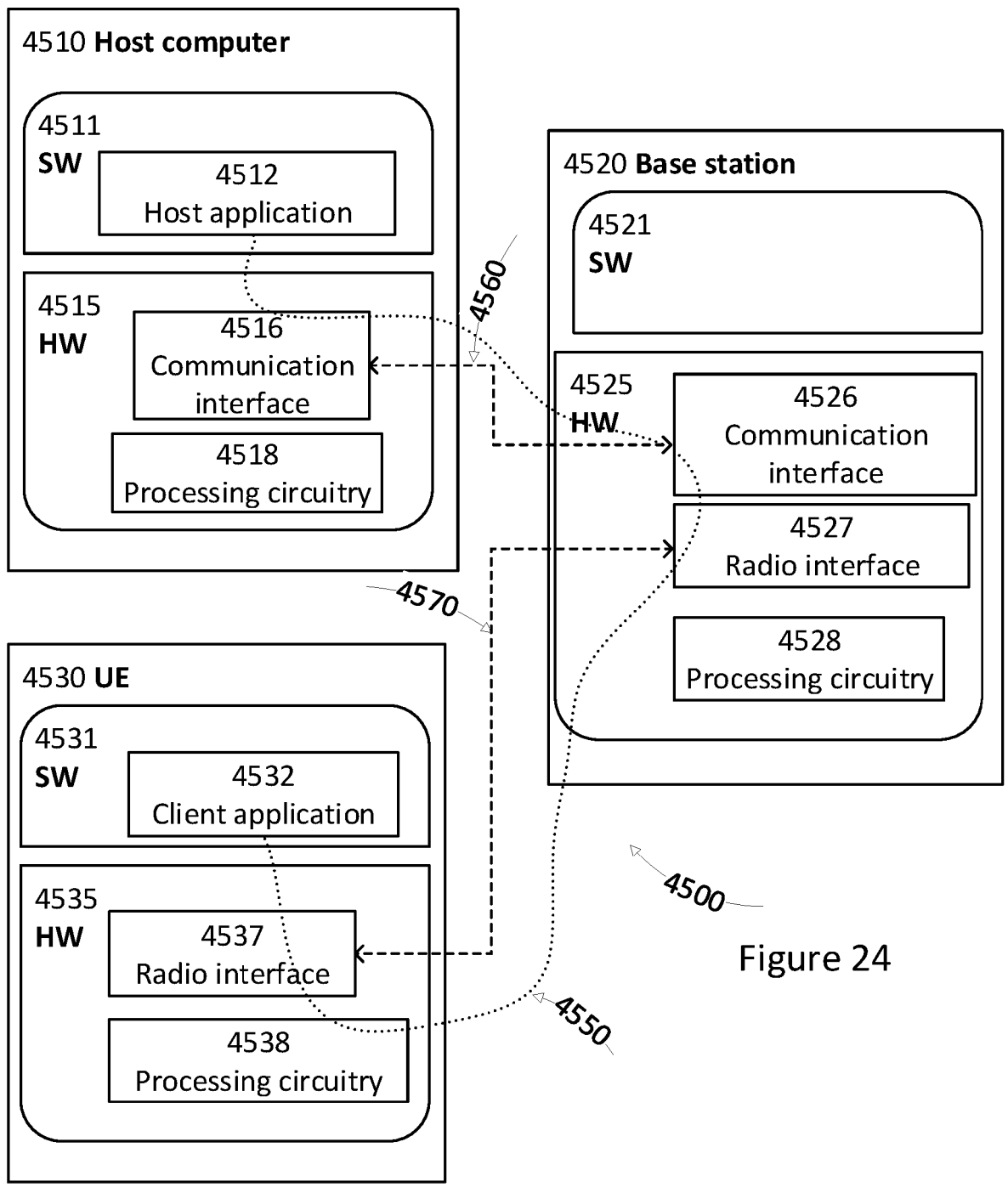
FIG. 24 is a block diagram of a host computer communicating via a base station with a user equipment over a partially wireless connection in accordance with some embodiments.

FIG. 24 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 24. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 24) served by base station 4520. Communication interface 4526 may be configured to facilitate connection 4560 to host computer 4510. Connection 4560 may be direct or it may pass through a core network (not shown in FIG. 24) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 24 may be similar or identical to host computer 4430, one of base stations 4412a, 4412b, 4412c and one of UEs 4491, 4492 of FIG. 23, respectively. This is to say, the inner workings of these entities may be as shown in FIG. 24 and independently, the surrounding network topology may be that of FIG. 23.

In FIG. 24, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 25:
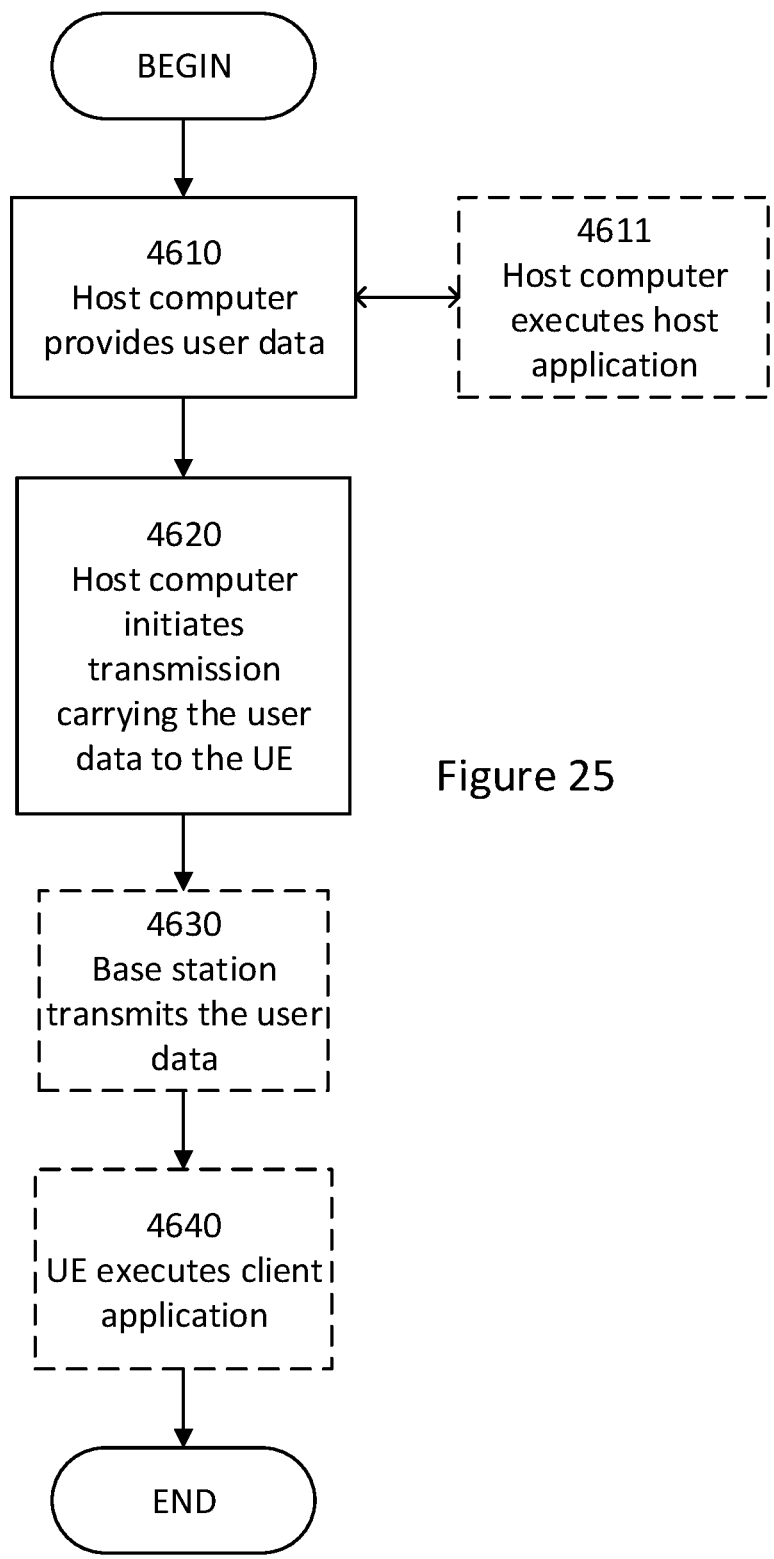
FIG. 25 is a block diagram of methods implemented in a communication system including a host computer, a base station and a user equipment in accordance with some embodiments.

FIG. 25 illustrates methods implemented in a communication system including a host computer, a base station and a user equipment in accordance with some embodiments FIG. 25 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 25 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 26:
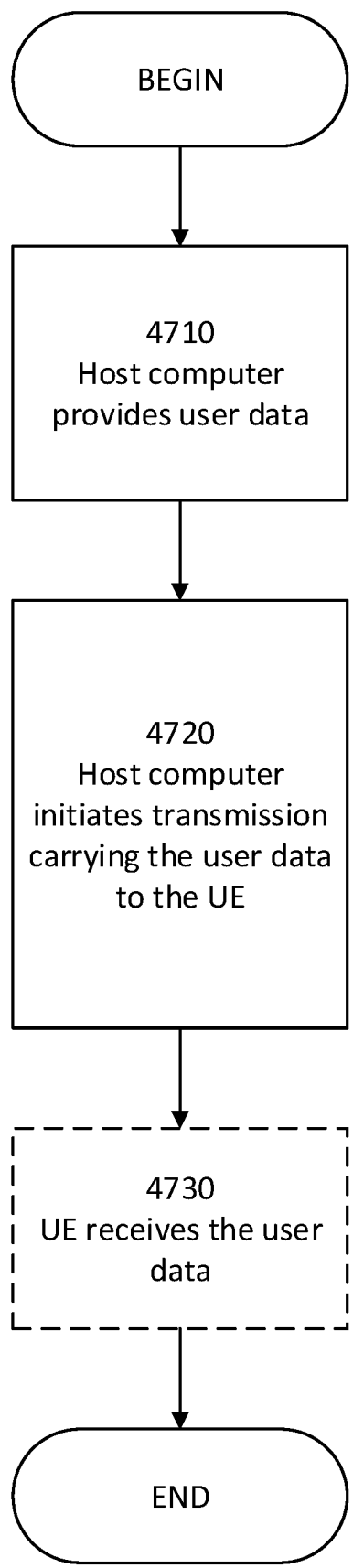
FIG. 26 is a block diagram of methods implemented in a communication system including a host computer, a base station and a user equipment in accordance with some embodiments.

FIG. 26 illustrates methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 26 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 27:
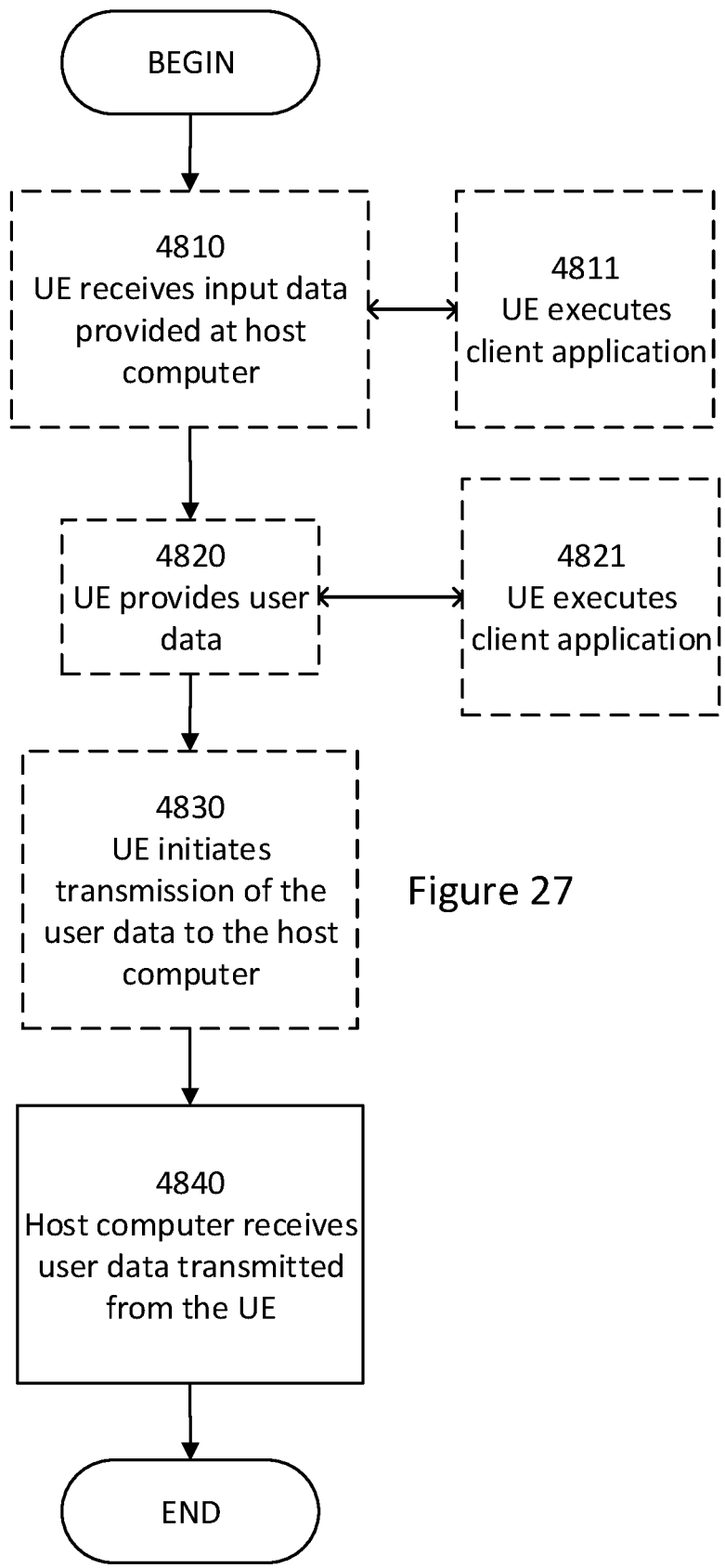
FIG. 27 is a block diagram of methods implemented in a communication system including a host computer, a base station and a user equipment in accordance with some embodiments.

FIG. 27 illustrates methods implemented in a communication system including a host computer, a base station and a user equipment in accordance with some embodiments.

FIG. 27 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 27 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 28:
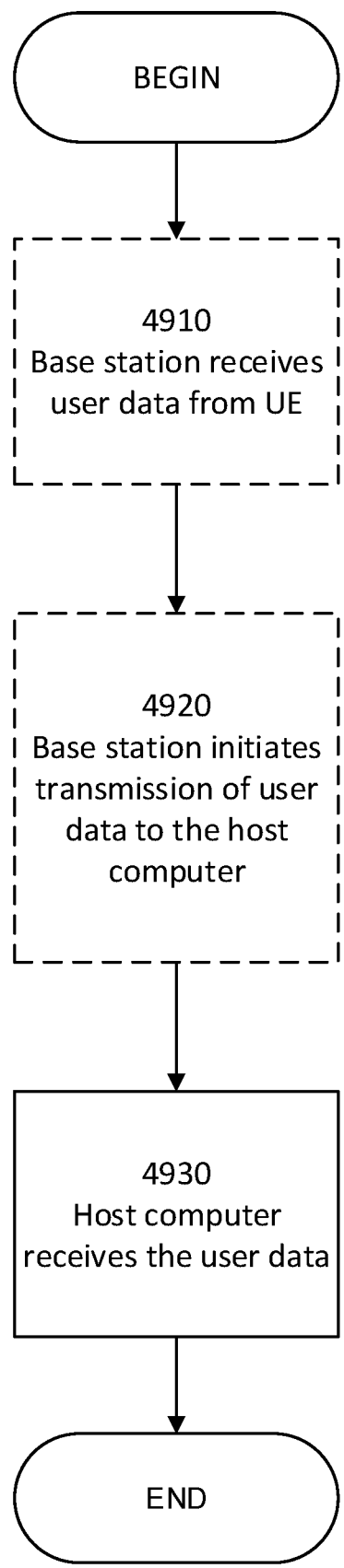
FIG. 28 is a block diagram of methods implemented in a communication system including a host computer, a base station and a user equipment in accordance with some embodiments.

FIG. 28 illustrates methods implemented in a communication system including a host computer, a base station and a user equipment in accordance with some embodiments FIG. 28 is a flowchart illustrating a method implemented in a communication system, in accordance with one embodiment. The communication system includes a host computer, a base station and a UE which may be those described with reference to FIGS. 23 and 24. For simplicity of the present disclosure, only drawing references to FIG. 28 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device in communication with a wireless communication network, the method comprising:
  receiving a logged Minimization of Drive Tests, MDT, measurement configuration from the wireless communication network;
  receiving an early measurement configuration from the wireless communication network, wherein the early measurement configuration identifies a plurality of early measurement frequencies including a first early measurement frequency;
  logging a plurality of MDT signal measurements in accordance with the logged MDT measurement configuration;

performing measurements in accordance with the early measurement configuration, wherein a signal measurement for the first early measurement frequency is not provided; and transmitting a logged MDT measurement report to the wireless communication network in accordance with the logged MDT measurement configuration, wherein the logged MDT measurement report includes the plurality of MDT signal measurements, and an indication that a signal measurement for the first early measurement frequency is not provided, and a cause reason why the signal measurement for the first early measurement frequency is not provided.

2. A computer program product comprising a non-transitory storage medium including program code to be executed by processing circuitry of a communication device, whereby execution of the program code causes the communication device to perform operations according to claim 1.

3. A method of operating a node of a wireless communication network, the method comprising:

providing a logged Minimization of Drive Tests, MDT, measurement configuration for a communication device;

providing an early measurement configuration for the communication device, wherein the early measurement configuration identifies a plurality of early measurement frequencies including a first early measurement frequency; and receiving a logged MDT measurement report from the communication device in accordance with the logged MDT measurement configuration, wherein the logged MDT measurement report includes a plurality of MDT signal measurements, and an indication that a signal measurement for the first early measurement frequency is not provided, and a cause reason why the signal measurement for the first early measurement frequency is not provided.

4. A computer program product comprising a non-transitory storage medium including program code to be executed by processing circuitry of a radio access network, RAN, node, whereby execution of the program code causes the RAN node to perform operations according to claim 3.

5. A communication device comprising:

processing circuitry; and memory coupled with the processing circuitry, wherein the memory includes instructions that when executed by the processing circuitry causes the communication device to, receive a logged Minimization of Drive Tests, MDT, measurement configuration from a wireless communication network, receive an early measurement configuration from the wireless communication network, wherein the early measurement configuration identifies a plurality of early measurement frequencies including a first early measurement frequency, log a plurality of MDT signal measurements in accordance with the logged MDT measurement configuration, perform measurements in accordance with the early measurement configuration, wherein a signal measurement for the first early measurement frequency is not provided, and transmit a logged MDT measurement report to the wireless communication network in accordance with the logged MDT measurement configuration, wherein the logged MDT measurement report includes the plurality of MDT signal measurements, and an indication that a signal measurement for the first early measurement frequency is not provided, and a cause reason why the signal measurement for the first early measurement frequency is not provided.

6. The communication device of claim 5, wherein the memory includes instructions that when executed by the processing circuitry causes the communication device to, perform a plurality of measurements used for cell reselection evaluation;

wherein logging the plurality of MDT signal measurements comprises logging the plurality of MDT signal measurement based on the plurality of measurements used for cell reselection evaluation.

7. The communication device of claim 6, wherein performing the plurality of measurements used for cell reselection evaluation comprises performing the plurality of measurements for respective frequencies used for cell reselection evaluation.

8. The communication device of claim 5, wherein the plurality of early measurement frequencies includes the first early measurement frequency and a second early measurement frequency, wherein performing measurement in accordance with the early measurement configuration comprises providing a signal measurement for the second early measurement frequency, and wherein the logged MDT measurement report includes the signal measurement for the second early measurement frequency.

9. The communication device of claim 5, wherein the signal measurement for the first early measurement frequency is not provided responsive to stopping measurement for the first early measurement frequency and/or for the plurality of early measurement frequencies.

10. The communication device of claim 9, wherein stopping comprises pausing measurement for the first early measurement frequency in accordance with the early measurement configuration.

11. The communication device of claim 9, wherein stopping measurement for the first early measurement frequency is responsive to at least one of, the communication device being incapable of performing carrier aggregation, CA, using the first early measurement frequency and a serving frequency, the communication device being incapable of performing dual connectivity, DC, using the first early measurement frequency and a serving frequency, expiration of a duration to provide measurements in accordance with the early measurement configuration, cell reselection, inter Radio Access Technology (inter-RAT) cell reselection, an autonomous inactive state to idle state transition, a mismatch between the early measurement configuration and a subsequent early measurement configuration, and/or a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

12. The communication device of claim 5, wherein the memory includes instructions that when executed by the processing circuitry causes the communication device to, transition to a dormant state, wherein the plurality of MDT signal measurements are logged while in the dormant state, and wherein the measurements in accordance with the early measurement configuration are performed while in the dormant state, and transition to a connected state after transitioning to the dormant state, wherein the logged MDT measurement report is transmitted while in the connected state.

13. The communication device of claim 5, wherein at least one of the logged MDT measurement configuration and/or the early measurement configuration includes an indication to include results of early measurements in the logged MDT measurement report, and wherein the logged MDT measurement report includes the indication that the signal measurement for the first early measurement frequency is not provided responsive to the indication to include results of early measurements in the logged MDT measurement report.

14. A radio access network, RAN, node comprising:
processing circuitry; and
memory coupled with the processing circuitry, wherein the memory includes instructions that when executed by the processing circuitry causes the RAN node to,
provide a logged Minimization of Drive Tests, MDT, measurement configuration for a communication device,
provide an early measurement configuration for the communication device, wherein the early measurement configuration identifies a plurality of early measurement frequencies including a first early measurement frequency, and
receive a logged MDT measurement report from the communication device in accordance with the logged MDT measurement configuration, wherein the logged MDT measurement report includes a plurality of MDT signal measurements, and an indication that a signal measurement for the first early measurement frequency is not provided, and a cause reason why the signal measurement for the first early measurement frequency is not provided.

15. The RAN node of claim 14, wherein the plurality of MDT signal measurements are based on a plurality of measurements used for cell reselection evaluation.

16. The RAN node of claim 15, wherein the plurality of measurements used for cell reselection evaluation are a plurality of measurements for respective frequencies used for cell reselection evaluation.

17. The RAN node of claim 14, wherein the plurality of early measurement frequencies includes the first early measurement frequency and a second early measurement frequency, and wherein the logged MDT measurement report includes a signal measurement for the second early measurement frequency.

18. The RAN node of claim 14, wherein the indication includes an empty measurement result for the first early measurement frequency.

19. The RAN node of claim 18, wherein the empty measurement result comprises a pre-configured fixed value indicating that a signal measurement for the first early measurement frequency is not provided.

20. The RAN node of claim 14, wherein the indication that the signal measurement for the early measurement frequency is not provided includes an indication of at least one of,
the communication device being incapable of performing carrier aggregation, CA, using the first early measurement frequency and a serving frequency,
the communication device being incapable of performing dual connectivity, DC, using the first early measurement frequency and a serving frequency,
expiration of a duration to provide measurements in accordance with the early measurement configuration,
termination of early measurement for the first early measurement frequency,
cell reselection,
inter Radio Access Technology (inter-RAT) cell reselection,
early measurement for the first early measurement frequency being terminated due to cell reselection,
early measurement for the first early measurement frequency being terminated due to inter Radio Access Technology (inter-RAT) cell reselection,
an autonomous inactive state to idle state transition,
early measurement for the first early measurement frequency being terminated due to an autonomous inactive state to idle state transition,
a mismatch between the early measurement configuration and a subsequent measurement configuration, and/or
a mismatch between the early measurement configuration which was received as a dedicated early measurement configuration from a source serving cell before entering a dormant state and a subsequent early measurement configuration received from a current serving cell via broadcast signaling after entering the dormant state and after cell reselection.

21. The RAN node of claim 14, wherein at least one of the logged MDT measurement configuration and/or the early measurement configuration includes an indication to include results of early measurements in the logged MDT measurement report, and wherein the logged MDT measurement report includes the indication that the signal measurement for the first early measurement frequency is not provided responsive to the indication to include results of early measurements in the logged MDT measurement report.

22. The RAN node of claim 14, wherein the early measurement configuration includes a timer value specifying a duration of performing measurement according to the early measurement configuration.

* * * * *